(12) United States Patent
Ohashi

(10) Patent No.: US 6,995,921 B2
(45) Date of Patent: *Feb. 7, 2006

(54) COMPACT ZOOM LENS SYSTEM AND DIGITAL CAMERA USING THE COMPACT ZOOM LENS SYSTEM

(75) Inventor: Kazuyasu Ohashi, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 23 days.

This patent is subject to a terminal disclaimer.

(21) Appl. No.: 10/935,263

(22) Filed: Sep. 8, 2004

(65) Prior Publication Data

US 2005/0094285 A1    May 5, 2005

Related U.S. Application Data

(63) Continuation of application No. 10/697,169, filed on Oct. 31, 2003, now Pat. No. 6,839,185.

(30) Foreign Application Priority Data

| Nov. 1, 2002 | (JP) | ............................. 2002-320584 |
| Jan. 30, 2003 | (JP) | ............................. 2003-022254 |

(51) Int. Cl.
*G02B 15/14* (2006.01)
(52) U.S. Cl. ............ 359/682; 359/689; 359/685; 359/680
(58) Field of Classification Search ................ 359/680, 359/682, 685, 689
See application file for complete search history.

(56) References Cited

U.S. PATENT DOCUMENTS

| 4,838,666 A | 6/1989 | Shiraishi ................. 359/689 |
| 5,568,323 A | 10/1996 | Sensui ................... 359/689 |
| 5,969,878 A | 10/1999 | Koizumi .................. 359/682 |
| 6,525,885 B2 | 2/2003 | Ohashi ................... 359/687 |
| 6,839,185 B2 * | 1/2005 | Ohashi ................... 359/689 |
| 2002/0167736 A1 | 11/2002 | Shibayama ................ 359/680 |

* cited by examiner

Primary Examiner—David N. Spector
(74) Attorney, Agent, or Firm—Oblon, Spivak, McClelland, Maier & Neustadt, P.C.

(57) ABSTRACT

A zoom lens apparatus includes a first optical lens group having a negative focal length, a second optical lens group having a positive focal length, and a third optical lens group having a positive focal length, arranged in this order from a subject. The lens groups move such that a distance between the first and second optical lens groups is decreased and a distance between the second and third optical lens groups is increased at a scaling change to a long focal length edge. The second optical lens group includes two positive lenses, a negative meniscus lens, and a positive meniscus lens. The zoom lens system satisfies an inequality condition $0.15<(N_{22}-N_{23})<0.40$, in which $N_{22}$ is a refractive index of the negative meniscus lens and $N_{23}$ is a refractive index of the positive meniscus lens conjoined with the negative meniscus lens.

11 Claims, 20 Drawing Sheets

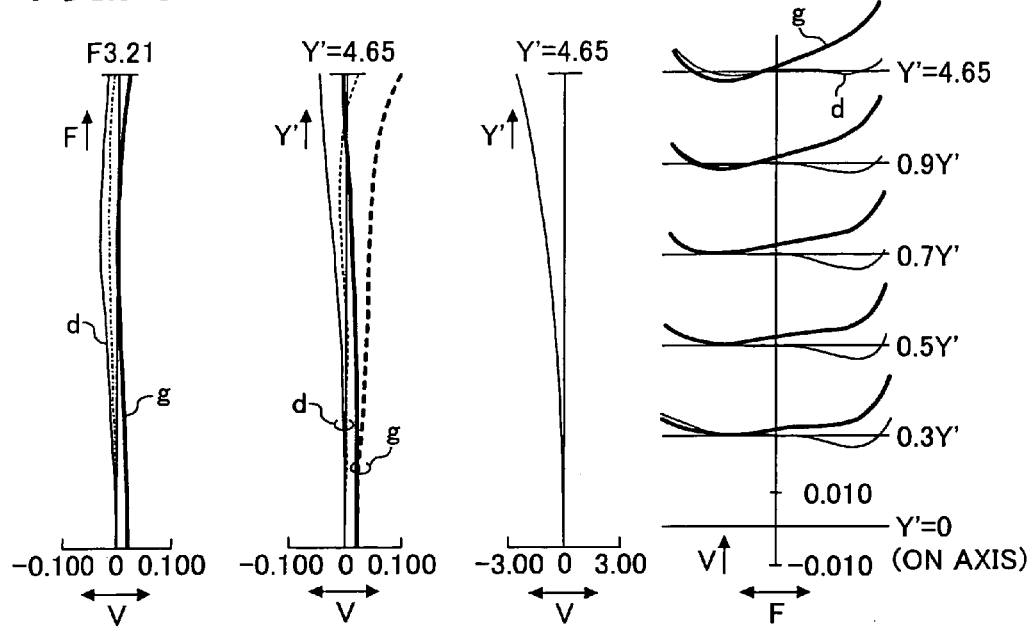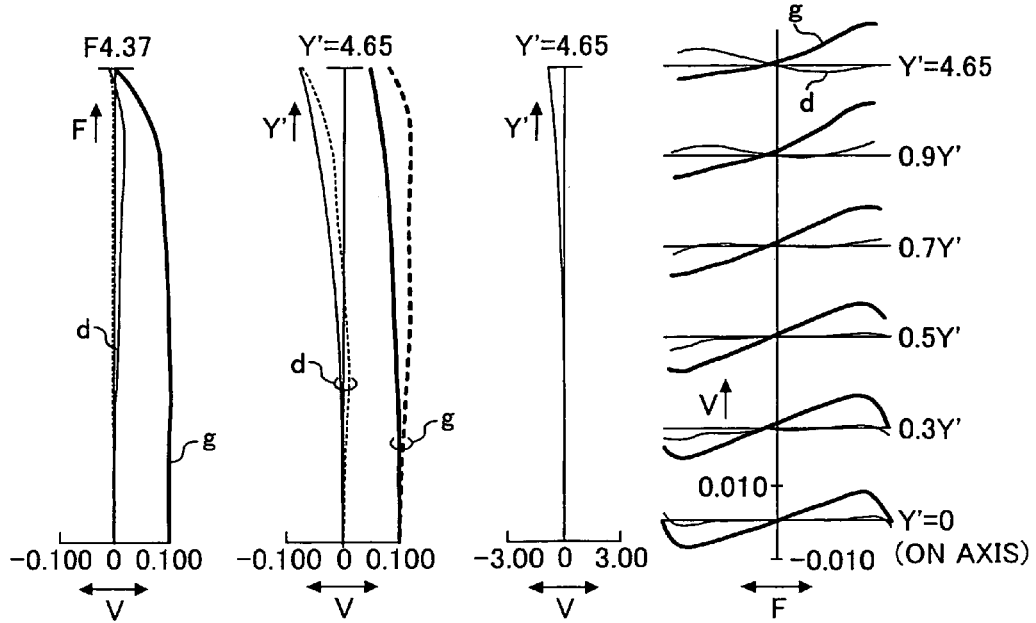

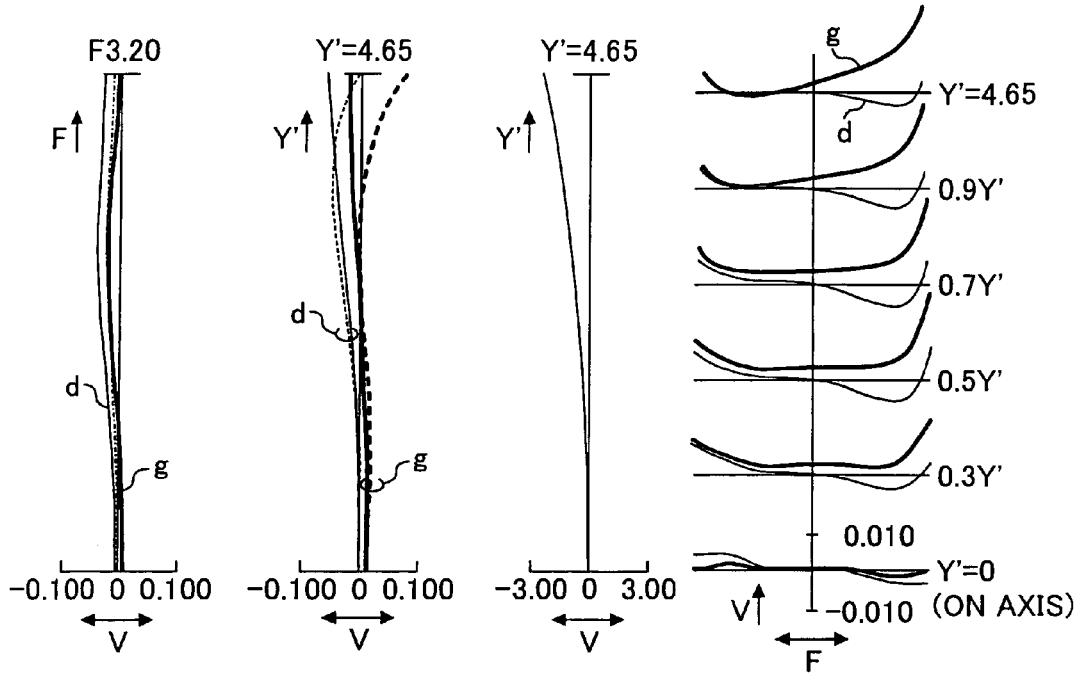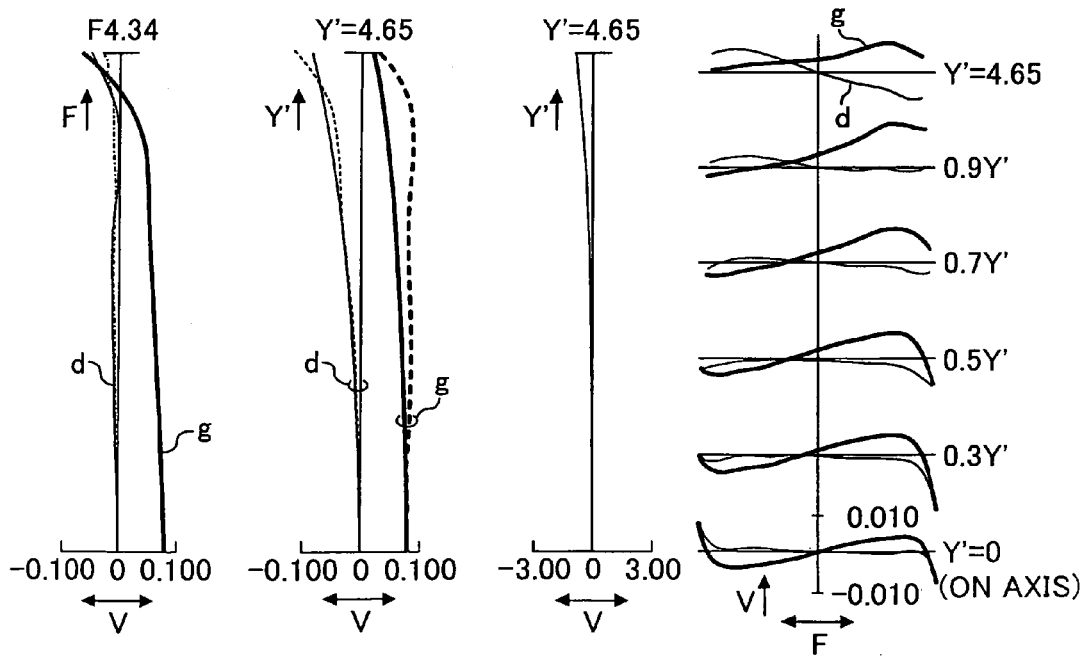

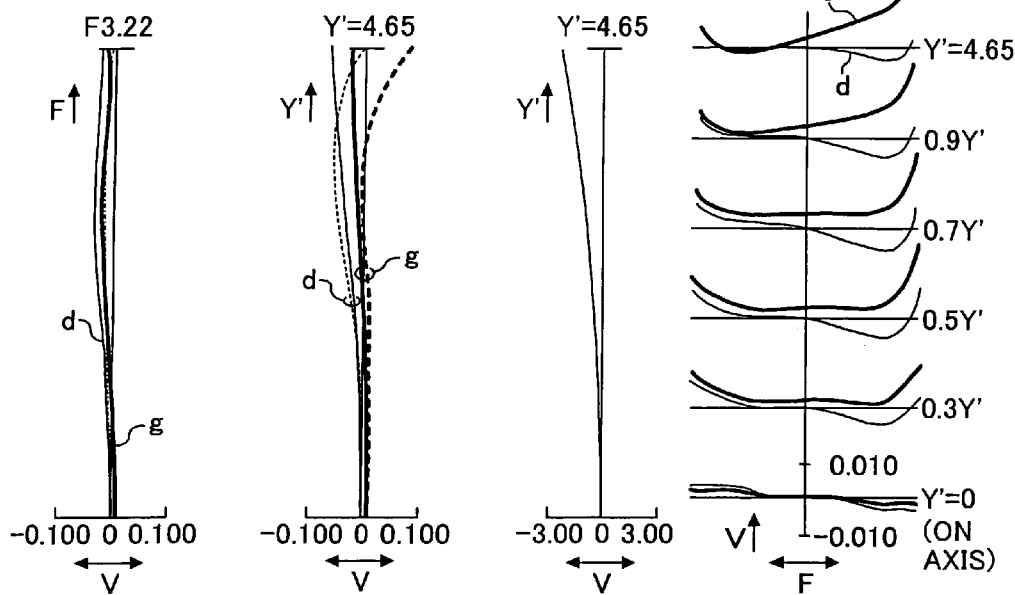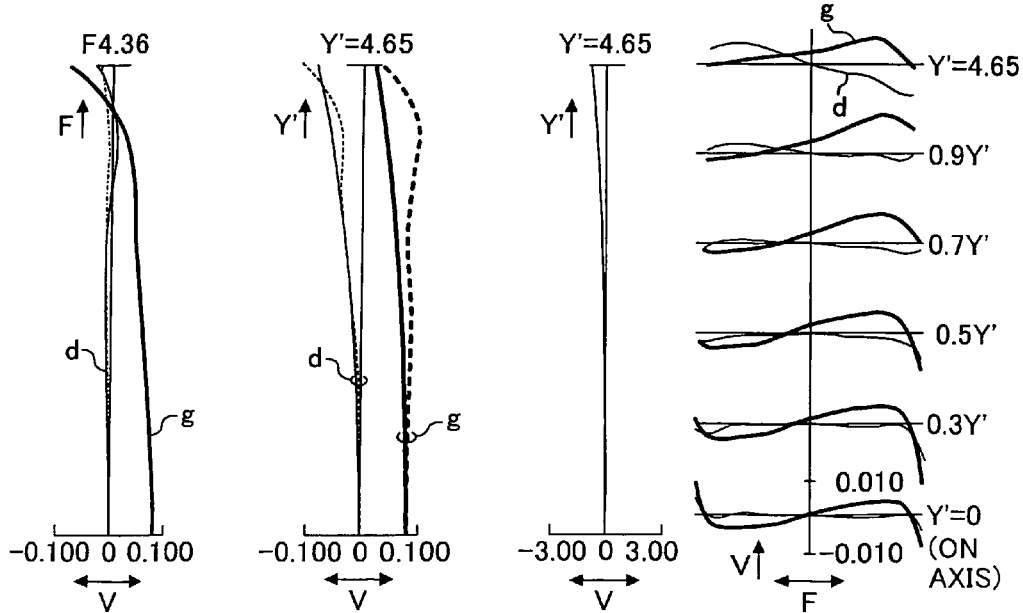

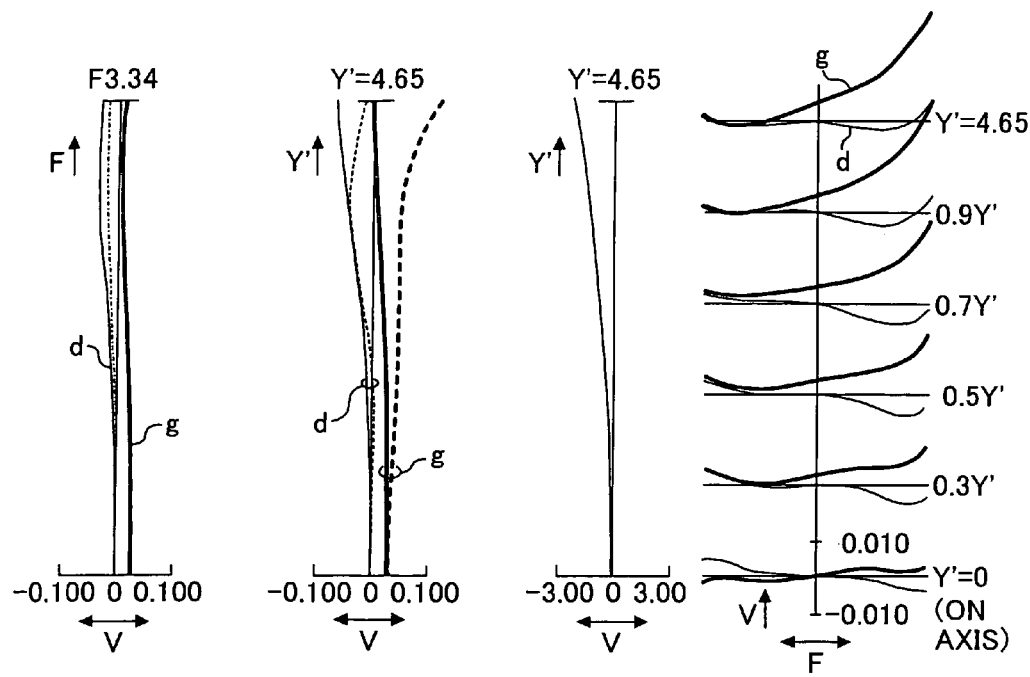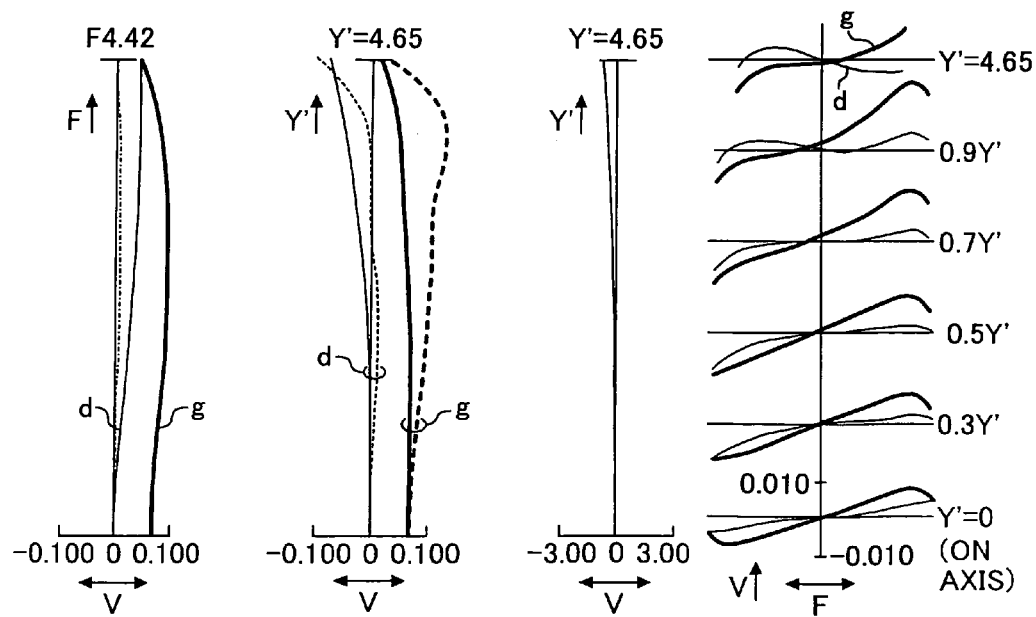

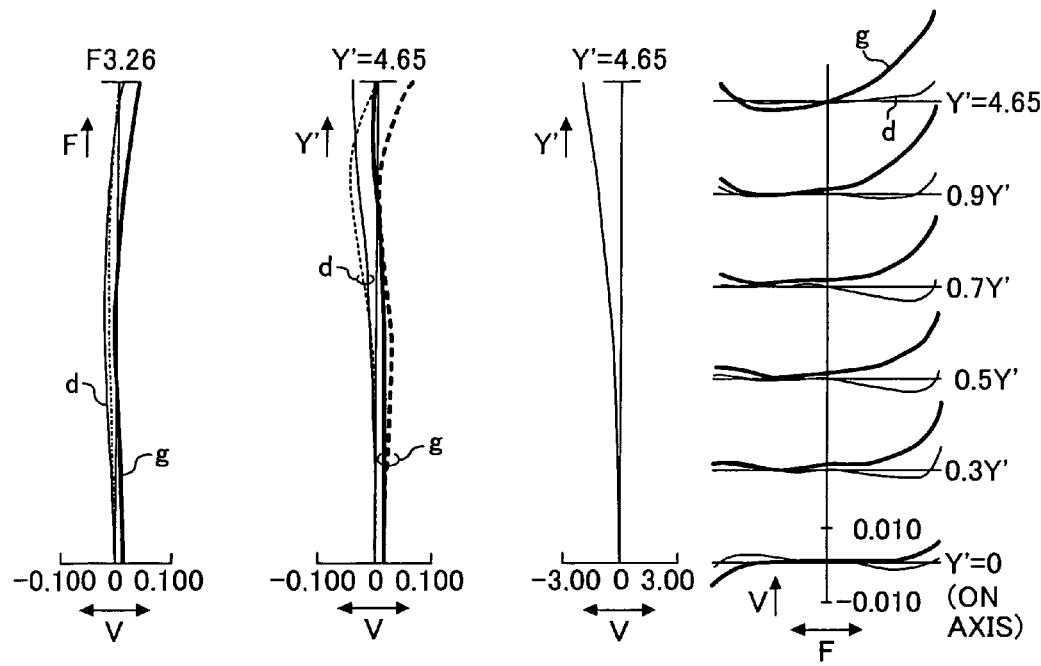
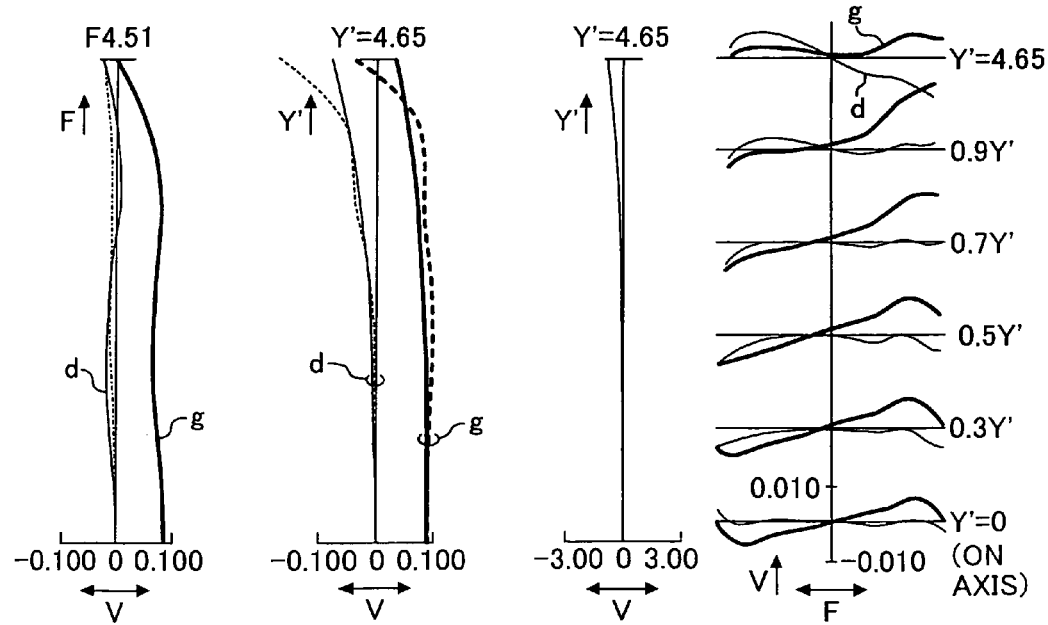

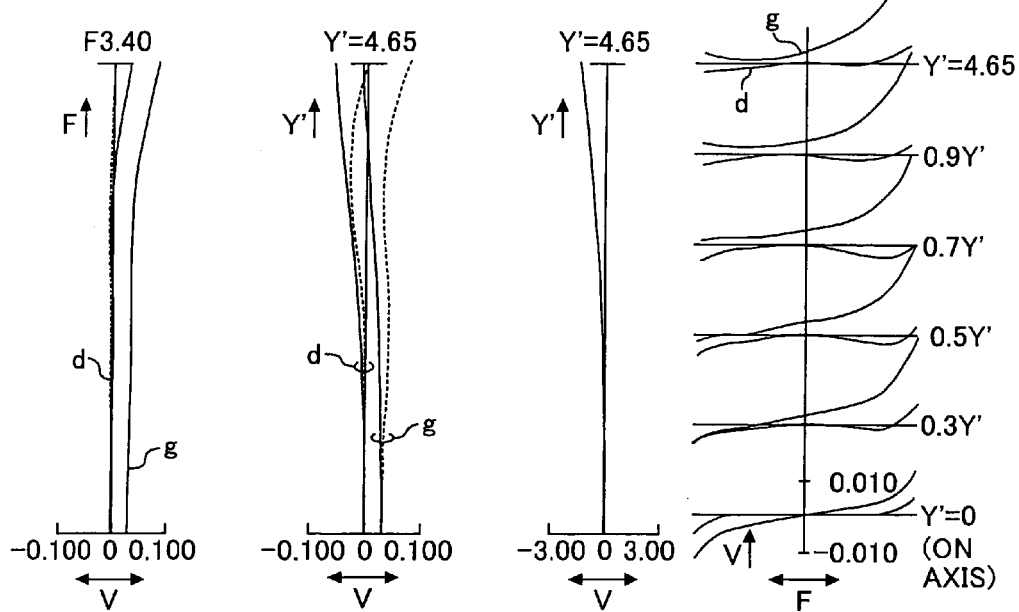
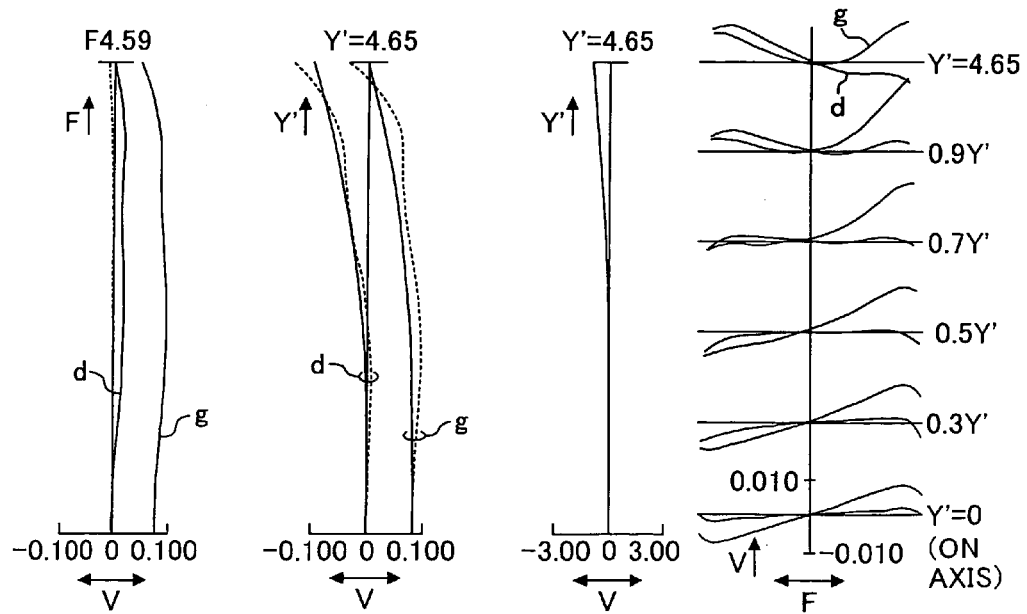

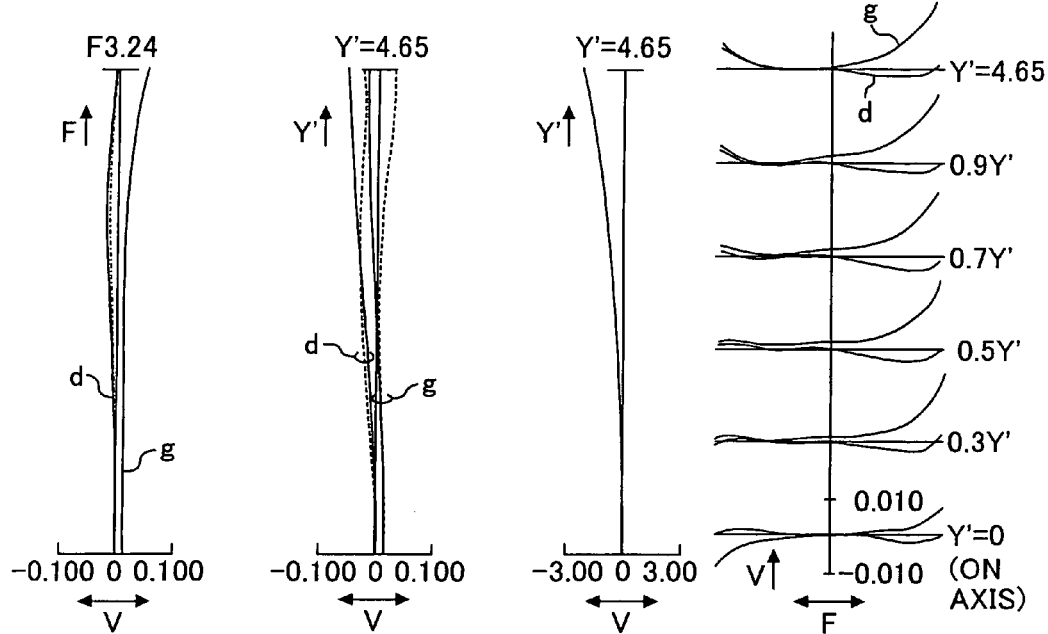
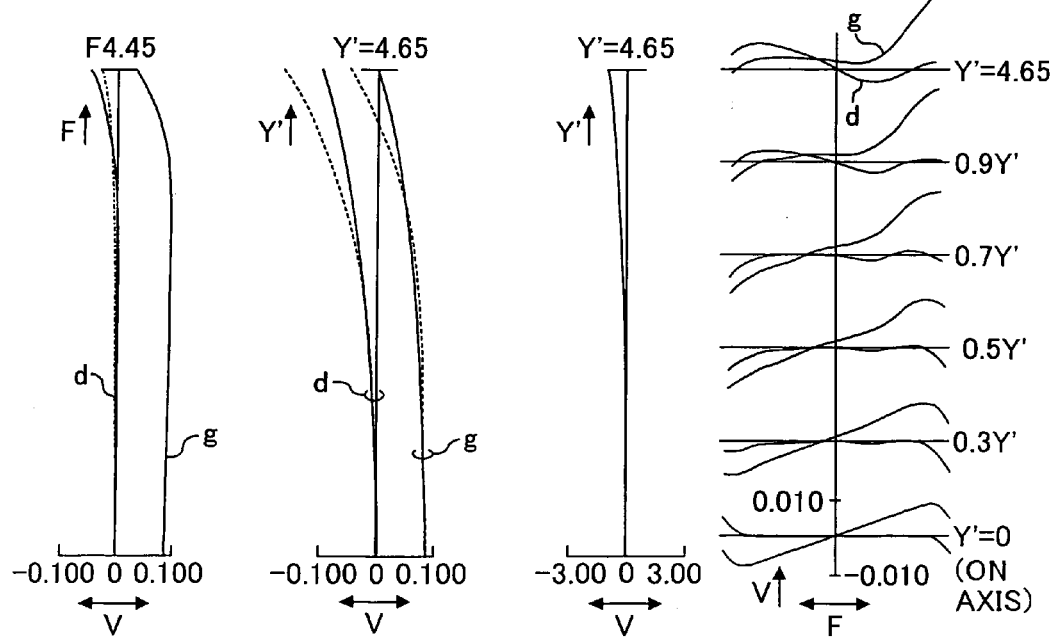

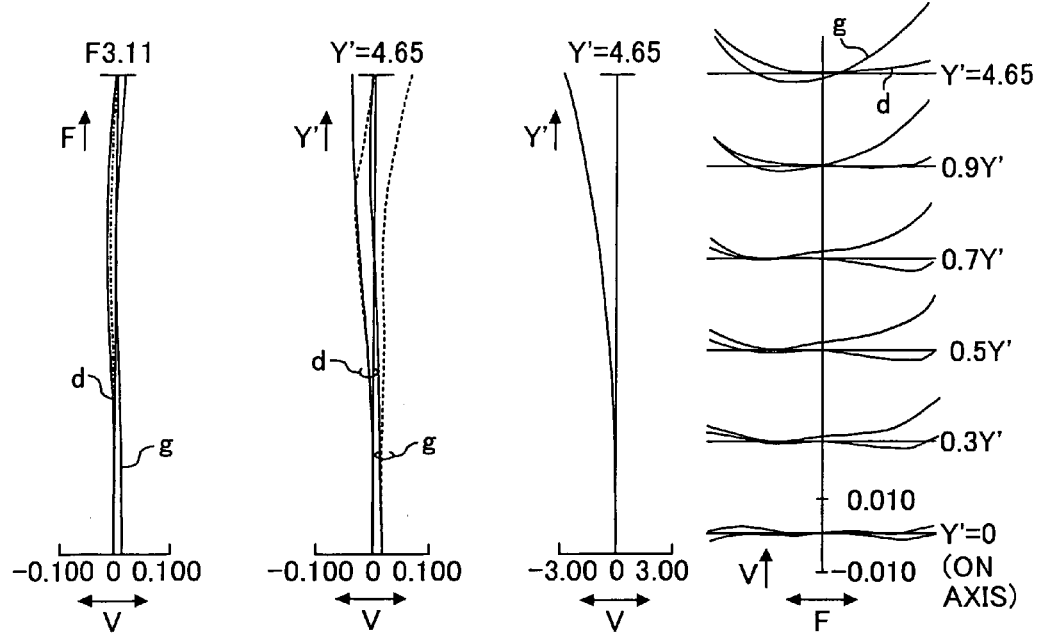
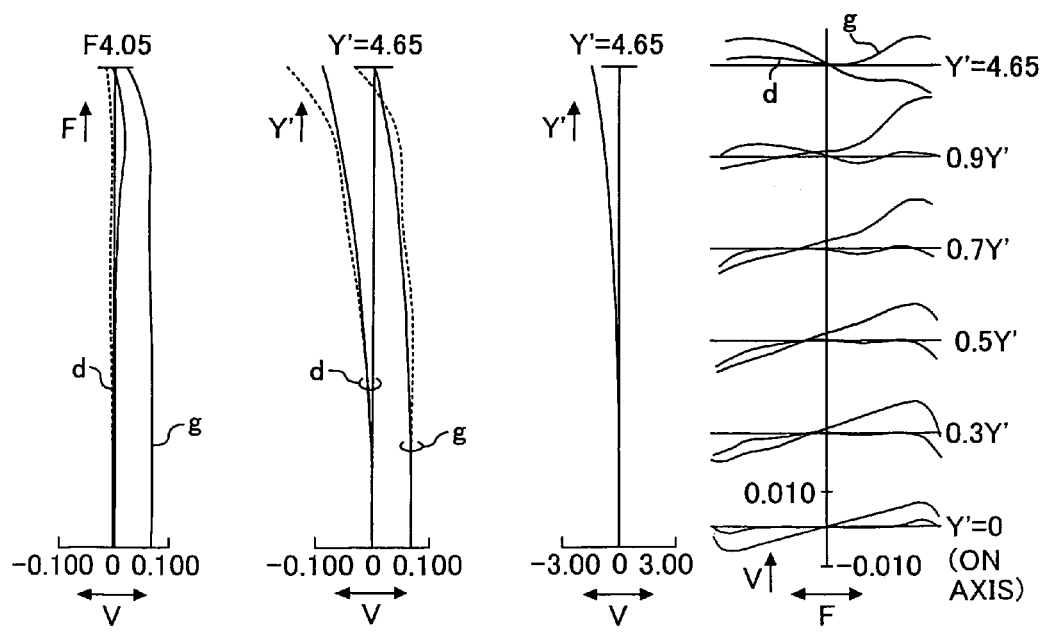

COMPACT ZOOM LENS SYSTEM AND DIGITAL CAMERA USING THE COMPACT ZOOM LENS SYSTEM

CROSS-REFERENCE TO RELATED DOCUMENTS

The present patent document is a continuation of U.S. application Ser. No. 10/697,169, filed on Oct. 31, 2003, now U.S. Pat. No. 6,839,185, and in turn claims priority to JP 2002-320584 filed on Nov. 1, 2002 and JP 2003-022254 filed on Jan. 30, 2003, the entire contents of each of which are hereby incorporated herein by reference.

BACKGROUND OF THE INVENTION

1. Field of the Invention

The present invention relates to a compact zoom lens system and a digital camera using the compact zoom lens system, and more particularly to a compact zoom lens system and a digital camera using the compact zoom lens system having a wide half angle of view and a high resolution.

2. Discussion of the Background

In recent years, digital cameras or electronic cameras have rapidly come into widespread use in place of conventional cameras using a silver film. A typical digital camera shoots a subject with a solid image pickup device such as an image pickup device including a CCD (charge-coupled device), for example, and obtains image data including a still image and/or a motion image. The obtained image data is recorded in a digital fashion in a non-volatile memory or the like (e.g., a flash memory) provided to the digital camera.

The market of the digital cameras is huge and accordingly user needs for such digital cameras expand in a various directions. In particular, a high image quality and downsizing are constantly required and share a relatively large part of the user needs. Therefore, a zoom lens system used as an image pickup lens system is also needed to satisfy the needs for both performance enhancement and downsizing.

In an aspect of downsizing, a total lens length which is a distance from a plane of a lens closest to the subject to an image plane is needed to be reduced. Further, in an aspect of performance enhancement, a ultra fine resolution is required through an entire zoom range to cover at least three- to six-million elements of the image pickup device.

In addition, from a viewpoint in which many users demand that wide-angle lenses have wider angles of view, a half view angle at a short focal length edge in a zoom lens is preferably greater than 38 degrees. A half view angle of 38 degrees corresponds to a focal length of 28 mm in a 35-mm silver-film camera.

There are many kinds of zoom lens systems which may be available for the digital cameras. Amongst, one exemplary zoom lens system which is suitable for a compact digital camera system may include, arranged sequentially from a subject side, a first optical lens group having a negative focal length, a second optical lens group having a positive focal length, and a third optical lens group having a positive focal length. This zoom lens system further includes an aperture diaphragm which is mounted to the subject side of the second optical lens group in a manner such that the aperture diaphragm and the second optical lens group are integrally movable. Further, when the scaling Of the zoom lens system is changed, for example, from the short focal length edge to the long focal length edge, the second optical lens group monotonously moves from the image side to the subject side and, at the same time, the first optical lens group moves in such a way that a displacement of the image plane caused by the scaling change is corrected.

The above-described zoom lens system is described in some reference art documents including Japanese Laid-Open Patent Application Publication, No. 10-39214, No. 10-104518, and No. 2001-296476, for example.

However, even with these documents, a digital camera has not been introduced, having a compact size, a capability to obtain a sufficiently wider half angle of view over 38 degrees, and a reasonably fine resolution for a pickup device of a 3- to 6-million pixel range.

SUMMARY OF THE INVENTION

In view of the foregoing, it is an object of the present invention to provide a novel zoom lens apparatus which realizes a compact size, a relatively wider half angle of view over 38 degrees, and a reasonably fine resolution for a pickup device of a 3- to 6-million pixel range.

Another object of the present invention is to provide a novel digital camera having a zoom lens apparatus which realizes a compact size, a relatively wider half angle of view over 38 degrees, and a reasonably fine resolution for a pickup device of a 3- to 6-million pixel range.

Another object of the present invention is to provide a novel personal digital assistance apparatus having a zoom lens apparatus which realizes a compact size, a relatively wider half angle of view over 38 degrees, and a reasonably fine resolution for a pickup device of a 3- to 6-million pixel range.

To achieve the above-mentioned object, in one example, a novel zoom lens apparatus includes a first optical lens group, a second optical lens group, an aperture diaphragm, and a third optical lens group. The first optical lens group has a negative focal length and is arranged at a first position closest to a subject. The second optical lens group has a positive focal length arranged at a second position second closest to the subject. The aperture diaphragm is disposed to a subject side of the second optical lens group closer to the subject in a manner such that the aperture diaphragm is movable integrally with the second optical lens group. The third optical lens group has a positive focal length arranged at a third position third closest to the subject. In this zoom lens system, the first optical lens group, the second optical lens group, and the third optical lens group move in such a way that a distance between the first optical lens group and the second optical lens group is gradually decreased and a distance between the second optical lens group and the third optical lens group is gradually increased when a scaling of the zoom lens system is changed from a short focal length edge to a long focal length edge. Further, the second optical lens group includes a three-group and four-lens structure which includes a positive lens, a negative meniscus lens, a positive meniscus lens, and a positive lens. The positive lens is arranged at a first sub-position closest to the subject in the second optical lens group and is arranged such that a greater-curvature surface of the positive lens faces the subject. The negative meniscus lens is arranged at a second sub-position second closest to the subject in the second optical lens group and is arranged such that a concave of the negative meniscus lens faces the subject. The positive meniscus lens is conjoined with the negative meniscus lens and is arranged at a third sub-position third closest to the subject in the second optical lens group. The positive lens is arranged at a fourth sub-position fourth closest to the subject in the second optical lens group. In this zoom lens system, the zoom lens system satisfies an inequality condition $0.15 < (N_{22}-N_{23}) < 0.40$, in which N22 is a refractive index of the negative meniscus lens of the second optical lens group and N23 is a refractive index of the positive meniscus lens of the second optical lens group conjoined with the negative meniscus lens.

The zoom lens system may satisfy an inequality condition $25 < (v_{22}-v_{23}) < 50$, in which $v_{22}$ is an Abbe number of the negative meniscus lens in the second optical lens group and $v_{22}$ is an Abbe number of the positive meniscus lens conjoined with the negative meniscus lens in the second optical lens group.

The zoom lens system may satisfy an inequality condition $1.40 < ((1/r_{21F})+(1/r_{22F})+(1/r_{22R})) < 2.20$, in which $r_{21F}$ is a radius of curvature of a subject-side surface of the positive lens arranged at the first sub-position in the second optical lens group, $r_{22F}$ is a radius of curvature of a subject-side surface of the negative meniscus lens arranged at the second sub-position in the second optical lens group, $r_{22R}$ is a radius of curvature of a conjoined surface of the negative meniscus lens arranged at the second sub-position and the positive lens arranged at the third sub-position in the second optical lens group, and Y' is an image height.

The zoom lens system may satisfy an inequality condition $1.40 < (L_{PN}/L_2) < 0.70$, in which $L_{PN}$ is a distance between a summit of the subject-side surface of the positive lens arranged at the first sub-position and a summit of the conjoined surface of the negative meniscus lens arranged at the second sub-position and the positive lens arranged at the third sub-position in the second optical lens group, and $L_2$ is a thickness of the second optical lens group in a direction of a light axis of the second optical lens group.

The conjoined surface of the negative meniscus lens arranged at the second sub-position and the positive lens arranged at the third sub-position may have a radius of curvature which is greatest among lens surfaces included in the second optical lens group.

The subject-side surface of the positive lens arranged at the first sub-position in the second optical lens group and an image-side surface of the positive lens arranged at the fourth sub-position may be aspherical.

Further, to achieve the above-mentioned objects and other objects, in one example, a novel digital camera includes a zoom lens apparatus which includes a first optical lens group, a second optical lens group, an aperture diaphragm, and a third optical lens group. The first optical lens group has a negative focal length and is arranged at a first position closest to a subject. The second optical lens group has a positive focal length arranged at a second position second closest to the subject. The aperture diaphragm is disposed to a subject side of the second optical lens group closer to the subject in a manner such that the aperture diaphragm is movable integrally with the second optical lens group. The third optical lens group has a positive focal length arranged at a third position third closest to the subject. In this zoom lens system, the first optical lens group, the second optical lens group, and the third optical lens group move in such a way that a distance between the first optical lens group and the second optical lens group is gradually decreased and a distance between the second optical lens group and the third optical lens group is gradually increased when a scaling of the zoom lens system is changed from a short focal length edge to a long focal length edge. Further, the second optical lens group includes a three-group and four-lens structure which includes a positive lens, a negative meniscus lens, a positive meniscus lens, and a positive lens. The positive lens is arranged at a first sub-position closest to the subject in the second optical lens group and is arranged such that a greater-curvature surface of the positive lens faces the subject. The negative meniscus lens is arranged at a second sub-position second closest to the subject in the second optical lens group and is arranged such that a concave of the negative meniscus lens faces the subject. The positive meniscus lens is conjoined with the negative meniscus lens and is arranged at a third sub-position third closest to the subject in the second optical lens group. The positive lens is arranged at a fourth sub-position fourth closest to the subject in the second optical lens group. In this zoom lens system, the zoom lens system satisfies an inequality condition $0.15 < (N_{22}-N_{23}) < 0.40$, in which N22 is a refractive index of the negative meniscus lens of the second optical lens group and N23 is a refractive index of the positive meniscus lens of the second optical lens group conjoined with the negative meniscus lens.

Further, to achieve the above-mentioned objects and other objects, in one example, a novel personal digital assistance, apparatus includes a zoom lens apparatus which includes a first optical lens group, a second optical lens group, an aperture diaphragm, and a third optical lens group. The first optical lens group has a negative focal length and is arranged at a first position closest to a subject. The second optical lens group has a positive focal length arranged at a second position second closest to the subject. The aperture diaphragm is disposed to a subject side of the second optical lens group closer to the subject in a manner such that the aperture diaphragm is movable integrally with the second optical lens group. The third optical lens group has a positive focal length arranged at a third position third closest to the subject. In this zoom lens system, the first optical lens group, the second optical lens group, and the third optical lens group move in such a way that a distance between the first optical lens group and the second optical lens group is gradually decreased and a distance between the second optical lens group and the third optical lens group is gradually increased when a scaling of the zoom lens system is changed from a short focal length edge to a long focal length edge. Further, the second optical lens group includes a three-group and four-lens structure which includes a positive lens, a negative meniscus lens, a positive meniscus lens, and a positive lens. The positive lens is arranged at a first sub-position closest to the subject in the second optical lens group and is arranged such that a greater-curvature surface of the positive lens faces the subject. The negative meniscus lens is arranged at a second sub-position second closest to the subject in the second optical lens group and is arranged such that a concave of the negative meniscus lens faces the subject. The positive meniscus lens is conjoined with the negative meniscus lens and is arranged at a third sub-position third closest to the subject in the second optical lens group. The positive lens is arranged at a fourth sub-position fourth closest to the subject in the second optical lens group. In this zoom lens system, the zoom lens system satisfies an inequality condition $0.15 < (N_{22}-N_{23}) < 0.40$, in which N22 is a refractive index of the negative meniscus lens of the second optical lens group and N23 is a refractive index of the positive meniscus lens of the second optical lens group conjoined with the negative meniscus lens.

Further, to achieve the above-mentioned object and other objects, a novel zoom lens apparatus includes first, second, and third lens groups and an aperture diaphragm. The first lens group has a first lens group having a negative focal length and is arranged at a first position from a subject side. The second lens group has a positive focal length and is arranged at a second position from the subject side. The aperture diaphragm is arranged in front of a subject side surface of the second lens group and is configured to move together with the second lens group. The third lens group has a positive focal length and is arranged at a third position from the subject side. In this zoom lens apparatus, at least the first and second lens groups move at a time the zoom lens apparatus changes a scaling from a short focal length edge to a long focal length edge such that a distance between the first and second lens group is decreased and that a distance between the second and third lens group is increased. Further, the first lens group includes a first negative meniscus lens, a double-convex lens, and a double-concave lens. The first negative meniscus lens has a concave lens surface facing an image plane and is arranged at a first in-group position from the subject side. The double-convex lens is arranged at a second in-group position from the subject side. The double-concave lens is conjoined with the double-concave lens and is arranged at a third in-group position from the subject side.

The first lens group may further include a second negative meniscus lens arranged between the first negative meniscus lens and the double-concave lens.

The above-mentioned zoom lens apparatus may satisfy an inequality condition $0.20<(D_4/L_1)<0.40$, in which $D_4$ is a distance on a light axis between an image side surface of the second negative meniscus lens in the first lens group and a subject side surface of the double-convex lens and $L_1$ is a distance on a light axis between a subject side surface of the first negative meniscus lens and an image side surface of the double-concave lens in the first lens group.

The above-mentioned zoom lens apparatus may satisfy an inequality condition $1.60<(N_{14})<1.90$, in which $D_{14}$ is a refractive index of the double-concave lens of the first lens group.

The above-mentioned zoom lens apparatus may satisfy inequality conditions $-0.20<(N_{13}-N_{14})<0.10$ and $5<(v_{14}-v_{13})<25$, in which $N_{13}$ is a refractive index of the double-convex lens of the first lens group, $N_{14}$ is a refractive index of the double-concave lens of the first lens group, $v_{13}$ is an Abbe number of the double-convex lens of the first lens group, and $v_{14}$ is an Abbe number of the double-concave lens of the first lens group.

In the above-mentioned zoom lens apparatus, an image side surface of the second negative meniscus lens in the first lens group may be aspheric.

The second lens group may include a first positive lens, a negative meniscus lens, a positive meniscus lens, and a second positive lens. The first positive lens has a great-curvature surface facing the subject side and is arranged at a first in-group position from the subject side. The negative meniscus lens has a concave surface facing the image side and is arranged at a second in-group position from the subject side. The positive meniscus lens is conjoined with the negative meniscus lens and is arranged at a third in-group position from the subject side. The second positive lens arranged at a fourth in-group position from the subject side.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 3A–3D are graphs of aberration curves that are a spherical aberration, an astigmatic aberration, a distortion aberration, and a coma aberration, respectively, measured at a medium focal length edge of the zoom lens apparatus of FIG. 1;

FIGS. 4A–4D are graphs of aberration curves that are a spherical aberration, an astigmatic aberration, a distortion aberration, and a coma aberration, respectively, measured at a long focal length edge of the zoom lens apparatus of FIG. 1;

FIGS. 7A–7D are graphs of aberration curves that are a spherical aberration, an astigmatic aberration, a distortion aberration, and a coma aberration, respectively, measured at a medium focal length edge of the zoom lens apparatus of FIG. 5;

FIGS. 8A–8D are graphs of aberration curves that are a spherical aberration, an astigmatic aberration, a distortion aberration, and a coma aberration, respectively, measured at a long focal length edge of the zoom lens apparatus of FIG. 5;

FIGS. 11A–11D are graphs of aberration curves that are a spherical aberration, an astigmatic aberration, a distortion aberration, and a coma aberration, respectively, measured at a medium focal length edge of the zoom lens apparatus of FIG. 9;

FIGS. 12A–12D are graphs of aberration curves that are a spherical aberration, an astigmatic aberration, a distortion aberration, and a coma aberration, respectively, measured at a long focal length edge of the zoom lens apparatus of FIG. 9;

FIGS. 15A–15D are graphs of aberration curves that are a spherical aberration, an astigmatic aberration, a distortion aberration, and a coma aberration, respectively, measured at a medium focal length edge of the zoom lens apparatus of FIG. 13;

FIGS. 16A–16D are graphs of aberration curves that are a spherical aberration, an astigmatic aberration, a distortion aberration, and a coma aberration, respectively, measured at a long focal length edge of the zoom lens apparatus of FIG. 13;

FIGS. 23A–23D are graphs of aberration curves that are a spherical aberration, an astigmatic aberration, a distortion aberration, and a coma aberration, respectively, measured at a medium focal length edge of the zoom lens apparatus of FIG. 21;

FIGS. 24A–24D are graphs of aberration curves that are a spherical aberration, an astigmatic aberration, a distortion aberration, and a coma aberration, respectively, measured at a long focal length edge of the zoom lens apparatus of FIG. 21;

FIGS. 27A–27D are graphs of aberration curves that are a spherical aberration, an astigmatic aberration, a distortion aberration, and a coma aberration, respectively, measured at a medium focal length edge of the zoom lens apparatus of FIG. 25;

FIGS. 28A–28D are graphs of aberration curves that are a spherical aberration, an astigmatic aberration, a distortion aberration, and a coma aberration, respectively, measured at a long focal length edge of the zoom lens apparatus of FIG. 25;

FIGS. 31A–31D are graphs of aberration curves that are a spherical aberration, an astigmatic aberration, a distortion aberration, and a coma aberration, respectively, measured at a medium focal length edge of the zoom lens apparatus of FIG. 29;

FIGS. 32A–32D are graphs of aberration curves that are a spherical aberration, an astigmatic aberration, a distortion aberration, and a coma aberration, respectively, measured at a long focal length edge of the zoom lens apparatus of FIG. 29;

FIGS. 35A–35D are graphs of aberration curves that are a spherical aberration, an astigmatic aberration, a distortion aberration, and a coma aberration, respectively, measured at a medium focal length edge of the zoom lens apparatus of FIG. 33;

FIGS. 36A–36D are graphs of aberration curves that are a spherical aberration, an astigmatic aberration, a distortion aberration, and a coma aberration, respectively, measured at a long focal length edge of the zoom lens apparatus of FIG. 33;

DETAILED DESCRIPTION OF PREFERRED EMBODIMENTS

Figure 1:
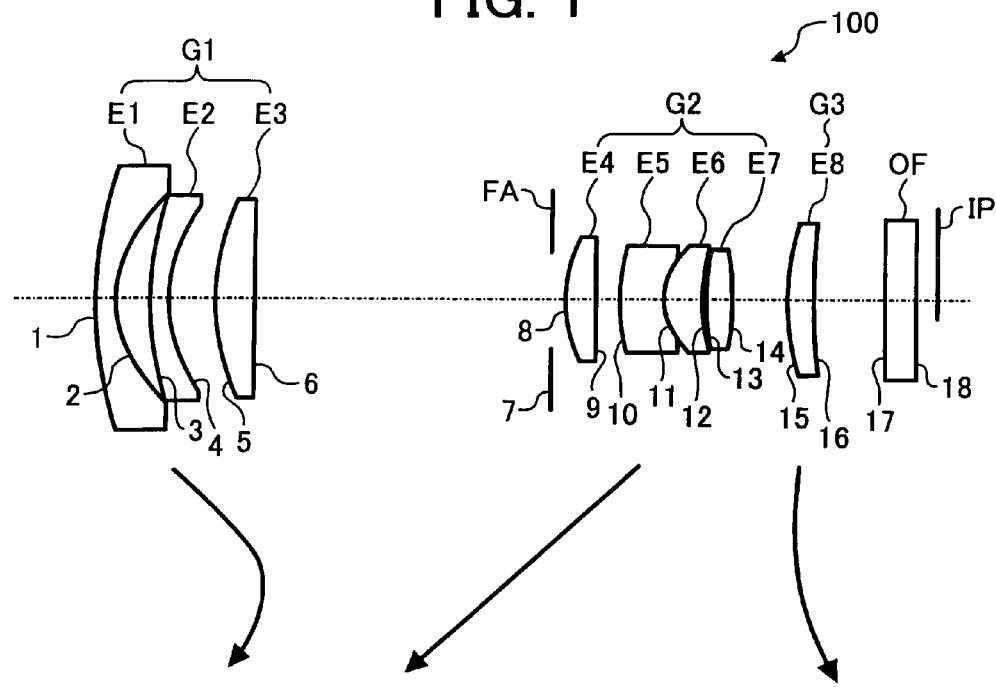
FIG. 1 is a schematic diagram of a zoom lens apparatus according an embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Generally, a zoom lens system having three lens groups according to the present invention, including a negative lens group referred to as a first optical lens group, a positive lens group referred to as a second optical lens group, and a positive lens group referred to as a third optical lens group which are sequentially arranged from a subject in this order, monotonously moves the second optical lens group from the image side towards the subject side and moves the first optical lens group in such a way that a displacement of the image plane caused by the scaling change is corrected when the scaling of the zoom lens system is changed from the short focal length edge to the long focal length edge. Most of the scaling function are executed by the second optical lens group, and the third optical lens group is moved mainly to move an exit pupil away from the image plane.

A desirable zoom lens system having a relatively high resolution while achieving less variations of various kinds of aberrations requires suppression of variations in aberration. In particular, the second optical lens group which is a main scaling-function lens group is needed to be configured such that appropriate aberration corrections have been made through the entire areas in the scaling range of the second optical lens group. One attempt may be an increase of a number of lenses included in the second optical lens group. However, it increases a thickness of the second optical lens group in the light axis direction. This may lead to an insufficient size reduction and also an increase of the cost of the lens system itself.

The second optical lens group according to the present invention includes four lenses which are positive, negative, positive, and positive lenses arranged in this order sequentially from the subject side. This second optical lens group achieves an aberration correction capability superior than the known second optical lens groups having four or fewer lenses. For example, one known conventional second optical lens group includes three lenses which are positive, negative, and positive lenses arranged in this order sequentially from the subject side. Another exemplary known conventional second optical lens group includes three lenses which are positive, positive, and negative lenses arranged in this order sequentially from the subject side. Another exemplary known conventional second optical lens group includes four lenses which are positive, positive, negative, and positive lenses arranged in this order sequentially from the subject side. Another exemplary known conventional second optical lens group includes four lenses which are positive, negative, negative, and positive lenses arranged in this order sequentially from the subject side.

In the second optical lens group according to the present invention, an aperture diaphragm is mounted to a side of the second optical lens group closer to the subject. With this structure, an off-axis light ray passes through a point of a lens surface farther away from a light axis as the lens surface is farther away from the subject. Accordingly, the second optical lens group becomes greatly related to the aberration correction of the off-axis light rays. The second optical lens group according to the present invention has a symmetrical structure as a whole in that the negative-powered lens is sandwiched by positive-powered lenses. The positive-powered lens disposed closer to the image side and having a relatively deep relationship with the aberration corrections with respect to the off-axis light rays is divided into two lenses so as to increase flexibility. Thereby, the aberration corrections with respect to the off-axis light rays can be executed in a preferable manner.

Further, the second optical lens group according to the present invention has a three-group and four-lens structure in which a positive lens having a great radius of curvature facing-the subject side, a negative meniscus lens having a concave surface facing the image side, a positive meniscus lens conjoined with the negative meniscus lens, and a positive lens, which are arranged in this order sequentially from the subject side. The joint of the negative meniscus lens which is the second lens from the subject side and the positive meniscus lens which is the third lens from the subject produces positive effects of suppressing a decentering issue of the lens in the manufacturing process and reducing a number of assembling processes. Further, the negative lens which is the second lens from the subject is given a meniscus form and a positive power is given to the subject side of this lens so that the lenses disposed first and second closest to the subject share a positive power. In addition, the positive lens which is the third lens from the subject is given a meniscus form and a negative power is given to the image side of this lens so that the lenses disposed third and fourth closest to the subject share a negative power. In this way, an excess occurrence of aberration at any specific lens surfaces is prevented so that the second optical lens group satisfies reductions in both the aberration and the sensitivity to the manufacturing errors.

In addition, it becomes possible to ensure that the second optical lens group has a sufficient correction of aberration by satisfying a inequality condition $0.15 < (N_{22} - N_{23}) < 0.40$, in which $N_{22}$ is a refractive index of the negative meniscus lens of the second optical lens group, and $N_{23}$ is a refractive index of the positive meniscus lens of the second optical lens group conjoined with the negative meniscus lens. When a value of $(N_{22} - N_{23})$ is smaller than 0.15, the conjoined lens surface is hardly provided with a sufficient negative power and therefore an image distortion cannot be fully corrected. On the other hand, when the value of $(N_{22} - N_{23})$ is greater than 0.40, the negative meniscus lens surface is required for a extremely high refractive index, causing an increase of the manufacturing cost.

It is more preferable for the second optical lens group to satisfy a inequality condition $0.20 < (N_{22} - N_{23}) < 0.40$.

To perform more sufficient color aberration correction, the second optical lens group needs to satisfy an inequality condition $25 < (v_{22} - v_{23}) < 50$, in which $v_{22}$ is an Abbe number of the negative meniscus lens of the second optical lens group, and $v_{23}$ is an Abbe number of the positive meniscus lens of the second optical lens group conjoined with the negative meniscus lens. When a value of $(v_{22} - v_{23})$ is smaller than 25, it becomes impossible to control the color aberration of the conjoined lens surface and therefore corrections of an on-axis color aberration and a scaling color aberration can hardly be performed at the same time. On the other hand, when a value of $(v_{22} - v_{23})$ is greater than 50, the positive meniscus lens is required for an extremely small dispersion which leads to an increase of the manufacturing cost.

It is more preferable for the second optical lens group to satisfy a inequality condition $30 < (v_{22} - v_{23}) < 50$.

To further improve the image distortion, the second optical lens group preferably satisfies an inequality condition $1.40 < \{(1/r_{21F}) + (1/r_{22F}) + (1/r_{22R})\} * Y' < 2.20$, in which $r_{21F}$ is a radius of curvature with respect to the optical surface, facing the subject, of the closest positive meniscus lens to the subject in the second optical lens group, $r_{22F}$ is a radius of curvature with respect to the optical surface, facing the subject, of the negative meniscus lens in the second optical lens group, $r_{22R}$ is a radius of curvature with respect to conjoined surfaces of the negative meniscus lens and the positive meniscus lens in the second optical lens group, and $Y'$ is a maximum image height.

When the above inequality condition is satisfied, the second optical lens group can sufficiently perform the image distortion correction and can therefore maintain image planeness along the entire zooming area. However, when the value of $\{(1/r_{21F}) + (1/r_{22F}) + (1/r_{22R})\} * Y'$ is greater than 2.20, aberrations occurring at each of the lens surfaces in the second optical lens group become greater which accordingly increase exchanges of aberrations and, as a result, sensitivity to the manufacturing errors may be increased.

It is more preferable for the second optical lens group to satisfy a inequality condition $$1.55 < \{(1/r_{21F}) + (1/r_{22F}) + (1/r_{22R})\} * Y' < 2.05.$$

To further improve the spherical aberration, the astigmatic aberration, and the coma aberration, the second optical lens group preferably satisfies an inequality condition $0.40 < (L_{PN}/L_2) < 0.70$, in which $L_{PN}$ is a distance between a summit of the optical surface, facing the subject, of the closest positive meniscus lens in the second optical lens group and a summit of the conjoined surface of the negative meniscus lens and the positive meniscus lens and $L_2$ is a thickness of the second optical lens group in a light axis direction.

In the second optical lens group, the subject side surface of the positive lens arranged at the position closest to the subject and the conjoined lens surface of the negative meniscus lens and the positive meniscus lens both have relatively small radiuses of curvature and largely exchange aberrations. That is, these lens surfaces are the most contributing lens surfaces to the aberration corrections. To correct the aberration in a preferable manner, the height of the light ray passing through these lens surfaces is important.

When a value of ($L_{PN}/L_2$) is smaller than 0.40, the height of the off-axis light ray becomes too small relative to the image side surface of the negative lens second closest to the subject in the second optical lens group and, in some cases, corrections for the astigmatic aberration and the coma aberration may be insufficiently performed. On the other hand, When the value of ($L_{PN}/L_2$) is greater than 0.70, the height of the on-axis light ray becomes too small relative to the image side surface of the negative lens second closest to the subject in the second optical lens group and, in some cases, corrections for the spherical aberration may be insufficiently performed.

It is more preferable for the second optical lens group to satisfy a inequality condition $0.45<(L_{PN}/L_2)<0.65$.

To improve the balance between the mono-color aberration and the color aberration, it is preferable that the conjoined lens surface of the negative meniscus lens and the positive, meniscus lens in the second optical lens group has the greatest curvature among the lens surfaces included in the second optical lens group. When the curvature of the conjoined lens surface is not greatest in the second optical lens group, it becomes difficult to make a good balance between the on-axis color aberration and the scaling color aberration while maintaining a preferable correction of the color aberration.

To further improve the mono-color aberration, the second optical lens group preferably includes two or more aspheric lenses. These two or more aspheric lenses are arranged at positions such that light rays differently pass through them, thereby increasing flexibility to the aberration correction. In order to achieve the best correction of aberration, the lens surfaces closest to the subject and to the image plane in the second optical lens group are both made aspheric. Since the lens surface closest to the subject in the second optical lens group is near the aperture diaphragm, the off-axis and on-axis light rays are passing through this lens surface almost without separating from each other and therefore this lens surface provided as the aspheric lens surface contributes to the corrections for the spherical aberration and the coma aberration. On the other hand, the lens surface closest to the image plane in the second optical lens group is away from the aperture diaphragm, the off-axis and on-axis light rays are passing through this lens surface with a certain distance away from each other and therefore this lens surface provided as the aspheric lens surface contributes to the corrections for the astigmatic aberration. By thus providing aspheric surface to the two lens surfaces closest to the subject and to the image plane, the respective aspheric surfaces bring effects sufficiently different from each other, thereby dramatically increasing flexibility to the aberration correction.

The present invention can also be realized by applying one of the following three configuration to the zoom lens system.

In one example, a zoom lens system according to an embodiment of the present invention may include a first optical lens group, a second optical lens group, an aperture diaphragm, and a third optical lens group. The first optical lens group has a negative focal length and is arranged at a first position closest to a subject. The second optical lens group has a positive focal length and is arranged at a second position second closest to the subject. The aperture diaphragm is disposed to a subject side of the second optical lens group closer to the subject in a manner such that the aperture diaphragm is movable integrally with the second optical lens group. The third optical lens group has a positive focal length and is arranged at a third position third closest to the subject. In this zoom lens apparatus, the first optical lens group, the second optical lens group, and the third optical lens group move in such a way that a distance between the first optical lens group and the second optical lens group is gradually decreased and a distance between the second optical lens group and the third optical lens group is gradually increased when a scaling of the zoom lens system is changed from a short focal length edge to a long focal length edge. Further, the second optical lens group includes a three-group and four-lens structure which includes a first positive lens, a negative meniscus lens, a positive meniscus lens, and a second positive lens. The first positive lens is arranged at a first sub-position closest to the subject in the second optical lens group and such that a greater-curvature surface of the first positive lens faces the subject. The negative meniscus lens is arranged at a second sub-position second closest to the subject in the second optical lens group and such that a concave of the negative meniscus lens faces the subject. The positive meniscus lens is conjoined with the negative meniscus lens and is arranged at a third sub-position third closest to the subject in the second optical lens group. The second positive lens is arranged at a fourth sub-position fourth closest to the subject in the second optical lens group. Further, the zoom lens system satisfies an inequality condition $1.40<((1/r_{21F})+(1/r_{22F})+(1/r_{22R}))<2.20$, in which $r_{21F}$ is a radius of curvature of a subject-side surface of the first positive lens arranged at the first sub-position in the second optical lens group, $r_{22F}$ is a radius of curvature of a subject-side surface of the negative meniscus lens arranged at the second sub-position in the second optical lens group, $r_{22R}$ is a radius of curvature of a conjoined surface of the negative meniscus lens arranged at the second sub-position and the positive meniscus lens arranged at the third sub-position in the second optical lens group, and Y' is an image height.

In one example, a zoom lens system according to another embodiment of the present invention may include a first optical lens group, a second optical lens group, an aperture diaphragm, and a third optical lens group. The first optical lens group has a negative focal length and is arranged at a first position closest to a subject. The second optical lens group has a positive focal length and is arranged at a second position second closest to the subject. The aperture diaphragm is disposed to a subject side of the second optical lens group closer to the subject in a manner such that the aperture diaphragm is movable integrally with the second optical lens group. The third optical lens group has a positive focal length and is arranged at a third position third closest to the subject. In this zoom lens system, the first optical lens group, the second optical lens group, and the third optical lens group move in such a way that a distance between the first optical lens group and the second optical lens group is gradually decreased and a distance between the second optical lens group and the third optical lens group is gradually increased when a scaling of the zoom lens system is changed from a short focal length edge to a long focal length edge. Further, the second optical lens group includes a three-group and four-lens structure which includes a first positive lens, a first positive lens, a negative meniscus lens, a positive meniscus lens, and a second positive lens. The first positive lens is arranged at a first sub-position closest to the subject in the second optical lens group and such that a greater-curvature surface of the first positive lens faces the subject. The negative meniscus lens is arranged at a second sub-position second closest to the subject in the second optical lens group and such that a concave of the negative meniscus lens faces the subject. The positive meniscus lens is conjoined with the negative meniscus lens and is arranged at a third sub-position third closest to the subject in the second optical lens group. The second positive lens is arranged at a fourth sub-position fourth closest to the subject in the second optical lens group. Further, the zoom lens system satisfies an inequality condition $1.40<(L_{PN}/L_2)<0.70$, in which $L_{PN}$ is a distance between a summit of the subject-side surface of the first positive lens arranged at the first sub-position and a summit of the conjoined surface of the negative meniscus lens arranged at the second sub-position and the positive meniscus lens arranged at the third sub-position in the second optical lens group, and $L_2$ is a thickness of the second optical lens group in a direction of a light axis of the second optical lens group.

In one example, a zoom lens system according to another embodiment of the present invention may include a first optical lens group, a second optical lens group, an aperture diaphragm, and a third optical lens group. The first optical lens group has a negative focal length and is arranged at a first position closest to a subject. The second optical lens group has a positive focal length and is arranged at a second position second closest to the subject. The aperture diaphragm is disposed to a subject side of the second optical lens group closer to the subject in a manner such that the aperture diaphragm is movable integrally with the second optical lens group. The third optical lens group has a positive focal length and is arranged at a third position third closest to the subject. In this zoom lens system, the first optical lens group, the second optical lens group, and the third optical lens group move in such a way that a distance between the first optical lens group and the second optical lens group is gradually decreased and a distance between the second optical lens group and the third optical lens group is gradually increased when a scaling of the zoom lens system is changed from a short focal length edge to a long focal length edge. Further, the second optical lens group includes a three-group and four-lens structure which includes a first positive lens, a negative meniscus lens, a positive meniscus lens, and a second positive lens. The first positive lens is arranged at a first sub-position closest to the subject in the second optical lens group and such that a greater-curvature surface of the first positive lens faces the subject. The negative meniscus lens is arranged at a second sub-position second closest to the subject in the second optical lens group and such that a concave of the negative meniscus lens faces the subject. The positive meniscus lens is conjoined with the negative meniscus lens and is arranged at a third sub-position third closest to the subject in the second optical lens group. The second positive lens is arranged at a fourth sub-position fourth closest to the subject in the second optical lens group. Further, the conjoined surface of the negative meniscus lens arranged at the second sub-position and the positive lens arranged at the third sub-position has a radius of curvature which is greatest among lens surfaces included in the second optical lens group.

By applying one the above-mentioned configuration to the zoom lens system, the effects on the aforementioned aberration corrections can be achieved independently.

Although the features of the present invention are in the second optical lens group of the zoom lens system, as described above, conditions required for the zoom lens system itself to perform a preferable aberration correction are as follows. The first optical lens group includes at least one negative lens having a relatively great curvature facing the subject and at least one positive lens having a relatively great curvature facing the image arranged sequentially in this order from the subject side, in which the negative lens preferably has a aspheric lens surface facing the image. By configuring the first optical lens group in this way, the image distortion can be reduced. Also, by providing an aspheric surface to the lens surface which gives the off-axis light rays a relatively great angle of refraction, particularly, the distortion aberration at the short focal length edge can be suppressed.

More specifically, the first optical lens group can be configured with a three-lens structure including a negative meniscus lens having a convex surface facing the subject, a negative lens having a surface with a relatively great radius of curvature facing the image, and a positive lens having a surface with a relatively great radius of curvature facing the image arranged sequentially in this order from the subject. In this structure, the negative lens has an aspheric lens surface facing the image. With this structure, the aberration correction ability can be further increased and therefore it is advantageous to an attempt to increase an angle of view.

The third optical lens group includes a positive lens having a lens surface with a relatively great curvature facing the subject and having at least one aspheric lens surface. With this structure, the third optical lens group can achieve the correction of the off-axis aberration such as the astigmatic aberration in a preferable manner while suppressing the thickness of the third optical lens group to a minimum extent. In addition, the third optical lens group may slightly be moved to increase flexibility to the aberration correction in the scaling change although it usually be fixed in the scaling change.

In each of exemplary zoom lens systems according to the present invention described below, a maximum image height is 4.65 mm. Also, in each of these zoom lens systems, the aberrations are sufficiently corrected so that each zoom lens system can easily fit to a large number of photoreceptors in a range of from three millions to six millions photoreceptors.

Referring now to the drawings, wherein like reference numerals designate identical or corresponding parts throughout the several views, particularly to FIG. 1, an exemplary zoom lens system 100 according to an embodiment of the present invention is explained. In the discussion below, various characters are used with the following definitions:

f is a focal length of the zoom lens system 100;

F is an F number;

ω is a half angle of view;

R is a radius of curvature;

D is a distance between surfaces;

$N_c$ is a refractive index;

$v_d$ is an Abbe number;

K is a conic constant of an aspheric surface;

$A_4$ is a fourth-order coefficient of an aspheric surface;

$A_6$ is a sixth-order coefficient of an aspheric surface;

$A_8$ is an eighth-order coefficient of an aspheric surface;

$A_{10}$ is a tenth-order coefficient of an aspheric surface;

$A_{12}$ is a twelfth-order coefficient of an aspheric surface;

$A_{14}$ is a fourteenth-order coefficient of an aspheric surface;

$A_{16}$ is a sixteenth-order coefficient of an aspheric surface; and $A_{18}$ is an eighteenth-order coefficient of an aspheric surface. When an inverse of a paraxial curvature radius (i.e., a paraxial curvature) is C and a height from a light ray is H, an aspheric surface X is represented by a following equation.

$$X = \frac{CH^2}{1+\sqrt{1+(1+K)C^2H^2}} + A_4 \cdot H^4 + A_6 \cdot H^6 + A_8 \cdot H^8 +$$
$$A_{10} \cdot H^{10} + A_{12} \cdot H^{12} + A_{14} \cdot H^{14} + A_{16} \cdot H^{16} + A_{18} \cdot H^{18}$$

As shown in FIG. 1, the zoom lens system 100 includes various optical elements including a first lens E1, a second lens E2, a third lens E3, a fourth lens E4, a fifth lens E5, a sixth lens E6, a seventh lens E7, an eighth lens E8, an aperture plate FA, and an optical filter OF. In this example, the first lens E1, the second lens E2, and the third lens E3 form a first optical lens group G1. The fourth lens E4, the fifth lens E5, the sixth lens E6, and the seventh lens E7 form a second optical lens group G2. The eighth lens E8 forms a third optical lens group G3. The lenses included in each of the first, second, and third optical lens groups G1–G3 are supported by a common supporting frame or the like and are integrally moved during a zooming operation of the zoom lens system 100. In order to allow the readers to understand the zooming operation, FIG. 1 schematically shows with arrows moving traces of the first, second, and third optical lens groups G1–G3 from an edge of a short focal length (i.e., a wide-angle edge) to an edge of a long focal length (i.e., a telescopic edge) via a medium focal length. In addition, FIG. 1 also shows optical surfaces of the above-mentioned optical elements. That is, the first lens E1 has an optical surface 1 on one side facing a subject, which is not shown but is positioned left in the drawing, and an optical surface 2 on the other side. The second lens E2 has an optical surface 3 on one side facing the subject and an optical surface 4 on the other side. The third lens E3 has an optical surface 5 on one side facing the subject and an optical surface 6 on the other side. The aperture plate FA has an optical surface 7 on one side facing the subject. The fourth lens E4 has an optical surface 8 on one side facing the subject and an optical surface 9 on the other side. The fifth lens E5 has an optical surface 10 on one side facing the subject and an optical surface 11 on the other side. The sixth lens E6 has an optical surface which is conjoined with the optical surface 11, on one side facing the subject, and an optical surface 12 on the other side. The seventh lens E7 has an optical surface 13 on one side facing the subject and an optical surface 14 on the other side. The eighth lens E8 has an optical surface 15 on one side facing the subject and an optical surface 16 on the other side. The optical filter OF has an optical surface 17 on one side facing the subject and an optical surface 18 on the other side. In FIG. 1, a term IP represents an image plane on which an image is formed.

In the zoom lens system 100 of FIG. 1, the optical elements are arranged in order of increasing distance to a subject; the first lens E1, the second lens E2, the third lens E3, the aperture plate FA, the fourth lens E4, the fifth lens E5, the sixth lens E6, the seventh lens E7, the eighth lens E8, and the optical filter OF. Through these optical elements, an image of the subject is formed at the image plane IP behind the optical filter OF.

The first lens E1 is a negative meniscus lens having a convex surface (i.e., the optical surface 1) on one side facing the subject. The second lens E2 is a negative meniscus lens having a convex surface (i.e., the optical surface 3) on one side facing the subject. The third lens E3 is a plano-convex lens as a positive lens having a convex surface (i.e., the optical surface 5) on one side facing the subject. The first optical lens group G1 including these first, second, and third lenses E1–E3 has a negative focal length as a whole. The fourth lens E4 is a positive meniscus lens having a convex surface (i.e., the optical surface 8) on one side facing the subject. The fifth lens E5 is a negative meniscus lens having a convex surface (i.e., the optical surface 10) on one side facing the subject. The sixth lens E6 is a positive meniscus lens having a convex surface (i.e., the optical surface 11) on one side facing the subject. The seventh lens E7 is a double-convex lens as a positive lens. The second optical lens group G2 including the fourth, fifth, sixth, and seventh lenses E4–E7 has a positive focal length as a whole. In the second optical lens group G2, the fifth and sixth lenses E5 and E6 are conjoined and a structure of the second optical lens group G2 is referred to as a four-element-in-three-group structure. The eight lens E8 is a positive meniscus lens having a convex surface (i.e., the optical surface 15) on one side facing the subject. The third optical lens group G3 including the eight lens E8 has a positive focal length. The aperture plate FA is arranged at a side of the second optical lens group G2 facing the subject and is moved together with the second optical lens group G2.

In a scaling change from a short focal length edge to a long focal length edge, the second optical lens group G2 which mainly executes a scaling function is monotonously moved from the image side to the subject side, the first optical lens group G1 is moved in a direction to correct a displacement of the image position caused by the scaling change, and the third optical lens group G3 is moved mainly to move an exit pupil away from the image plane. More specifically, the first, second, and third optical lens groups G1–G3 are moved when a scaling is changed from a short focal length edge to a long focal length edge such that a distance between the first and second optical lens groups G1 and G2 is gradually decreased and that a distance between the second and third optical lens groups G2 and G3 is gradually increased.

In the zoom lens system 100, the focal length f of the entire system, the F number F, and the half view angle ω are variable by zooming. The focal length varies in a range of from 5.93 to 16.78, the F number F in a range of from 2.57 to 4.37, and the half view angle ω in a range of from 39.42 to 15.62. Optical characteristics of the above-mentioned optical surfaces 1–18 of the optical elements are as shown below in Table 1.

TABLE 1

| No. | R | D | N | ν | Element |
|---|---|---|---|---|---|
| 01 | 29.662 | 1.20 | 1.77250 | 49.62 | 1st lens, 1st group |
| 02 | 8.256 | 2.33 | | | 1st lens, 1st group |
| 03 | 26.681 | 1.20 | 1.80610 | 40.74 | 2nd lens, 1st group |
| 04* | 8.434 | 2.86 | | | 2nd lens, 1st group |
| 05 | 16.288 | 2.46 | 1.76182 | 26.61 | 3rd lens, 1st group |
| 06 | ∞ | $D_a$ | | | 3rd lens, 1st group |
| 07 | aperture | 1.00 | | | |
| 08* | 8.987 | 1.83 | 1.77250 | 49.62 | 4th lens, 2nd group |
| 09 | 32.778 | 1.70 | | | 4th lens, 2nd group |
| 10 | 13.503 | 2.76 | 1.84666 | 23.78 | 5th lens, 2nd group |
| 11 | 5.000 | 2.57 | 1.48749 | 70.44 | 5th/6th lens, 2nd group |
| 12 | 12.108 | 0.30 | | | 6th lens, 2nd group |
| 13 | 28.558 | 1.52 | 1.60311 | 60.69 | 7th lens, 2nd group |
| 14* | −30.794 | $D_b$ | | | 7th lens, 2nd group |
| 15* | 17.395 | 1.77 | 1.58913 | 61.25 | 8th lens, 3rd group |
| 16 | 73.084 | $D_c$ | | | 8th lens, 3rd group |
| 17 | ∞ | 1.98 | 1.51680 | 64.20 | filter |
| 18 | ∞ | | | | filter |

In Table 1, numbers in a column of No. represent the numbers of the optical surfaces, and the surfaces 4, 8, 14, and 15 indicated with a suffix of an asterisk mark (*) are aspheric and their parameters are as indicated below in Table 1A.

TABLE 1A

<the optical surface 4>

$K = 0.0$
$A_4 = -2.78493 \times 10^{-4}$,
$A_6 = -4.57252 \times 10^{-6}$
$A_8 = 2.85397 \times 10^{-7}$
$A_{10} = -1.90695 \times 10^{-8}$
$A_{12} = 5.07288 \times 10^{-10}$
$A_{14} = -1.90194 \times 10^{-12}$
$A_{16} = -1.68241 \times 10^{-13}$
$A_{18} = 2.31370 \times 10^{-15}$ <the optical surface 8>

$K = 0.0$
$A_4 = -8.54569 \times 10^{-5}$,
$A_6 = -3.60180 \times 10^{-7}$
$A_8 = -3.63648 \times 10^{-8}$
$A_{10} = 9.61335 \times 10^{-10}$ <the optical surface 14>

$K = 0.0$
$A_4 = 1.67112 \times 10^{-4}$,
$A_6 = 6.29478 \times 10^{-6}$
$A_8 = -3.96383 \times 10^{-7}$
$A_{10} = 2.14222 \times 10^{-8}$ <the optical surface 15>

$K = 0.0$
$A_4 = -1.51122 \times 10^{-5}$,
$A_6 = 2.94709 \times 10^{-6}$
$A_8 = -1.16281 \times 10^{-7}$
$A_{10} = 2.05071 \times 10^{-9}$ In Table 1, $D_a$ represents a distance between the first optical lens group G1 and the aperture plate FA integrated with the second optical lens group G2. Likewise, $D_b$ represents a distance between the second optical lens group G2 and the third optical lens group G3, and $D_c$ is a distance between the third optical lens group G3 and the optical filter OF. These distances $D_a$, $D_b$, and $D_c$ are varied by zooming, as indicated below in Table 2.

TABLE 2

| D | $f_1 = 5.93$ | $f_2 = 9.97$ | $f_3 = 16.78$ |
|---|---|---|---|
| $D_a$ | 19.122 | 7.794 | 1.500 |
| $D_b$ | 3.702 | 9.038 | 19.126 |
| $D_c$ | 4.682 | 4.621 | 3.181 |

In Table 2, $f_1$ is a short focal length edge, $f_2$ is a medium focal length edge, and $f_3$ is a long focal length edge.

In addition, the optical elements of the zoom lens system 100 satisfy the following equations;

$(N_{22}-N_{23})=0.359$, $(\nu_{23}-\nu_{22})=46.7$, $\{(1/r_{21F})+(1/r_{22F})+(1/r_{22R})\}xY'=1.79$, and $(L_{PN}/L_2)=0.589$.

In the above equations, $N_{22}$ represents a refractive index of the negative meniscus lens of the second optical lens group G2 (i.e., the fifth lens E5), and $N_{23}$ represents a refractive index of the positive meniscus lens of the second optical lens group G2 (i.e., the sixth lens E6) conjoined with the negative meniscus lens (i.e., the fifth lens E5). Further, $\nu_{22}$ represents an Abbe number of the negative meniscus lens of the second optical lens group G2 (i.e., the fifth lens E5), and $\nu_{23}$ represents an Abbe number of the positive meniscus lens of the second optical lens group G2 (i.e., the sixth lens E6) conjoined with the negative meniscus lens (i.e., the fifth lens E5). Further, $r_{21F}$ represents a radius of curvature with respect to the optical surface, facing the subject, of the closest positive meniscus lens to the subject in the second optical lens group G2 (i.e., the fourth lens E4). Further, $r_{22F}$ represents a radius of curvature with respect to the optical surface, facing the subject, of the negative meniscus lens (i.e., the fifth lens E5) in the second optical lens group. Further, $r_{22R}$ represents a radius of curvature with respect to conjoined surfaces of the negative meniscus lens (i.e., the fifth lens E5) and the positive meniscus lens (i.e., the sixth lens E6) in the second optical lens group. Further, Y' represents a maximum image height. Further, $L_{PN}$ represents a distance between a summit of the optical surface, facing the subject, of the closest positive meniscus lens (i.e., the fourth lens E4) in the second optical lens group and a summit of the conjoined surface of the negative meniscus lens (i.e., the fifth lens E5) and the positive meniscus lens (i.e., the sixth lens E6). Further, $L_2$ represents a thickness of the second optical lens group in a light axis direction.

Figures 2A, 2B, 2C, 2D:
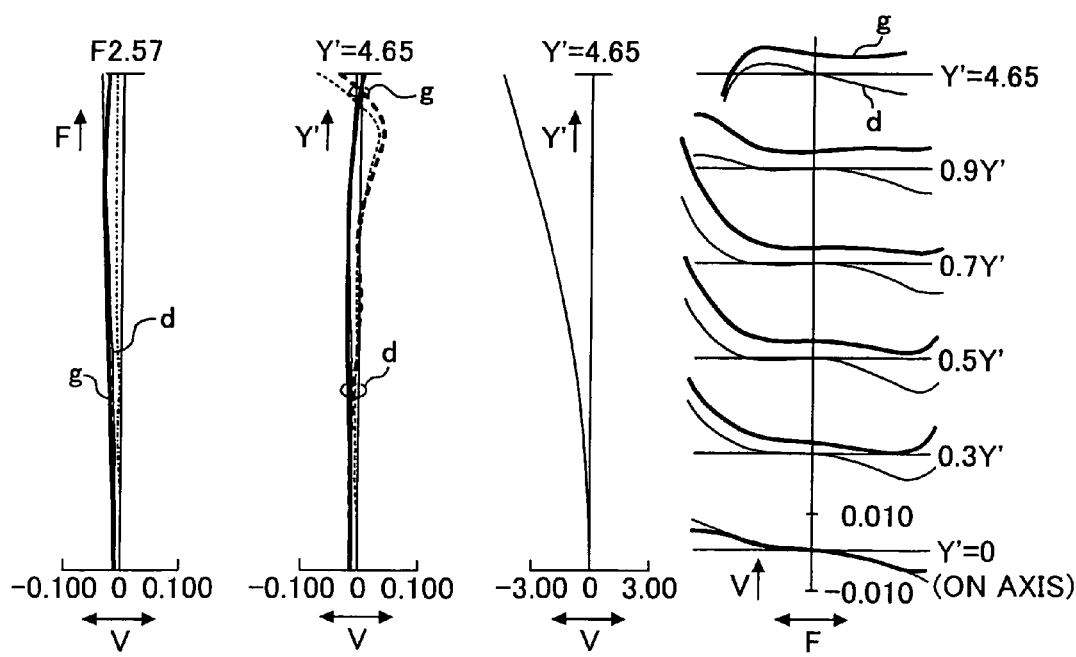
FIGS. 2A–2D are graphs of aberration curves that are a spherical aberration, an astigmatic aberration, a distortion aberration, and a coma aberration, respectively, measured at a short focal length edge of the zoom lens apparatus of FIG. 1.

FIGS. 2A–2D show graphs of aberration curves that are a spherical aberration, an astigmatic aberration, a distortion aberration, and a coma aberration, respectively, measured at the short focal length edge of the zoom lens system 100 of FIG. 1. Likewise, FIGS. 3A–3D show these aberration curves at the medium focal length edge and FIGS. 4A–4D show the aberration curves at the long focal length edge of the zoom lens system 100 of FIG. 1. In each of FIGS. 2A, 3A, and 4A, a thin solid line indicated by a letter d represents a spherical aberration curve of a d-line, a thick solid line indicated by a letter g represents a spherical aberration curve of a g-line, and a thin chain line represents a sine condition. In each of FIGS. 2B, 3B, and 4B, a thin solid line indicated by the letter d represents an astigmatic aberration curve of the d-line and a thin dotted line indicated by the letter d represents an astigmatic aberration of a sagittal ray. Further, in each of FIGS. 2B, 3B, and 4B, a thick solid line indicated by the letter g represents an astigmatic aberration curve of the g-line and a thick dotted line indicated by the letter g represents an astigmatic aberration curve of the sagittal ray. In each of FIGS. 2D, 3D, and 4D, a thin solid line indicated by the letter d represents a coma aberration curve of the d-line and a thick solid line indicated by the letter g represents a coma aberration curve of the g-line. Horizontal axes of the graphs in FIGS. 2A–2C, 3A–3C, and 4A–4C and vertical axes of the graphs in FIGS. 2D, 3D, and 4D represent a relative value V of aberrations. Vertical axes of the graphs in FIGS. 2A, 3A, and 4A and horizontal axes of the graphs in FIGS. 2D, 3D, and 4D represent a ratio of a pupil height (i.e., the F number). Vertical axes of the graphs in FIGS. 2B and 2C, 3B and 3C, and 4B and 4C represent a ratio of image heights.

According to FIGS. 2A–2D, 3A–3D, and 4A–4D, the zoom lens system 100 of FIG. 1 appropriately corrects or suppresses the respective aberrations.

According to FIGS. 2A–2D, 3A–3D, and 4A–4D, the zoom lens system 100 of FIG. 1 appropriately corrects or suppresses the respective aberrations.

Next, a zoom lens system 200 according to another embodiment of the present invention is explained with reference to FIG. 5. Reference symbols and numerals are given to optical elements of the zoom lens system 200 in a manner independent from those given to the zoom lens system 100 of FIG. 1. This is to avoid an intricate handling of increasing digits of the reference symbols and numbers. As a result of it, the same reference symbols or numbers in different figures do not necessarily mean a common optical element.

Figure 5:
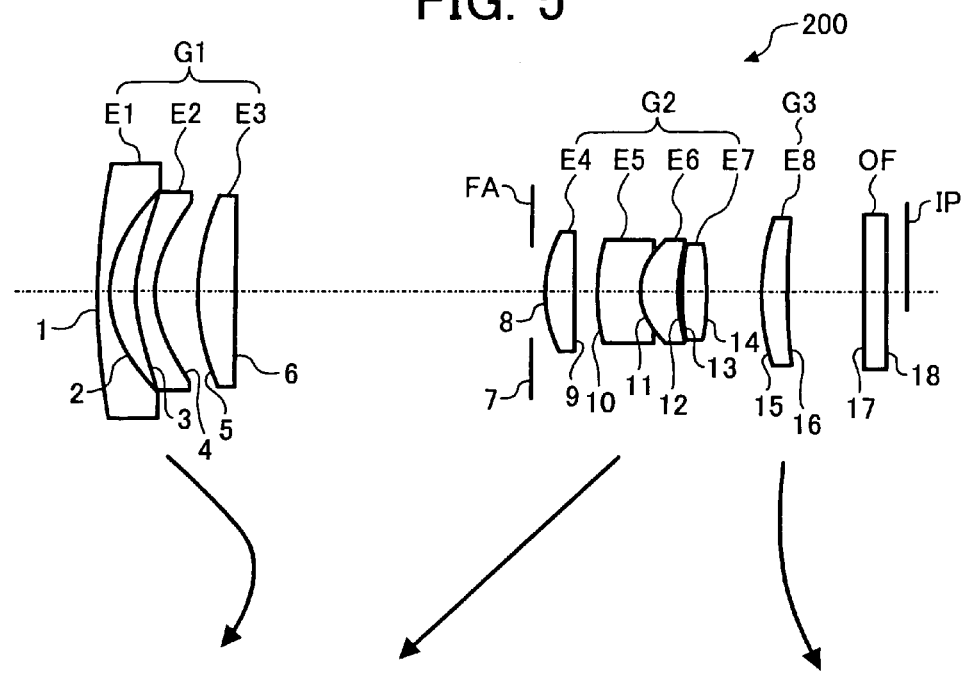
FIG. 5 is a schematic diagram of another zoom lens apparatus according another embodiment of the present invention.

As shown in FIG. 5, the zoom lens system 200 includes various optical elements including a first lens E1, a second lens E2, a third lens E3, a fourth lens 4 a fifth lens E5, a sixth lens E6, a seventh lens E7, an eighth lens E5, an aperture plate FA, and an optical filter OF. In this example, the first lens E1, the second lens E2, and the third lens E3 form a first optical lens group G1. The fourth lens E4, the fifth lens E5, the sixth lens E6, and the seventh lens E7 form a second optical lens group G2. The eighth lens E8 forms a third optical lens group G3. The lenses included in each of the first, second, and third optical lens groups G1–G3 are supported by a common supporting frame or the like and are integrally moved during a zooming operation of the zoom lens system 200. In order to allow the readers to understand the zooming operation, FIG. 5 schematically shows with arrows moving traces of the first, second, and third optical lens groups G1–G3 from an edge of a short focal length (i.e., a wide-angle edge) to an edge of a long focal length (i.e., a telescopic edge) via a medium focal length. In addition, FIG. 5 also shows optical surfaces of the above-mentioned optical elements. That is, the first lens E1 has an optical surface 1 on one side facing a subject, which is not shown but is positioned left in the drawing, and an optical surface 2 on the other side. The second lens E2 has an optical surface 3 on one side facing the subject and an optical surface 4 on the other side. The third lens E3 has an optical surface 5 on one side facing the subject and an optical surface 6 on the other side. The aperture plate FA has an optical surface 7 on one side facing the subject. The fourth lens E4 has an optical surface 8 on one side facing the subject and an optical surface 9 on the other side. The fifth lens E5 has an optical surface 10 on one side facing the subject and an optical surface 11 on the other side. The sixth lens E6 has an optical surface which is conjoined with the optical surface 11, on one side facing the subject, and an optical surface 12 on the other side. The seventh lens E7 has an optical surface 13 on one side facing the subject and an optical surface 14 on the other side. The eighth lens E8 has an optical surface 15 on one side facing the subject and an optical surface 16 on the other side. The optical filter OF has an optical surface 17 on one side facing the subject and an optical surface 18 on the other side. In FIG. 5, a term IP represents an image plane on which an image is formed.

In the zoom lens system 200 of FIG. 5, the optical elements are arranged in order of increasing distance to a subject; the first lens E1, the second lens E2, the third lens E3, the aperture plate FA, the fourth lens E4, the fifth lens E5, the sixth lens E6, the seventh lens E7, the eighth lens E8, and the optical filter OF. Through these optical elements, an image of the subject is formed at the image plane IP behind the optical filter OF.

The first lens E1 is a negative meniscus lens having a convex surface (i.e., the optical surface 1) on one side facing the subject. The second lens E2 is a negative meniscus lens having a convex surface (i.e., the optical surface 3) on one side facing the subject. The third lens E3 is a double-convex lens as a positive lens having a convex surface (i.e., the optical surface 5) with a greater curvature on one side facing the subject and another convex surface (i.e., the optical surface 6) on the other side. The first optical lens group G1 including these first, second, and third lenses E1–E3 has a negative focal length as a whole. The fourth lens E4 is a positive meniscus lens having a convex surface (i.e., the optical surface 8) on one side facing the subject. The fifth lens E5 is a negative meniscus lens having a convex surface (i.e., the optical surface 10) on one side facing the subject. The sixth lens E6 is a positive meniscus lens having a convex surface (i.e., the optical surface 11) on one side facing the subject. The seventh lens E7 is a double-convex lens as a positive lens. The second optical lens group G2 including the fourth, fifth, sixth, and seventh lenses E4–E7 has a positive focal length as a whole. In the second optical lens group G2, the fifth and sixth lenses E5 and E6 are conjoined and a structure of the second optical lens group G2 is referred to as a four-element-in-three-group structure. The eight lens E8 is a positive meniscus lens having a convex surface (i.e., the optical surface 15) on one side facing the subject. The third optical lens group G3 including the eight lens E8 has a positive focal length. The aperture plate FA is arranged at a side of the second optical lens group G2 facing the subject and is moved together with the second optical lens group G2.

In a scaling change from a short focal length edge to a long focal length edge, the second optical lens group G2 which mainly executes a scaling function is monotonously moved from the image side to the subject side, the first optical lens group G1 is moved in a direction to correct a displacement of the image position caused by the scaling change, and the third optical lens group G3 is moved mainly to move an exit pupil away from the image plane. More specifically, the first, second, and third optical lens groups G1–G3 are moved when a scaling is changed from a short focal length edge to a long focal length edge such that a distance between the first and second optical lens groups G1 and G2 is gradually decreased and that a distance between the second and third optical lens groups G2 and G3 is gradually increased.

In the zoom lens system 200, the focal length f of the entire system, the F number F, and the half view angle $\omega$ are variable by zooming. The focal length f varies in a range of from 5.97 to 16.86, the F number F in a range of from 2.58 to 4.34, and the half view angle $\omega$ in a range of from 39.21 to 15.54. Optical characteristics of the above-mentioned optical surfaces 1–18 of the optical elements are as shown below in Table 3.

TABLE 3

| No. | R | D | N | ν | Element |
|---|---|---|---|---|---|
| 01 | 55.932 | 1.20 | 1.77250 | 49.62 | 1st lens, 1st group |
| 02 | 9.292 | 1.61 | | | 1st lens, 1st group |
| 03 | 17.366 | 1.20 | 1.80610 | 40.74 | 2nd lens, 1st group |
| 04* | 7.227 | 2.86 | | | 2nd lens, 1st group |
| 05 | 15.005 | 2.68 | 1.74077 | 27.76 | 3rd lens, 1st group |
| 06 | −2231.448 | $D_a$ | | | 3rd lens, 1st group |
| 07 | aperture | 1.00 | | | |
| 08* | 9.417 | 1.81 | 1.77250 | 49.62 | 4th lens, 2nd group |
| 09 | 44.394 | 1.57 | | | 4th lens, 2nd group |
| 10 | 15.037 | 3.20 | 1.84666 | 23.78 | 5th lens, 2nd group |
| 11 | 5.000 | 2.70 | 1.51680 | 64.20 | 5th/6th lens, 2nd group |
| 12 | 11.073 | 0.33 | | | 6th lens, 2nd group |
| 13 | 32.514 | 1.46 | 1.69680 | 55.46 | 7th lens, 2nd group |
| 14* | −30.513 | $D_b$ | | | 7th lens, 2nd group |
| 15* | 16.788 | 1.85 | 1.58913 | 61.25 | 8th lens, 3rd group |
| 16 | 77.251 | $D_c$ | | | 8th lens, 3rd group |
| 17 | ∞ | 1.43 | 1.51680 | 64.20 | filter |
| 18 | ∞ | | | | filter |

In Table 3, numbers in a column of No. represent the numbers of the optical surfaces, and the surfaces 4, 8, 14, and 15 indicated with a suffix of an asterisk mark (*) are aspheric and their parameters are as indicated below in Table 3A.

TABLE 3A

<the optical surface 4>

$K = 0.0$
$A_4 = -3.65774 \times 10^{-4}$,
$A_6 = -6.98063 \times 10^{-6}$
$A_8 = 3.31239 \times 10^{-7}$
$A_{10} = -2.10223 \times 10^{-8}$
$A_{12} = 4.75955 \times 10^{-10}$
$A_{14} = -1.53407 \times 10^{-12}$
$A_{16} = -1.26119 \times 10^{-13}$
$A_{18} = 1.38231 \times 10^{-15}$ <the optical surface 8>

$K = 0.0$
$A_4 = -8.29422 \times 10^{-5}$,
$A_6 = -3.49540 \times 10^{-7}$
$A_8 = -4.22060 \times 10^{-8}$
$A_{10} = 1.43521 \times 10^{-9}$ <the optical surface 14>

$K = 0.0$
$A_4 = 8.62336 \times 10^{-5}$,
$A_6 = 1.08403 \times 10^{-5}$
$A_8 = -1.14432 \times 10^{-6}$
$A_{10} = 5.55500 \times 10^{-8}$ <the optical surface 15>

$K = 0.0$
$A_4 = -1.42708 \times 10^{-5}$,
$A_6 = 3.15235 \times 10^{-6}$
$A_8 = -1.33726 \times 10^{-7}$
$A_{10} = 2.51387 \times 10^{-9}$ In Table 3, $D_a$ represents a distance between the first optical lens group G1 and the aperture plate FA integrated with the second optical lens group G2. Likewise, $D_b$ represents a distance between the second optical lens group G2 and the third optical lens group G3, and $D_c$ is a distance between the third optical lens group G3 and the optical filter OF. These distances $D_a$, $D_b$, and $D_c$ are varied by zooming, as indicated below in Table 4.

TABLE 4

| D | $f_1 = 5.97$ | $f_2 = 10.04$ | $f_3 = 16.86$ |
|---|---|---|---|
| $D_a$ | 19.779 | 7.964 | 1.500 |
| $D_b$ | 3.698 | 8.630 | 18.336 |
| $D_c$ | 4.634 | 4.767 | 3.483 |

In Table 4, $f_1$ is a short focal length edge, $f_2$ is a medium focal length edge, and $f_3$ is a long focal length edge.

In addition, the optical elements of the zoom lens system 200 satisfy the following equations;

$(N_{22}-N_{23})=0.330$, $(\nu_{23}-\nu_{22})=40.4$, $\{(1/r_{21F})+(1/r_{22F})+(1/r_{22R})\} \times Y'=1.73$, and $(L_{PN}/L_2)=0.594$.

In the above equations, $N_{22}$ represents a refractive index of the negative meniscus lens of the second optical lens group G2 (i.e., the fifth lens E5), and $N_{23}$ represents a refractive index of the positive meniscus lens of the second optical lens group G2 (i.e., the sixth lens E6) conjoined with the negative meniscus lens (i.e., the fifth lens E5). Further, $\nu_{22}$ represents an Abbe number of the negative meniscus lens of the second optical lens group G2 (i.e., the fifth lens E5), and $\nu_{23}$ represents an Abbe number of the positive meniscus lens of the second optical lens group G2 (i.e., the sixth lens E6) conjoined with the negative meniscus lens (i.e., the fifth lens E5). Further, $r_{21F}$ represents a radius of curvature with respect to the optical surface, facing the subject, of the closest positive meniscus lens to the subject in the second optical lens group G2 (i.e., the fourth lens E4). Further, $r_{22F}$ represents a radius of curvature with respect to the optical surface, facing the subject, of the negative meniscus lens (i.e., the fifth lens E5) in the second optical lens group. Further, $r_{22R}$ represents a radius of curvature with respect to conjoined surfaces of the negative meniscus lens (i.e., the fifth lens E5) and the positive meniscus lens (i.e., the sixth lens E6) in the second optical lens group. Further, Y' represents a maximum image height. Further, $L_{PN}$ represents a distance between a summit of the optical surface, facing the subject, of the closest positive meniscus lens (i.e., the fourth lens E4) in the second optical lens group and a summit of the conjoined surface of the negative meniscus lens (i.e., the fifth lens ED) and the positive meniscus lens (i.e., the sixth lens E6). Further, $L_2$ represents a thickness of the second optical lens group in a light axis direction.

Figures 6A, 6B, 6C, 6D:
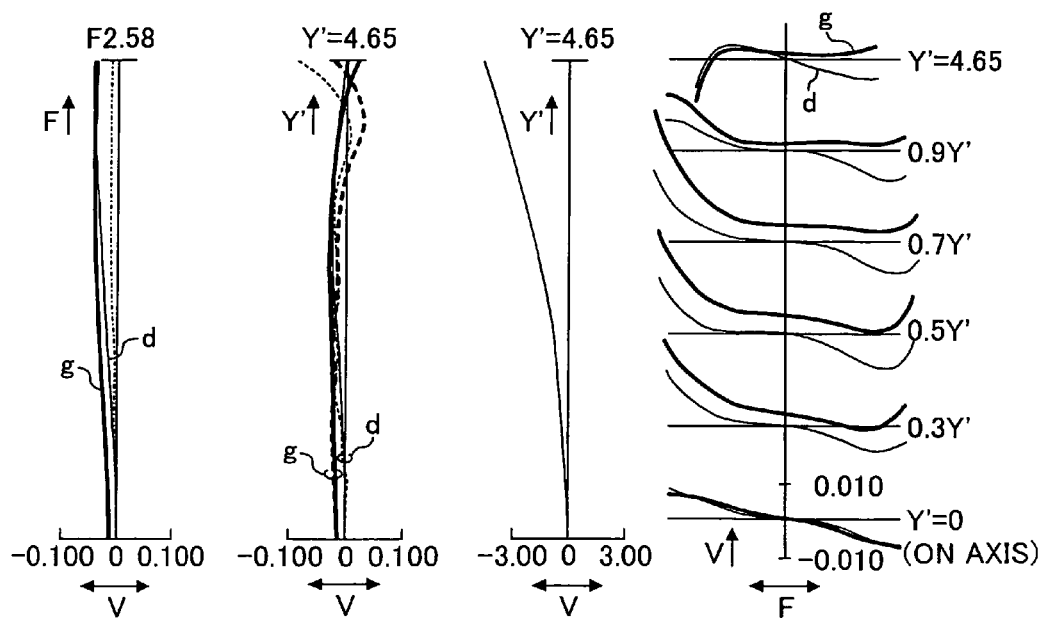
FIGS. 6A–6D are graphs of aberration curves that are a spherical aberration, an astigmatic aberration, a distortion aberration, and a coma aberration, respectively, measured at a short focal length edge of the zoom lens apparatus of FIG. 5.

FIGS. 6A–6D show graphs of aberration curves that are a spherical aberration, an astigmatic aberration, a distortion aberration, and a coma aberration, respectively, measured at the short focal length edge of the zoom lens system 200 of FIG. 5. Likewise, FIGS. 7A–7D show these aberration curves at the medium focal length edge and FIGS. 8A–8D show the aberration curves at the long focal length edge of the zoom lens system 200 of FIG. 5. In each of FIGS. 6A, 7A, and 8A, a thin solid line indicated by a letter d represents a spherical aberration curve of a d-line, a thick solid line indicated by a letter g represents a spherical aberration curve of a g-line, and a thin chain line represents a sine condition. In each of FIGS. 6B, 7B, and 8B, a thin solid line indicated by the letter d represents an astigmatic aberration curve of the d-line and a thin dotted line indicated by the letter d represents an astigmatic aberration of a sagittal ray. Further, in each of FIGS. 6B, 7B, and 8B, a thick solid line indicated by the letter g represents an astigmatic aberration curve of the g-line and a thick dotted line indicated by the letter g represents an astigmatic aberration curve of the sagittal ray. In each of FIGS. 6D, 7D, and 8D, a thin solid line indicated by the letter d represents a coma aberration curve of the d-line and a thick solid line indicated by the letter g represents a coma aberration curve of the g-line. Horizontal axes of the graphs in FIGS. 6A–6C, 7A–7C, and 8A–8C and vertical axes of the graphs in FIGS. 6D, 7D, and 8D represent a relative value V of aberrations. Vertical axes of the graphs in FIGS. 6A, 7A, and 8A and horizontal axes of the graphs in FIGS. 6D, 7D, and 8D represent a ratio of a pupil height (i.e., the F number). Vertical axes of the graphs in FIGS. 6B and 6C, 7B and 7C, and 8B and 8C represent a ratio of image heights.

According to FIGS. 6A–6D, 7A–7D, and 8A–8D, the zoom lens system 200 of FIG. 5 appropriately corrects or suppresses the respective aberrations.

Next, a zoom lens system 300 according to another embodiment of the present invention is explained with reference to FIG. 9. Reference symbols and numerals are given to optical elements of the zoom lens system 300 in a manner independent from those given to each of the zoom lens systems 100 and 200 of FIGS. 1 and 5, respectively. This is to avoid an intricate handling of increasing digits of the reference symbols and numbers. As a result of it, the same reference symbols or numbers in different figures are not necessarily a common optical element.

Figure 9:
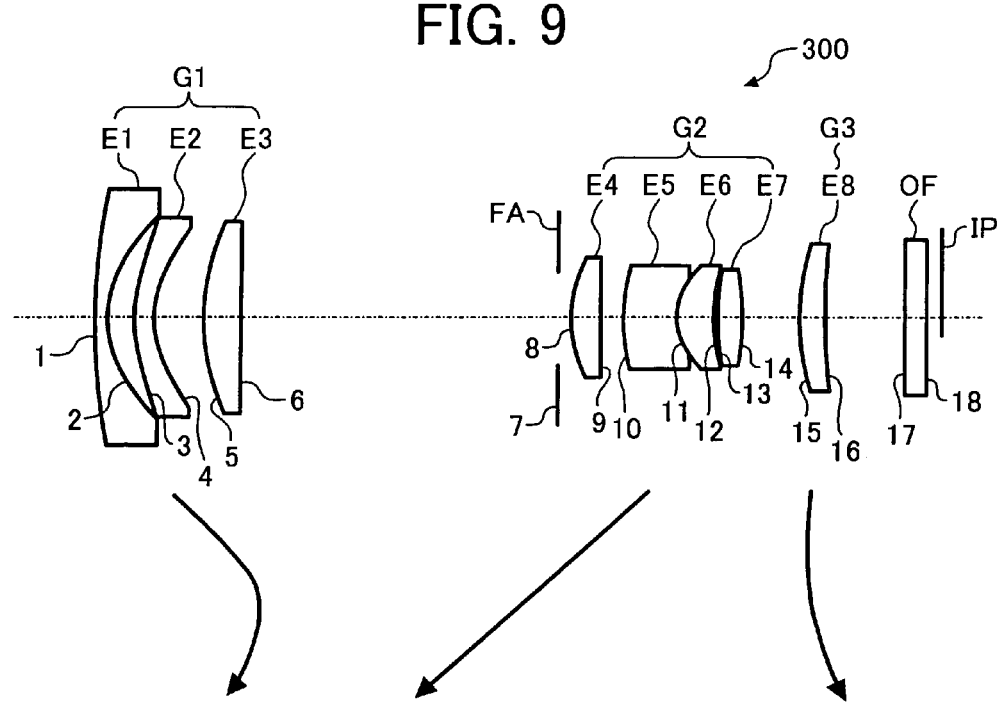
FIG. 9 is a schematic diagram of a zoom lens apparatus according another embodiment of the present invention.

As shown in FIG. 9, the zoom lens system 300 includes various optical elements including a first lens E1, a second lens E2, a third lens E3, a fourth lens E4, a fifth lens E5, a sixth lens E6, a seventh lens E7, an eighth lens E8, an aperture plate FA, and an optical filter OF. In this example, the first lens E1, the second lens E2, and the third lens E3 form a first optical lens group G1. The fourth lens E4, the fifth lens E5, the sixth lens E6, and the seventh lens E7 form a second optical lens group G2. The eighth lens E8 forms a third optical lens group G3. The lenses included in each of the first, second, and third optical lens groups G1–G3 are supported by a common supporting frame or the like and are integrally moved during a zooming operation of the zoom lens system 300. In order to allow the readers to understand the zooming operation, FIG. 9 schematically shows with arrows moving traces of the first, second, and third optical lens groups G1–G3 from an edge of a short focal length (i.e., a wide-angle edge) to an edge of a long focal length (i.e., a telescopic edge) via a medium focal length. In addition, FIG. 9 also shows optical surfaces of the above-mentioned optical elements. That is, the first lens E1 has an optical surface 1 on one side facing a subject, which is not shown but is positioned left in the drawing, and an optical surface 2 on the other side. The second lens E2 has an optical surface 3 on one side facing the subject and an optical surface 4 on the other side. The third lens E3 has an optical surface 5 on one side facing the subject and an optical surface 6 on the other side. The aperture plate FA has an optical surface 7 on one side facing the subject. The fourth lens E4 has an optical surface 8 on one side facing the subject and an optical surface 9 on the other side. The fifth lens E5 has an optical surface 10 on one side facing the subject and an optical surface 11 on the other side. The sixth lens E6 has an optical surface which is conjoined with the optical surface 11, on one side facing the subject, and an optical surface 12 on the other side. The seventh lens E7 has an optical surface 13 on one side facing the subject and an optical surface 14 on the other side. The eighth lens E8 has an optical surface 15 on one side facing the subject and an optical surface 16 on the other side. The optical filter OF has an optical surface 17 on one side facing the subject and an optical surface 18 on the other side. In FIG. 9, a term IP represents an image plane on which an image is formed.

In the zoom lens system 300 of FIG. 9, the optical elements are arranged in order of increasing distance to a subject; the first lens E1, the second lens E2, the third lens E3, the aperture plate FA, the fourth lens E4, the fifth lens E5, the sixth lens E6, the seventh lens E7, the eighth lens E8, and the optical filter OF. Through these optical elements, an image of the subject is formed at the image plane IP behind the optical filter OF.

The first lens E1 is a negative meniscus lens having a convex surface (i.e., the optical surface 1) on one side facing the subject. The second lens E2 is a negative meniscus lens having a convex surface (i.e., the optical surface 3) on one side facing the subject. The third lens E3 is a double-convex lens as a positive lens having a convex surface (i.e., the optical surface 5) with a greater curvature on one side facing the subject and another convex surface (i.e., the optical surface 6) on the other side. The first optical lens group G1 including these first, second, and third lenses E1–E3 has a negative focal length as a whole. The fourth lens E4 a positive meniscus lens having a convex surface (i.e., the optical surface 8) on one side facing the subject. The fifth lens E5 is a negative meniscus lens having a convex surface (i.e., the optical surface 10) on one side facing the subject. The sixth lens E6 is a positive meniscus lens having a convex surface (i.e., the optical surface 11) on one side facing the subject. The seventh lens E7 is a double-convex lens as a positive lens. The second optical lens group G2 including the fourth, fifth, sixth, and seventh lenses E4–E7 has a positive focal length as a whole. In the second optical lens group G2, the fifth and sixth lenses E5 and E6 are conjoined and a structure of the second optical lens group G2 is referred to as a four-element-in-three-group structure. The eight lens E8 is a positive meniscus lens having a convex surface (i.e., the optical surface 15) on one side facing the subject. The third optical lens group G3 including the eight lens E8 has a positive focal length. The aperture plate FA is arranged at a side of the second optical lens group G2 facing the subject and is moved together with the second optical lens group G2.

In a scaling change from a short focal length edge to a long focal length edge, the second optical lens group G2 which mainly executes a scaling function is monotonously moved from the image side to the subject side, the first optical lens group G1 is moved in a direction to correct a displacement of the image position caused by the scaling change, and the third optical lens group G3 is moved mainly to move an exit pupil away from the image plane. More specifically, the first, second, and third optical lens groups G1–G3 are moved when a scaling is changed from a short focal length edge to a long focal length edge such that a distance between the first and second optical lens groups G1 and G2 is gradually decreased and that a distance between the second and third optical lens groups G2 and G3 is gradually increased.

In the zoom lens system 300, the focal length f of the entire system, the F number F, and the half view angle ω are variable by zooming. The focal length f varies in a range of from 5.97 to 16.86, the F number F in a range of from 2.60 to 4.36, and the half view angle ω in a range of from 39.23 to 15.53. Optical characteristics of the above-mentioned optical surfaces 1–18 of the optical elements are as shown below in Table 5.

TABLE 5

| No. | R | D | N | ν | Element |
|---|---|---|---|---|---|
| 01 | 59.839 | 1.20 | 1.77250 | 49.62 | 1st lens, 1st group |
| 02 | 9.437 | 1.51 | | | 1st lens, 1st group |
| 03 | 16.832 | 1.20 | 1.80610 | 40.74 | 2nd lens, 1st group |
| 04* | 7.140 | 2.99 | | | 2nd lens, 1st group |
| 05 | 15.218 | 2.65 | 1.74077 | 27.76 | 3rd lens, 1st group |
| 06 | −7565.401 | $D_a$ | | | 3rd lens, 1st group |
| 07 | aperture | 1.00 | | | |
| 08* | 9.387 | 1.88 | 1.77250 | 49.62 | 4th lens, 2nd group |
| 09 | 86.781 | 1.75 | | | 4th lens, 2nd group |
| 10 | 19.477 | 2.90 | 1.80518 | 25.46 | 5th lens, 2nd group |
| 11 | 5.000 | 2.76 | 1.51680 | 64.20 | 5th/6th lens, 2nd group |
| 12 | 11.679 | 0.31 | | | 6th lens, 2nd group |
| 13 | 32.514 | 1.46 | 1.62299 | 58.12 | 7th lens, 2nd group |
| 14* | −28.433 | $D_b$ | | | 7th lens, 2nd group |
| 15* | 16.631 | 1.84 | 1.58913 | 61.25 | 8th lens, 3rd group |
| 16 | 73.885 | $D_c$ | | | 8th lens, 3rd group |
| 17 | ∞ | 1.43 | 1.51680 | 64.20 | filter |
| 18 | ∞ | | | | filter |

In Table 5, numbers in a column of No. represent the numbers of the optical surfaces, and the surfaces 4, 8, 14, and 15 indicated with a suffix of an asterisk mark (*) are aspheric and their parameters a-re as indicated below in Table 5A.

TABLE 5A

<the optical surface 4>

K = 0.0
$A_4 = -3.74529 \times 10^{-4}$,
$A_6 = -7.07111 \times 10^{-6}$
$A_8 = 3.31080 \times 10^{-7}$
$A_{10} = -2.12578 \times 10^{-8}$
$A_{12} = 4.72698 \times 10^{-10}$
$A_{14} = -1.41429 \times 10^{-12}$
$A_{16} = -1.23287 \times 10^{-13}$
$A_{18} = 1.26129 \times 10^{-15}$ <the optical surface 8>

K = 0.0
$A_4 = -9.27221 \times 10^{-5}$,
$A_6 = -2.00691 \times 10^{-7}$
$A_8 = -5.99813 \times 10^{-8}$
$A_{10} = 1.95311 \times 10^{-9}$ <the optical surface 14>

K = 0.0
$A_4 = 1.17533 \times 10^{-4}$,
$A_6 = 1.28941 \times 10^{-5}$
$A_8 = -1.26885 \times 10^{-6}$
$A_{10} = 6.09645 \times 10^{-8}$ <the optical surface 15>

K = 0.0
$A_4 = -1.91397 \times 10^{-5}$,
$A_6 = 3.80313 \times 10^{-6}$
$A_8 = -1.67517 \times 10^{-7}$
$A_{10} = 3.09028 \times 10^{-9}$ In Table 5, $D_a$ represents a distance between the first optical lens group G1 and the aperture plate FA integrated with the second optical lens group G2. Likewise, $D_b$ represents a distance between the second optical lens group G2 and the third optical lens group G3, and $D_c$ is a distance between the third optical lens group G3 and the optical filter OF. These distances $D_a$, $D_b$, and $D_c$ are varied by zooming, as indicated below in Table 6.

TABLE 6

| D | $f_1 = 5.97$ | $f_2 = 10.04$ | $f_3 = 16.86$ |
|---|---|---|---|
| $D_a$ | 19.901 | 8.018 | 1.500 |
| $D_b$ | 3.700 | 8.581 | 18.198 |
| $D_c$ | 4.517 | 4.685 | 3.494 |

In Table 6, $f_1$ is a short focal length edge, $f_2$ is a medium focal length edge, and $f_3$ is a long focal length edge.

In addition, the optical elements of the zoom lens system 300 satisfy the following equations;

$(N_{22}-N_{23})=0.288$, $(v_{23}-v_{22})=35.7$, $\{(1/r_{21F})+(1/r_{22F})+(1/r_{22R})\} \times Y'=1.66$, and $(L_{PN}/L_2)=0.590$.

In the above equations, $N_{22}$ represents a refractive index of the negative meniscus lens of the second optical lens group G2 (i.e., the fifth lens E5), and $N_{23}$ represents a refractive index of the positive meniscus lens of the second optical lens group G2 (i.e., the sixth lens E6) conjoined with the negative meniscus lens (i.e., the fifth lens E5). Further, $v_{22}$ represents an Abbe number of the negative meniscus lens of the second optical lens group G2 (i.e., the fifth lens E5), and $v_{23}$ represents an Abbe number of the positive meniscus lens of the second optical lens group G2 (i.e., the sixth lens E6) conjoined with the negative meniscus lens (i.e., the fifth lens E5). Further, $r_{21F}$ represents a radius of curvature with respect to the optical surface, facing the subject, of the closest positive meniscus lens to the subject in the second optical lens group G2 (i.e., the fourth lens E4). Further, $r_{22F}$ represents a radius of curvature with respect to the optical surface, facing the subject, of the negative meniscus lens (i.e., the fifth lens E5) in the second optical lens group. Further, $r_{22R}$ represents a radius of curvature with respect to conjoined surfaces of the negative meniscus lens (i.e., the fifth lens E5) and the positive meniscus lens (i.e., the sixth lens E6) in the second optical lens group. Further, Y' represents a maximum image height. Further, $L_{PN}$ represents a distance between a summit of the optical surface, facing the subject, of the closest positive meniscus lens (i.e., the fourth lens E4) in the second optical lens group and a summit of the conjoined surface of the negative meniscus lens (i.e., the fifth lens E5) and the positive meniscus lens (i.e., the sixth lens E6). Further, $L_2$ represents a thickness of the second optical lens group in a light axis direction.

Figures 10A, 10B, 10C, 10D:
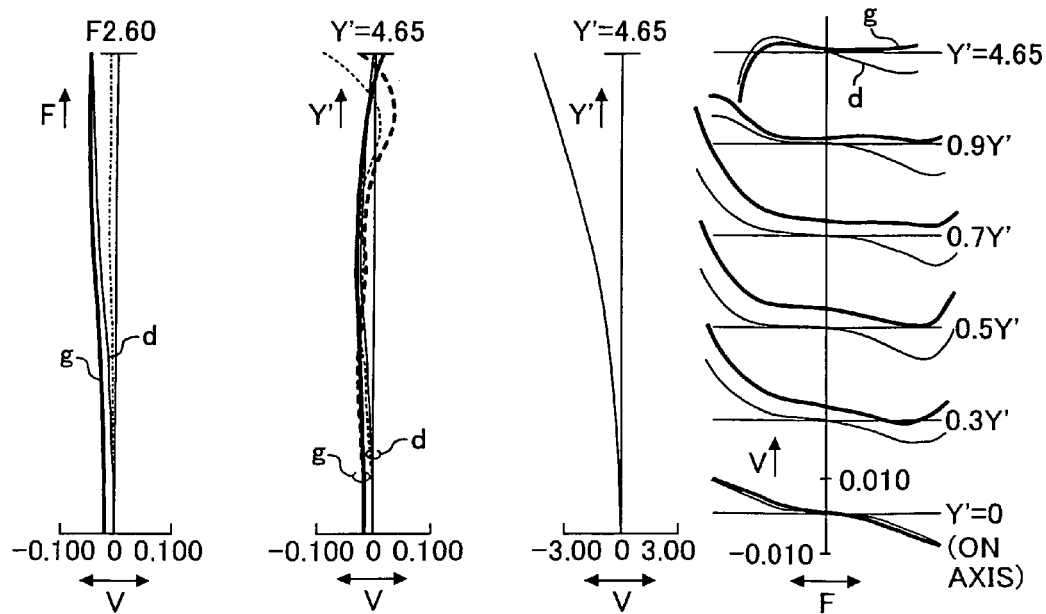
FIGS. 10A–10D are graphs of aberration curves that are a spherical aberration, an astigmatic aberration, a distortion aberration, and a coma aberration, respectively, measured at a short focal length edge of the zoom lens apparatus of FIG. 9.

FIGS. 10A–10D show graphs of aberration curves that are a spherical aberration, an astigmatic aberration, a distortion aberration, and a coma aberration, respectively, measured at the short focal length edge of the zoom lens system 300 of FIG. 9. Likewise, FIGS. 11A–11D show these aberration curves at the medium focal length edge and FIGS. 12A–12D show the aberration curves at the long focal length edge of the zoom lens system 300 of FIG. 9. In each of FIGS. 10A, 11A, and 12A, a thin solid line indicated by a letter d represents a spherical aberration curve of a d-line, a thick solid line indicated by a letter g represents a spherical aberration curve of a g-line, and a thin chain line represents a sine condition. In each of FIGS. 10B, 11B, and 12B, a thin solid line indicated by the letter d represents an astigmatic aberration curve of the d-line and a thin dotted line indicated by the letter d represents an astigmatic aberration of a sagittal ray. Further, in each of FIGS. 10B, 11B, and 12B, a thick solid line indicated by the letter g represents an astigmatic aberration curve of the g-line and a thick dotted line indicated by the letter g represents an astigmatic aberration curve of the sagittal ray. In each of FIGS. 10D, 11D, and 12D, a thin solid line indicated by the letter d represents a coma aberration curve of the d-line and a thick solid line indicated by the letter g represents a coma aberration curve of the g-line. Horizontal axes of the graphs in FIGS. 10A–10C, 11A–11C, and 12A–12C and vertical axes of the graphs in FIGS. 10D, 11D, and 12D represent a relative value V of aberrations. Vertical axes of the graphs in FIGS. 10A, 11A, and 12A and horizontal axes of the graphs in FIGS. 10D, 11D, and 12D represent a ratio of a pupil height (i.e., the F number). Vertical axes of the graphs in FIGS. 10B and 10C, 11B and 11C, and 12B and 12C represent a ratio of image heights.

According to FIGS. 10A–10D, 11A–11D, and 12A–12D, the zoom lens system 300 of FIG. 9 appropriately corrects or suppresses the respective aberrations.

Next, a zoom lens system 400 according to another embodiment of the present invention is explained with reference to FIG. 13. Reference symbols and numerals are given to optical elements of the zoom lens system 400 in a manner independent from those given to each of the zoom lens systems 100, 200, and 300 of FIGS. 1, 5, and 9, respectively. This is to avoid an intricate handling of increasing digits of the reference symbols and numbers. As a result of it, the same reference symbols or numbers in different figures are not necessarily a common optical element.

Figure 13:
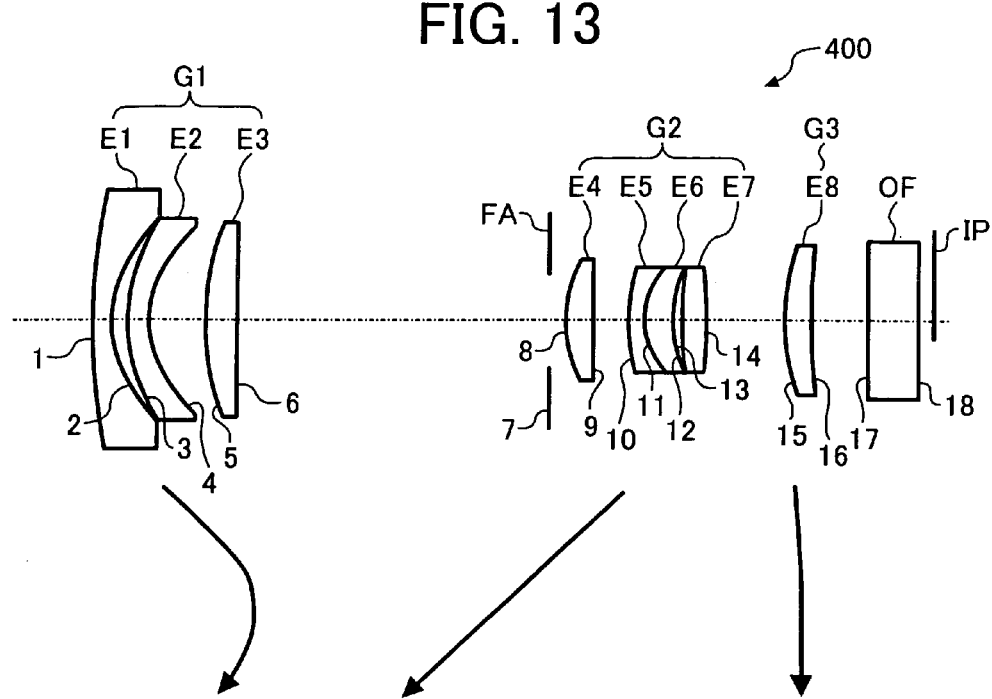
FIG. 13 is a schematic diagram of a zoom lens apparatus according another embodiment of the present invention.

As shown in FIG. 13, the zoom lens system 400 includes various optical elements including a first lens E1, a second lens E2, a third lens E3, a fourth lens E4, a fifth lens E5, a sixth lens E6, a seventh lens E7, an eighth lens E8, an aperture plate FA, and an optical filter OF. In this example, the first lens E1, the second lens E2, and the third lens E3, form a first optical lens group G1. The fourth lens E4, the fifth lens E5, the sixth lens E6, and the seventh lens E7 form a second optical lens group G2. The eighth lens E8 forms a third optical lens group G3. The lenses included in each of the first, second, and third optical lens groups G1–G3 are supported by a common supporting frame or the like and are integrally moved during a zooming operation of the zoom lens system 400. In order to allow the readers to understand the zooming operation, FIG. 13 schematically shows with arrows moving traces of the first, second, and third optical lens groups G1–G3 from an edge of a short focal length (i.e., a wide-angle edge) to an edge of a long focal length (i.e., a telescopic edge) via a medium focal length. In addition, FIG. 4 also shows optical surfaces of the above-mentioned optical elements. That is, the first lens E1 has an optical surface 1 on one side facing a subject, which is not shown but is positioned left in the drawing, and an optical surface 2 on the other side. The second lens E2 has an optical surface 3 on one side facing the subject and an optical surface 4 on the other side. The third lens E3 has an optical surface 5 on one side facing the subject and an optical surface 6 on the other side. The aperture plate FA has an optical surface 7 on one side facing the subject. The fourth lens E4 has an optical surface 8 on one side facing the subject and an optical surface 9 on the other side. The fifth lens E5 has an optical surface 10 on one side facing the subject and an optical surface 11 on the other side. The sixth lens E6 has an optical surface which is conjoined with the optical surface 11, on one side facing the subject, and an optical surface 12 on the other side. The seventh lens E7 has an optical surface 13 on one side facing the subject and an optical surface 14 on the other side. The eighth lens E8 has an optical surface 15 on one side facing the subject and an optical surface 16 on the other side. The optical filter OF has an optical surface 17 on one side facing the subject and an optical surface 18 on the other side. In FIG. 13, a term IP represents an image plane on which an image is formed.

In the zoom lens system 400 of FIG. 13, the optical elements are arranged in order of increasing distance to a subject; the first lens E1, the second lens E2, the third lens E3, the aperture plate FA, the fourth lens E4, the fifth lens E5, the sixth lens E6, the seventh lens E7, the eighth lens E8, and the optical filter OF. Through these optical elements, an image of the subject is formed at the image plane IP behind the optical filter OF.

The first lens E1 is a negative meniscus lens having a convex surface (i.e., the optical surface 1) on one side facing the subject. The second lens E2 is a negative meniscus lens having a convex surface (i.e., the optical surface 3) on one side facing the subject. The third lens E3 is a positive meniscus lens having a convex surface (i.e., the optical surface 5) on one side facing the subject. The first optical lens group G1 including these first, second, and third lenses E1–E3 has a negative focal length as a whole. The fourth lens E4 a positive meniscus lens having a convex surface (i.e., the optical surface 8) on one side facing the subject. The fifth lens E5 is a negative meniscus lens having a convex surface (i.e., the optical surface 10) on one side facing the subject. The sixth lens E6 is a positive meniscus lens having a convex surface (i.e., the optical surface 11) on one side facing the subject. The seventh lens E7 is a double-convex lens as a positive lens. The second optical lens group G2 including the fourth, fifth, sixth, and seventh lenses E4–E7 has a positive focal length as a whole. In the second optical lens group G2, the fifth and sixth lenses E5 and E6 are conjoined and a structure of the second optical lens group G2 is referred to as a four-element-in-three-group structure. The eight lens E8 is a positive meniscus lens having a convex surface (i.e., the optical surface 15) on one side facing the subject. The third optical lens group G3 including the eight lens E8 has a positive focal length. The aperture plate FA is arranged at a side of the second optical lens group G2 facing the subject and is moved together with the second optical lens group G2.

In a scaling change from a short focal length edge to a long focal length edge, the second optical lens group G2 which mainly executes a scaling Junction is monotonously moved from the image side to the subject side, the first optical lens group G1 is moved in a direction to correct a displacement of the image position caused by the scaling change, and the third optical lens group G3 is moved mainly to move an exit pupil away from the image plane. More specifically, the first, second, and third optical lens groups G1–G3 are moved when a scaling is changed from a short focal length edge to a long focal length edge such that a distance between the first and second optical lens groups G1 and G2 is gradually decreased and that a distance between the second and third optical lens groups G2 and G3 is gradually increased.

In the zoom lens system 400, the focal length f of the entire system, the F number F, and the half view angle ω are variable by zooming. The focal length f varies in a range of from 5.97 to 16.88, the F number F in a range of from 2.68 to 4.42, and the half view angle ω in a range of from 39.20 to 15.52. Optical characteristics of the above-mentioned optical surfaces 1–18 of the optical elements are as shown below in Table 7.

TABLE 7

| No. | R | D | N | ν | Element |
|---|---|---|---|---|---|
| 01 | 51.310 | 1.20 | 1.74330 | 49.22 | 1st lens, 1st group |
| 02 | 9.499 | 1.12 | | | 1st lens, 1st group |
| 03 | 14.486 | 1.20 | 1.80610 | 40.74 | 2nd lens, 1st group |
| 04* | 6.911 | 3.47 | | | 2nd lens, 1st group |
| 05 | 15.461 | 2.06 | 1.84666 | 23.78 | 3rd lens, 1st group |
| 06 | 56.433 | $D_a$ | | | 3rd lens, 1st group |
| 07 | aperture | 1.00 | | | |
| 08* | 8.571 | 1.81 | 1.74330 | 49.33 | 4th lens, 2nd group |
| 09 | 38.021 | 2.22 | | | 4th lens, 2nd group |
| 10 | 10.292 | 1.00 | 1.84666 | 23.78 | 5th lens, 2nd group |
| 11 | 4.918 | 1.83 | 1.48749 | 70.44 | 5th/6th lens, 2nd group |
| 12 | 8.816 | 0.57 | | | 6th lens, 2nd group |
| 13 | 22.000 | 1.61 | 1.48749 | 70.44 | 7th lens, 2nd group |
| 14* | −33.647 | $D_b$ | | | 7th lens, 2nd group |
| 15* | 13.767 | 1.83 | 1.51680 | 64.20 | 8th lens, 3rd group |
| 16 | 39.344 | $D_c$ | | | 8th lens, 3rd group |
| 17 | ∞ | 3.33 | 1.51680 | 64.20 | filter |
| 18 | ∞ | | | | filter |

In Table 7, numbers in a column of No. represent the numbers of the optical surfaces, and the surfaces 4, 8, 14, and 15 indicated with a suffix of an asterisk mark (*) are aspheric and their parameters are as indicated below in Table 7A.

TABLE 7A

<the optical surface 4>

K = 0.0
$A_4 = -3.502130 \times 10^{-4}$,
$A_6 = -8.45461 \times 10^{-6}$
$A_8 = 3.87166 \times 10^{-7}$
$A_{10} = -2.37791 \times 10^{-8}$
$A_{12} = 4.86388 \times 10^{-10}$
$A_{14} = -3.79112 \times 10^{-13}$
$A_{16} = -1.52048 \times 10^{-13}$
$A_{18} = 1.32883 \times 10^{-15}$ <the optical surface 8>

K = 0.0
$A_4 = -9.80638 \times 10^{-5}$,
$A_6 = -3.44779 \times 10^{-7}$
$A_8 = -4.47522 \times 10^{-8}$
$A_{10} = -8.37430 \times 10^{-10}$ <the optical surface 14>

K = 0.0
$A_4 = 1.83538 \times 10^{-4}$,
$A_6 = 6.09812 \times 10^{-7}$
$A_8 = 3.72360 \times 10^{-7}$
$A_{10} = -1.70939 \times 10^{-8}$ <the optical surface 15>

K = 0.0
$A_4 = -4.21513 \times 10^{-5}$,
$A_6 = 2.95947 \times 10^{-6}$
$A_8 = -1.23500 \times 10^{-7}$
$A_{10} = 2.32351 \times 10^{-9}$ In Table 7, $D_a$ represents a distance between the first optical lens group G1 and the aperture plate FA integrated with the second optical lens group G2. Likewise, $D_b$ represents a distance between the second optical lens group G2 and the third optical lens group G3, and $D_c$ is a distance between the third optical lens group G3 and the optical filter OF. These distances $D_a$, $D_b$, and $D_c$ are varied by zooming, as indicated below in Table 8.

TABLE 8

| D | $f_1 = 5.97$ | $f_2 = 10.05$ | $f_3 = 16.88$ |
|---|---|---|---|
| $D_a$ | 20.111 | 8.930 | 2.078 |
| $D_b$ | 4.759 | 10.445 | 19.078 |
| $D_c$ | 3.457 | 3.056 | 3.054 |

In Table 8, $f_1$ is a short focal length edge, $f_2$ is a medium focal length edge, and $f_3$ is a long focal length edge.

In addition, the optical elements of the zoom lens system 400 satisfy the following equations;

$(N_{22}-N_{23})=0.359$, $(v_{23}-v_{22})=46.7$, $\{(1/r_{21F})+(1/r_{22F})+(1/r_{22R})\} \times Y'=1.94$, and $(L_{PN}/L_2)=0.556$.

In the above equations, $N_{22}$ represents a refractive index of the negative meniscus lens of the second optical lens group G2 (i.e., the fifth lens E5), and $N_{23}$ represents a refractive index of the positive meniscus lens of the second optical lens group G2 (i.e., the sixth lens E6) conjoined with the negative meniscus lens (i.e., the fifth lens E5). Further, $v_{22}$ represents an Abbe number of the negative meniscus lens of the second optical lens group G2 (i.e., the fifth lens E5), and $v_{23}$ represents an Abbe number of the positive meniscus lens of the second optical lens group G2 (i.e., the sixth lens E6) conjoined with the negative meniscus lens (i.e., the fifth lens E5). Further, $r_{21F}$ represents a radius of curvature with respect to the optical surface, facing the subject, of the closest positive meniscus lens to the subject in the second optical lens group G2 (i.e., the fourth lens E4). Further, $r_{22F}$ represents a radius of curvature with respect to the optical surface, facing the subject, of the negative meniscus lens (i.e., the fifth lens E5) in the second optical lens group. Further, $r_{22R}$ represents a radius of curvature with respect to conjoined surfaces of the negative meniscus lens (i.e., the fifth lens E5) and the positive meniscus lens (i.e., the sixth lens E6) in the second optical lens group. Further, Y' represents a maximum image height. Further, $L_{PN}$ represents a distance between a summit of the optical surface, facing the subject, of the closest positive meniscus lens (i.e., the fourth lens E4) in the second optical lens group and a summit of the conjoined surface of the negative meniscus lens (i.e., the fifth lens E5) and the positive meniscus lens (i.e., the sixth lens E6). Further, $L_2$ represents a thickness of the second optical lens group in a light axis direction.

Figures 14A, 14B, 14C, 14D:
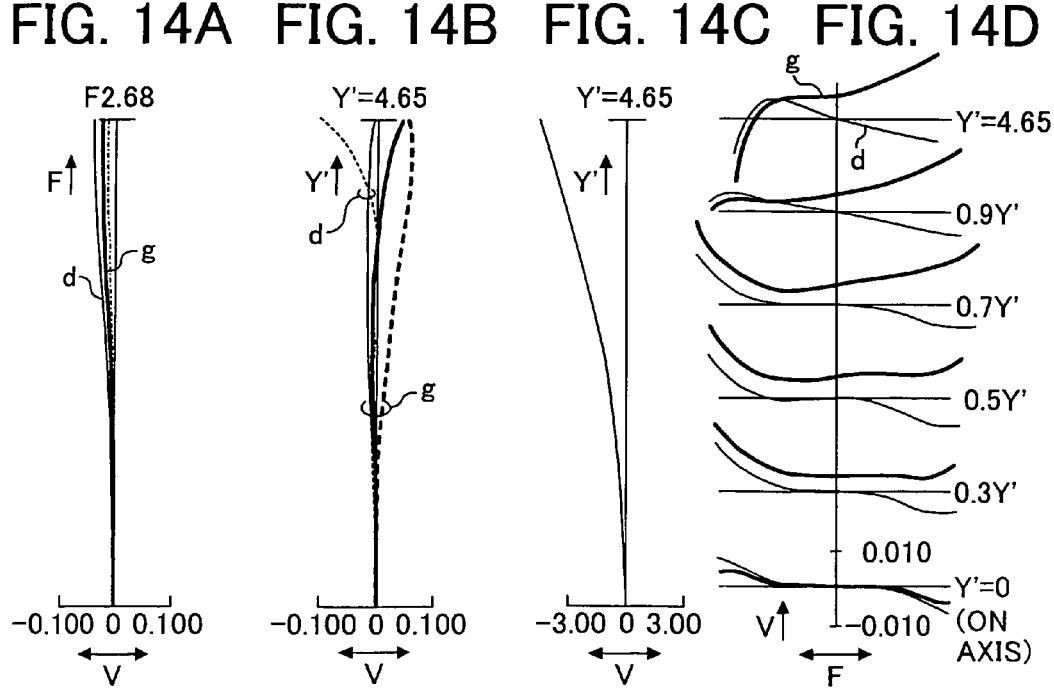
FIGS. 14A–14D are graphs of aberration curves that are a spherical aberration, an astigmatic aberration, a distortion aberration, and a coma aberration, respectively, measured at a short focal length edge of the zoom lens apparatus of FIG. 13.

FIGS. 14A–14D show graphs of aberration curves that are a spherical aberration, an astigmatic aberration, a distortion aberration, and a coma aberrations respectively, measured at the short focal length edge of the zoom lens system 400 of FIG. 13. Likewise, FIGS. 15A–15D show these aberration curves at the medium focal length edge and FIGS. 16A–16D show the aberration curves at the long focal length edge of the zoom lens system 400 of FIG. 13. In each of FIGS. 14A, 15A, and 16A, a thin solid line indicated by a letter d represents a spherical aberration curve of a d-line, a thick solid line indicated by a letter g represents a spherical aberration curve of a g-line, and a thin chain line represents a sine condition. In each of FIGS. 14B, 15B, and 16B, a thin solid line indicated by the letter d represents an astigmatic aberration curve of the d-line and a thin dotted line indicated by the letter d represents an astigmatic aberration of a sagittal ray. Further, in each of FIGS. 14B, 15B, and 16B, a thick solid line indicated by the letter g represents an astigmatic aberration curve of the g-line and a thick dotted line indicated by the letter g represents an astigmatic aberration curve of the sagittal ray. In each of FIGS. 14D, 15D, and 16D, a thin solid line indicated by the letter d represents a coma aberration curve of the d-line and a thick solid line indicated by the letter g represents a coma aberration curve of the g-line. Horizontal axes of the graphs in FIGS. 14A–14C, 15A–15C, and 16A–16C and vertical axes of the graphs in FIGS. 14D, 15D, and 16D represent a relative value V of aberrations. Vertical axes of the graphs in FIGS. 14A, 15A, and 16A and horizontal axes of the graphs in FIGS. 14D, 15D, and 16D represent a ratio of a pupil height (i.e., the F number). Vertical axes of the graphs in FIGS. 14B and 14C, 15B and 15C, and 16B and 16C represent a ratio of image heights.

According to FIGS. 14A–14D, 15A–15D, and 16A–16D, the zoom lens system 400 of FIG. 13 appropriately corrects or suppresses the respective aberrations.

Next, a zoom lens system 500 according to another embodiment of the present invention is explained with reference to FIG. 17. Reference symbols and numerals are given to optical elements of the zoom lens system 500 in a manner independent from those given to each of the zoom lens systems 100, 200, 300, and 400 of FIGS. 1, 5, 9, and 13, respectively. This is to avoid an intricate handling of increasing digits of the reference symbols and numbers. As a result of it, the same reference symbols or numbers in different figures are not necessarily a common optical element.

Figure 17:
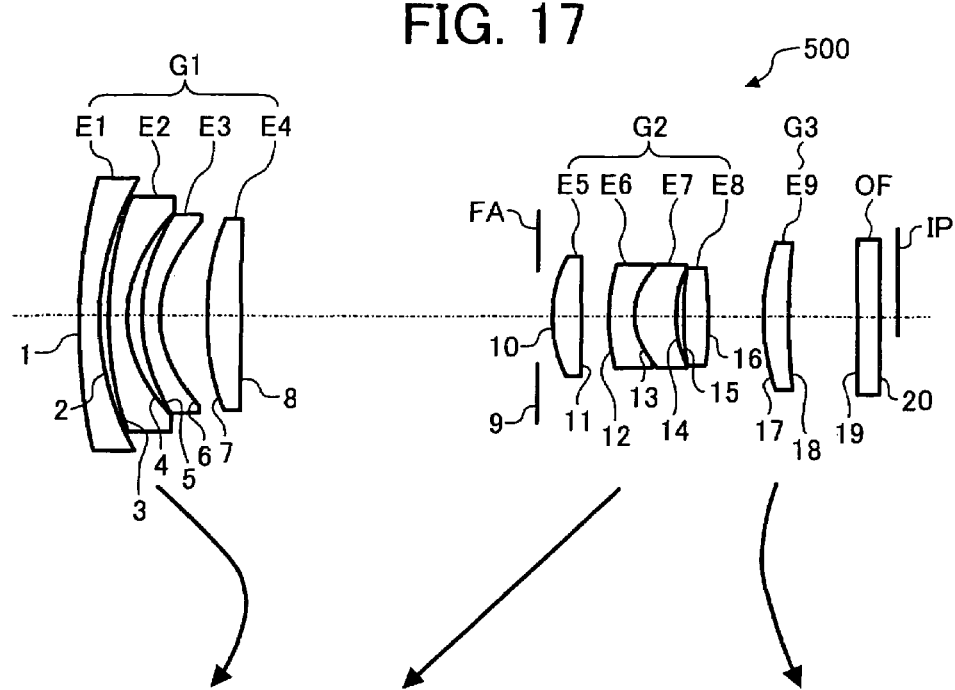
FIG. 17 is a schematic diagram of a zoom lens apparatus according another embodiment of the present invention.

As shown in FIG. 17, the zoom lens system 500 includes various optical elements including a first lens E1, a second lens E2, a third lens E3, a fourth lens E4, a fifth lens E5, a sixth lens E6, a seventh lens E7, an eighth lens E8, a ninth lens E9, an aperture plate FA, and an optical filter OF. In this example, the first lens E1, the second lens E2, the third lens E3, and the fourth lens E4 form a first optical lens group G1. The fifth lens E5, the sixth lens E6, the seventh lens E7, and the eighth lens E8 form a second optical lens group G2. The ninth lens E9 forms a third optical lens group G3. The lenses included in each of the first, second, and third optical lens groups G1–G3 are supported by a common supporting frame or the like and are integrally moved during a zooming operation of the zoom lens system 500. In order to allow the readers to understand the zooming operation, FIG. 17 schematically shows with arrows moving traces of the first, second, and third optical lens groups G1–G3 from an edge of a short focal length (i.e., a wide-angle edge) to an edge of a long focal length (i.e., a telescopic edge) via a medium focal length. In addition, FIG. 17 also shows optical surfaces of the above-mentioned optical elements. That is, the first lens E1 has an optical surface 1 on one side facing a subject, which is not shown but is positioned left in the drawing, and an optical surface 2 on the other side. The second lens E2 has an optical surface 3 on one side facing the subject and an optical surface 4 on the other side. The third lens E3 has an optical surface 5 on one side facing the subject and an optical surface 6 on the other side. The fourth lens E4 has an optical surface 7 on one side facing the subject and an optical surface 8 on the other side. The aperture plate FA has an optical surface 9 on one side facing the subject. The fifth lens E5 has an optical surface 10 on one side facing the subject and an optical surface 11 on the other side. The sixth lens E6 has an optical surface 12 on one side facing the subject and an optical surface 13 on the other side. The seventh lens E7 has an optical surface which is conjoined with the optical surface 13, on one side facing the subject, and an optical surface 14 on the other side. The eighth lens E8 has an optical surface 15 on one side facing the subject and an optical surface 16 on the other side. The ninth lens E9 has an optical surface 17 on one side facing the subject and an optical surface 18 on the other side. The optical filter OF has an optical surface 19 on one side facing the subject and an optical surface 20 on the other side. In FIG. 17, a term IP represents an image plane on which an image is formed.

In the zoom lens system 500 of FIG. 17, the optical elements are arranged in order of increasing distance to a subject; the first lens E1, the second lens E2, the third lens E3, the fourth lens E4, the aperture plate FA, the fifth lens E5, the sixth lens E6, the seventh lens E7, the eighth lens E8, the ninth lens E9, and the optical filter OF. Through these optical elements, an image of the subject is formed at the image plane IP behind the optical filter OF.

The first lens. E1 is a negative meniscus lens having a convex surface (i.e., the optical surface 1) on one side facing the subject. The second lens E2 is a negative meniscus lens having a convex surface (i.e., the optical surface 3) on one side facing the subject. The third lens E3 is a negative meniscus lens having a convex surface (i.e., the optical surface 5) on one side facing the subject and another convex surface (i.e., the optical surface 6) on the other side. The fourth lens E4 is a positive meniscus lens having a convex surface on one side facing the subject. The first, second, third, and fourth lenses E1–E4 form a four-element-in-four-group structure, and the first optical lens group G1 including these first, second, third, and fourth lenses E1–E4 has a negative focal length as a whole. The fifth lens E5 is a positive meniscus lens having a convex surface (i.e., the optical surface 10) on one side facing the subject. The sixth lens E6 is a negative meniscus lens having a convex surface (i.e., the optical surface 12) on one side facing the subject. The seventh lens E7 is a positive meniscus lens having a convex surface which is conjoined with the optical surface 13 of the sixth lens E6, on one side facing the subject. The eighth lens E8 is a double-convex lens as a positive lens. The sixth and seventh lenses E6 and E7 are conjoined with each other, as mentioned above. The second optical lens group G2 including the fifth, sixth, seventh, and eighth lenses E5–E8, which structure is referred to as a four-element-in-three-group structure, has a positive focal length as a whole. The ninth lens E9 is a positive meniscus lens having a convex surface (i.e., the optical surface 17) on one side facing the subject. The third optical lens group G3 including the ninth lens E9 has a positive focal length. The aperture plate FA is arranged at a side of the second optical lens group G2 facing the subject and is moved together with the second optical lens group G2.

In a scaling change from a short focal length edge to a long focal length edge, the second optical lens group G2 which mainly executes a scaling function is monotonously moved from the image side to the subject side, the first optical lens group G1 is moved in a direction to correct a displacement of the image position caused by the scaling change, and the third optical lens group G3 is moved mainly to move an exit pupil away from the image plane. More specifically, the first, second, and third optical lens groups G1–G3 are moved when a scaling is changed from a short focal length edge to a long focal length edge such that a distance between the first and second optical lens groups G1 and G2 is gradually decreased and that a distance between the second and third optical lens groups G2 and G3 is gradually increased.

In the zoom lens system 500, the focal length f of the entire system, the F number F, and the half view angle ω are variable by zooming. The focal length f varies in a range of from 5.97 to 16.88, the F number F in a range of from 2.63 to 4.45, and the half view angle ω in a range of from 39.20 to 15.52. Optical characteristics of the above-mentioned optical surfaces 1–20 of the optical elements are as shown below in Table 9.

TABLE 9

| No. | R | D | N | ν | Element |
|---|---|---|---|---|---|
| 01 | 56.496 | 1.20 | 1.77250 | 49.62 | 1$^{st}$ lens, 1$^{st}$ group |
| 02 | 16.278 | 0.72 | | | 1$^{st}$ lens, 1$^{st}$ group |
| 03 | 23.189 | 1.20 | 1.77250 | 49.62 | 2$^{nd}$ lens, 1$^{st}$ group |
| 04 | 9.559 | 0.96 | | | 2$^{nd}$ lens, 1$^{st}$ group |
| 05 | 13.135 | 1.20 | 1.80610 | 40.74 | 3$^{rd}$ lens, 1$^{st}$ group |
| 06* | 7.003 | 2.87 | | | 3$^{rd}$ lens, 1$^{st}$ group |
| 07 | 14.607 | 2.69 | 1.7825 | 28.32 | 4$^{th}$ lens, 1$^{st}$ group |
| 08 | ∞ | D$_a$ | | | 4$^{th}$ lens, 1$^{st}$ group |
| 09 | aperture | 1.00 | | | |
| 10* | 9.560 | 1.82 | 1.77250 | 49.62 | 5$^{th}$ lens, 2$^{nd}$ group |
| 11 | 55.320 | 1.96 | | | 5$^{th}$ lens, 2$^{nd}$ group |
| 12 | 12.112 | 1.78 | 1.84666 | 23.78 | 6$^{th}$ lens, 2$^{nd}$ group |
| 13 | 5.000 | 2.75 | 1.58913 | 61.25 | 6$^{th}$/7$^{th}$ lens, 2$^{nd}$ group |
| 14 | 7.662 | 0.42 | | | 7$^{th}$ lens, 2$^{nd}$ group |
| 15 | 21.473 | 1.59 | 1.48749 | 70.44 | 8$^{th}$ lens, 2$^{nd}$ group |
| 16* | −23.241 | D$_b$ | | | 8$^{th}$ lens, 2$^{nd}$ group |
| 17* | 18.125 | 1.85 | 1.58913 | 61.25 | 9$^{th}$ lens, 3$^{rd}$ group |
| 18 | 137.234 | D$_c$ | | | 9$^{th}$ lens, 3$^{rd}$ group |
| 19 | ∞ | 1.43 | 1.51680 | 64.20 | filter |
| 20 | ∞ | | | | filter |

In Table 9, numbers in a column of No. represent the numbers of the optical surfaces, and the surfaces 6, 10, 16, and 17 indicated with a suffix of an asterisk mark (*) are aspheric and their parameters are as indicated below in Table 9A.

TABLE 9A

<the optical surface 6>

K = 0.0
$A_4 = -3.77077 \times 10^{-4}$,
$A_6 = -7.57114 \times 10^{-6}$
$A_8 = 3.24559 \times 10^{-7}$
$A_{10} = -2.06841 \times 10^{-8}$
$A_{12} = 4.43898 \times 10^{-10}$
$A_{14} = -1.72365 \times 10^{-12}$
$A_{16} = -9.21068 \times 10^{-14}$
$A_{18} = 7.60642 \times 10^{-16}$ <the optical surface 10>

K = 0.0
$A_4 = -9.00752 \times 10^{-5}$,
$A_6 = 3.09052 \times 10^{-8}$
$A_8 = -7.16556 \times 10^{-8}$
$A_{10} = 2.25617 \times 10^{-9}$ <the optical surface 16>

K = 0.0
$A_4 = 1.02677 \times 10^{-4}$,
$A_6 = 1.82551 \times 10^{-5}$
$A_8 = -1.97083 \times 10^{-6}$
$A_{10} = 9.81276 \times 10^{-8}$ <the optical surface 17>

K = 0.0
$A_4 = -1.59462 \times 10^{-5}$,
$A_6 = 4.76213 \times 10^{-6}$
$A_8 = -2.24929 \times 10^{-7}$
$A_{10} = 4.30948 \times 10^{-9}$ In Table 9, $D_a$ represents a distance between the first optical lens group G1 and the aperture plate FA integrated with the second optical lens group G2. Likewise, $D_b$ represents a distance between the second optical lens group G2 and the third optical lens group G3, and $D_c$ is a distance between the third optical lens group G3 and the optical filter OF. These distances $D_a$, $D_b$, and $D_c$ are varied by zooming, as indicated below in Table 10.

TABLE 10

| D | $f_1 = 5.97$ | $f_2 = 10.05$ | $f_3 = 16.88$ |
|---|---|---|---|
| $D_a$ | 19.405 | 7.720 | 1.500 |
| $D_b$ | 3.699 | 8.423 | 18.227 |
| $D_c$ | 4.500 | 4.725 | 3.147 |

In Table 9, $f_1$ is a short focal length edge, $f_2$ is a medium focal length edge, and $f_3$ is a long focal length edge.

In addition, the optical elements of the zoom lens system 500 satisfy the following equations;

$(N_{22}-N_{23})=0.258$, $(v_{23}-v_{22})=37.5$, $\{(1/r_{21F})+(1/r_{22F})+(1/r_{22R})\}xY'=1.80$, and $(L_{PN}/L_2)=0.538$.

In the above equations, $N_{22}$ represents a refractive index of the negative meniscus lens of the second optical lens group G2 (i.e., the sixth lens E6), and $N_{23}$ represents a refractive index of the positive meniscus lens of the second optical lens group G2 (i.e., the seventh lens E7) conjoined with the negative meniscus lens (i.e., the sixth lens E6). Further, $v_{22}$ represents an Abbe number of the negative meniscus lens of the second optical lens group G2 (i.e., the sixth lens E6), and $v_{23}$ represents an Abbe number of the positive meniscus lens of the second optical lens group G2 (i.e., the seventh lens E7) conjoined with the negative meniscus lens (i.e., the sixth lens E6). Further, $r_{21F}$ represents a radius of curvature with respect to the optical surface, facing the subject, of the closest positive meniscus lens to the subject in the second optical lens group G2 (i.e., the fifth lens E5). Further, $r_{22F}$ represents a radius of curvature with respect to the optical surface, facing the subject, of the negative meniscus lens (i.e., the sixth lens E6) in the second optical lens group. Further, $r_{22R}$ represents a radius of curvature with respect to conjoined surfaces of the negative meniscus lens (i.e., the sixth lens E6) and the conjoined positive meniscus lens (i.e., the seventh lens E7) in the second optical lens group. Further, Y' represents a maximum image height. Further, $L_{PN}$ represents a distance between a summit of the optical surface, facing the subject, of the closest positive meniscus lens (i.e., the fifth lens E5) in the second optical lens group and a summit of the conjoined surface of the negative meniscus lens (i.e., the sixth lens E6) and the positive meniscus lens (i.e., the seventh lens E7). Further, $L_2$ represents a thickness of the second optical lens group in a light axis direction.

FIGS. 18A–18D show graphs of aberration curves that are a spherical aberration, an astigmatic aberration, a distortion aberration, and a coma aberration, respectively, measured at the short focal length edge of the zoom lens system 500 of FIG. 17. Likewise, FIGS. 19A–19D show these aberration curves at the medium focal length edge and FIGS. 20A–20D show the aberration curves at the long focal length edge of the zoom lens system 500 of FIG. 17. In each of FIGS. 18A, 19A, and 20A, a thin solid line indicated by a letter d represents a spherical aberration curve of a d-line, a thick solid line indicated by a letter g represents a spherical aberration curve of a g-line, and a thin chain line represents a sine condition. In each of FIGS. 18B, 19B, and 20B, a thin solid line indicated by the letter d represents an astigmatic aberration curve of the d-line and a thin dotted line indicated by the letter d represents an astigmatic aberration of a sagittal ray. Further, in each of FIGS. 18B, 19B, and 20B, a thick solid line indicated by the letter g represents an astigmatic aberration curve of the g-line and a thick dotted line indicated by the letter g represents an astigmatic aberration curve of the sagittal ray. In each of FIGS. 18D, 19D, and 20D, a thin solid line indicated by the letter d represents a coma aberration curve of the d-line and a thick solid line indicated by the letter g represents a coma aberration curve of the g-line.

Figures 18A, 18B, 18C, 18D:
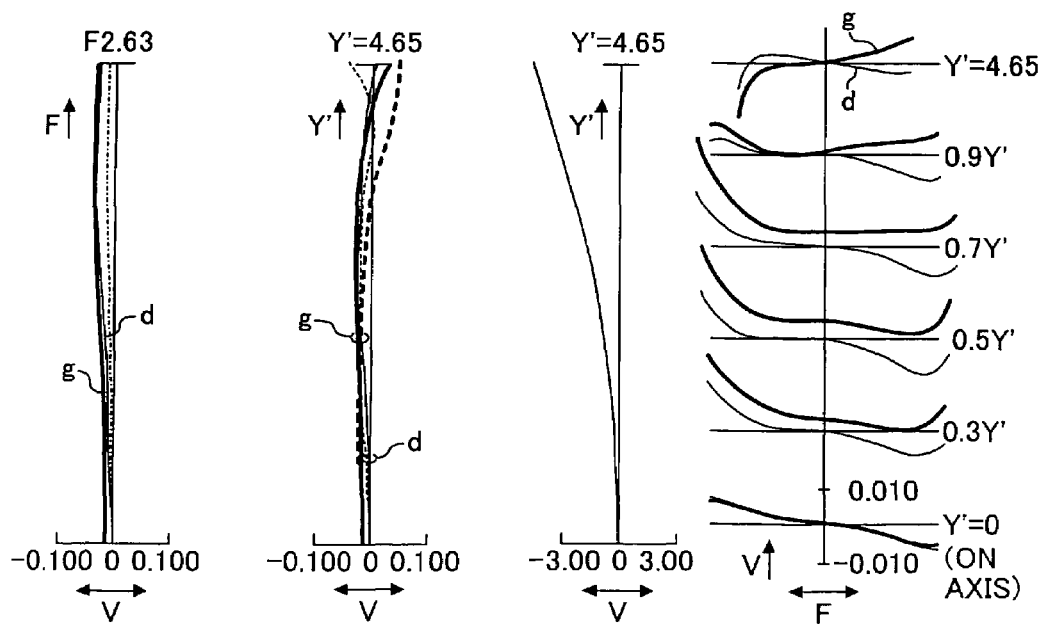
FIGS. 18A–18D are graphs of aberration curves that are a spherical aberration, an astigmatic aberration, a distortion aberration, and a coma aberration, respectively, measured at a short focal length edge of the zoom lens apparatus of FIG. 17.
Figures 19A, 19B, 19C, 19D:
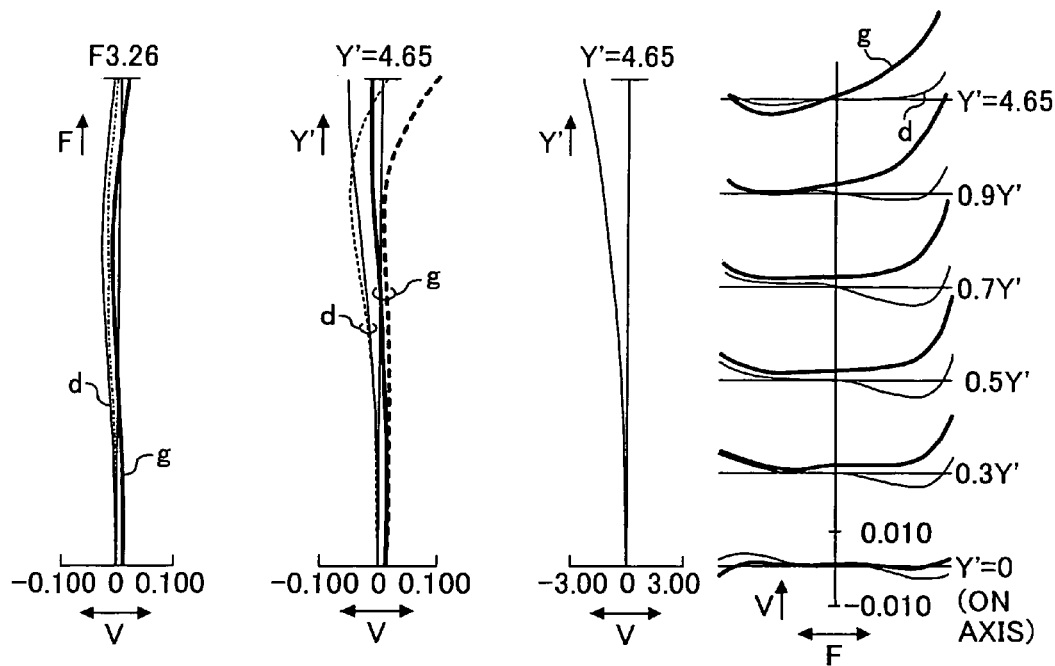
FIGS. 19A–19D are graphs of aberration curves that are a spherical aberration, an astigmatic aberration, a distortion aberration, and a coma aberration, respectively, measured at a medium focal length edge of the zoom lens apparatus of FIG. 17.
Figures 20A, 20B, 20C, 20D:
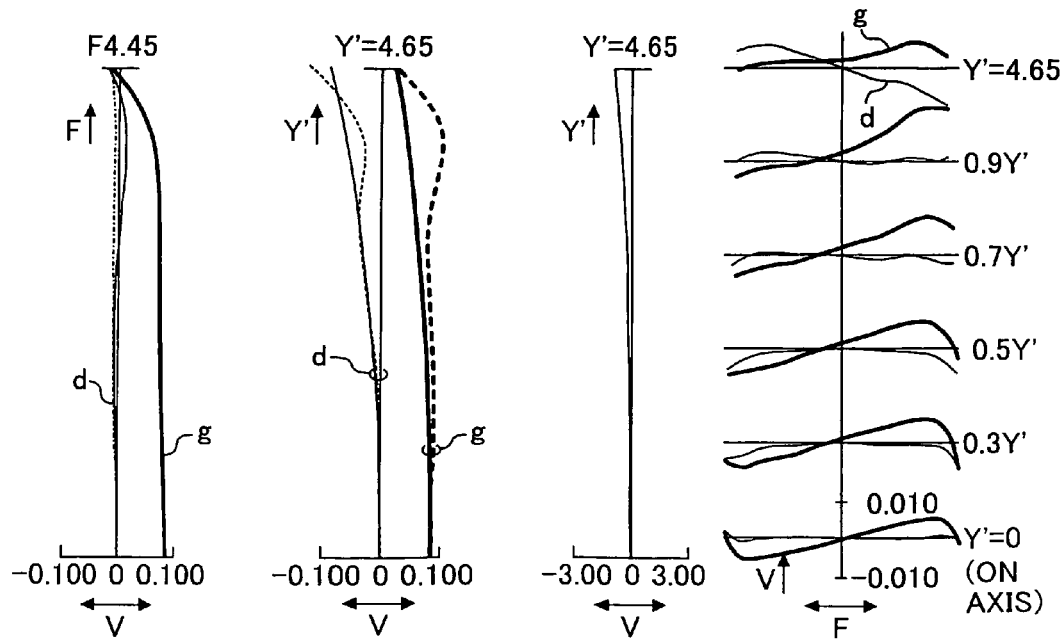
FIGS. 20A–20D are graphs of aberration curves that are a spherical aberration, an astigmatic aberration, a distortion aberration, and a coma aberration, respectively, measured at a long focal length edge of the zoom lens apparatus of FIG. 17.

Horizontal axes of the graphs in FIGS. 18A–18C, 19A–19C, and 20A–20C and vertical axes of the graphs in FIGS. 18D, 19D, and 20D represent a relative value V of aberrations. Vertical axes of the graphs in FIGS. 18A, 19A, and 20A and horizontal axes of the graphs in FIGS. 18D, 19D, and 20D represent a ratio of a pupil height (i.e., the F number). Vertical axes of the graphs in FIGS. 18B and 18C, 19B and 19C, and 20B and 20C represent a ratio of image heights.

According to FIGS. 18A–18D, 19A–19D, and 20A–20D, the zoom lens system 500 of FIG. 17 appropriately corrects or suppresses the respective aberrations.

Next, a zoom lens system 600 according to another embodiment of the present invention is explained with reference to FIG. 21. Reference symbols and numerals are given to optical elements of the zoom lens system 600 in a manner independent from those given to each of the zoom lens systems 100, 200, 300, 400, and 500 of FIGS. 1, 5, 9, 13, and 17, respectively. This is to avoid an intricate handling of increasing digits of the reference symbols and numbers. As a result of it, the same reference symbols or numbers in different figures are not necessarily a common optical element.

Figure 21:
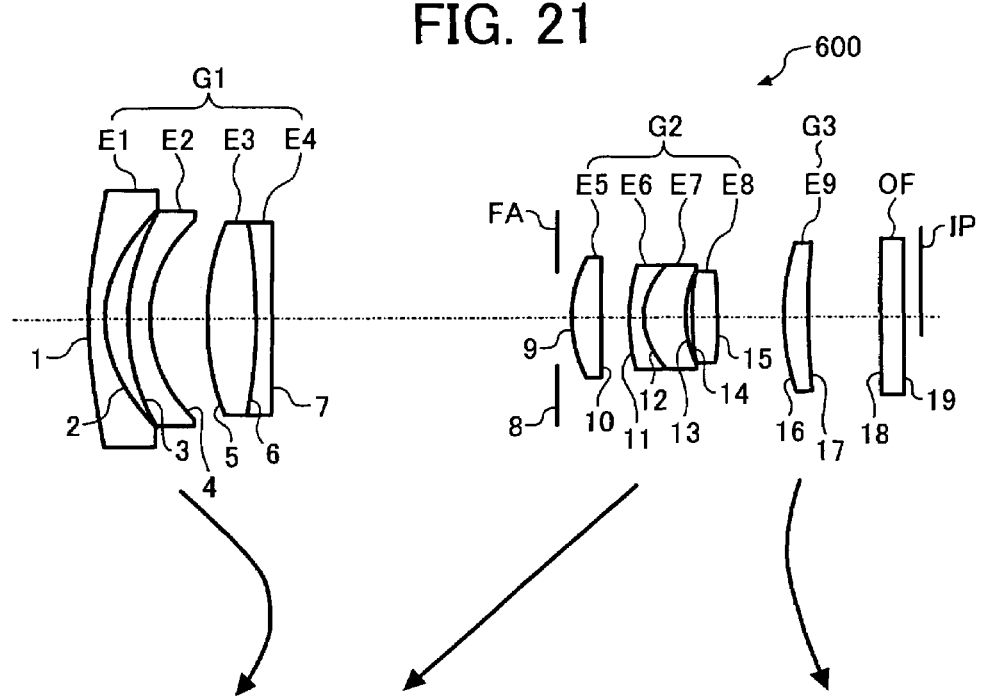
FIG. 21 is a schematic diagram of a zoom lens apparatus according a preferred embodiment of the present invention.

As shown in FIG. 21, the zoom lens system 600 includes various optical elements including a first lens E1, a second lens E2, a third lens E3, a fourth lens E4, a fifth lens E5, a sixth lens E6, a seventh lens E7, an eighth lens E8, a ninth lens E9, an aperture plate FA, and an optical filter OF. In this example, the first lens E1, the second lens E2, the third lens E3, and the fourth lens E4 form a first optical lens group G1. The fifth lens E5, the sixth lens E6, the seventh lens E7, and the eighth lens E8 form a second optical lens group G2. The ninth lens E9 forms a third optical lens group G3. The lenses included in each of the first, second, and third optical lens groups G1–G3 are supported by a common supporting frame or the like and are integrally moved during a zooming operation of the zoom lens system 600. In order to allow the readers to understand the zooming operation, FIG. 21 schematically shows with arrows moving traces of the first, second, and third optical lens groups G1–G3 from an edge of a short focal length (i.e., a wide-angle edge) to an edge of a long focal length (i.e., a telescopic edge) via a medium focal length. In addition, FIG. 21 also shows optical surfaces of the above-mentioned optical elements. That is, the first, lens E1 has an optical surface 1 on one side facing a subject, which is not shown but is positioned left in the drawing, and an optical surface 2 on the other side. The second lens E2 has an optical surface 3 on one side facing the subject and an optical surface 4 on the other side. The third lens E3 has an optical surface 5 on one side facing the subject and an optical surface 6 on the other side. The fourth lens E4 has an optical surface which is conjoined with the optical surface 6, on one side facing the subject, and an optical surface 7 on the other side. The aperture plate FA has an optical surface 8 on one side facing the subject. The fifth lens E5 has an optical surface 9 on one side facing the subject and an optical surface 10 on the other side. The sixth lens E6 has an optical surface 11 on one side facing the subject and an optical surface 12 on the other side. The seventh lens E7 has an optical surface which is conjoined with the optical surface 12, on one side facing the subject, and an optical surface 13 on the other side. The eighth lens E8 has an optical surface 14 on one side facing the subject and an optical surface 15 on the other side. The ninth lens E9 has an optical surface 16 on one side facing the subject and an optical surface 17 on the other side. The optical filter OF has an optical surface 18 on one side facing the subject and an optical surface 19 on the other side. In FIG. 21, a term IP represents an image plane on which an image is formed.

In the zoom lens system 600 of FIG. 21, the optical elements are arranged in order of increasing distance to a subject; the first lens E1, the second lens E2, the third lens E3, the fourth lens E4, the aperture plate FA, the fifth lens E5, the sixth lens E6, the seventh lens E7, the eighth lens E8, the ninth lens E9, and the optical filter OF. Through these optical elements, an image of the subject is formed at the image plane IP behind the optical filter OF.

The first lens E1 is a negative meniscus lens having a convex surface (i.e., the optical surface 1) on one side facing the subject. The second lens E2 is a negative meniscus lens having a convex surface (i.e., the optical surface 3) on one side facing the subject. The third lens E3 is a double-convex lens as a positive lens having a convex surface (i.e., the optical surface 5) with a greater curvature on one side facing the subject and another convex surface (i.e., the optical surface 6) on the other side. The fourth lens E4 is a double-concave lens as a negative lens. The third and fourth lenses E3 and E4 are conjoined with each other. The first, second, third, and fourth lenses E1–E4 form a four-element-in-three-group structure, and the first optical lens group G1 including these first, second, third, and fourth lenses E1–E4 has a negative focal length as a whole. The fifth lens E5 is a positive meniscus lens having a convex surface (i.e., the optical surface 9) on one side facing the subject. The sixth lens E6 is a negative meniscus lens having a convex surface (i.e., the optical surface 11) on one side facing the subject. The seventh lens E7 is a positive meniscus lens having a convex surface (i.e., the optical surface 12) on one side facing the subject. The eighth lens E8 is a double-convex lens as a positive lens. The sixth and seventh lenses E6 and E7 are conjoined with each other. The second optical lens group G2 including the fifth, sixth, seventh, and eighth lenses E5–E8, which structure is referred to as a four-element-in-three-group structure, has a positive focal length as a whole. The ninth lens E9 is a double-convex lens as a positive lens having a convex surface (i.e., the optical surface 16) with a greater curvature on one side facing the subject and another convex surface on the other side. The third optical lens group G3 including the ninth lens E9 has a positive focal length. The aperture plate FA is arranged at a side of the second optical lens group G2 facing the subject and is moved together with the second optical lens group G2.

In a scaling change from a short focal length edge to a long focal length edge, the second optical lens group G2 which mainly executes a scaling function is monotonously moved from the image side to the subject side, the first optical lens group G1 is moved in a direction to correct a displacement of the image position caused by the scaling change, and the third optical lens group G3 is moved mainly to move an exit pupil away from the image plane. More specifically, the first, second, and third optical lens groups G1–G3 are moved when a scaling is changed from a short focal length edge to a long focal length edge such that a distance between the first and second optical lens groups G1 and G2 is gradually decreased and that a distance between the second and third optical lens groups G2 and G3 is gradually increased.

In the zoom lens system 600, the focal length f of the entire system, the F number F, and the half view angle ω are variable by zooming. The focal length f varies in a range of from 5.98 to 16.89, the F number F in a range of from 2.62 to 4.51, and the half view angle ω in a range of from 39.18 to 15.52. Optical characteristics of the above-mentioned optical surfaces 1–19 of the optical elements are as shown below in Table 11.

TABLE 11

| No. | R | D | N | ν | Element |
|---|---|---|---|---|---|
| 01 | 39.911 | 1.20 | 1.77250 | 49.62 | 1st lens, 1st group |
| 02 | 9.332 | 1.43 | | | 1st lens, 1st group |
| 03 | 14.880 | 1.40 | 1.80610 | 40.74 | 2nd lens, 1st group |
| 04* | 7.003 | 3.50 | | | 2nd lens, 1st group |
| 05 | 14.030 | 3.37 | 1.72825 | 28.32 | 3rd lens, 1st group |
| 06 | −46.632 | 1.00 | 1.83400 | 37.34 | 3rd/4th lens, 1st group |
| 07 | 77.937 | $D_a$ | | | 4th lens, 1st group |
| 08 | aperture | 1.00 | | | |
| 09* | 9.009 | 1.92 | 1.77250 | 49.62 | 5th lens, 2nd group |
| 10 | 51.825 | 1.69 | | | 5th/6th lens, 2nd group |
| 11 | 11.244 | 1.05 | 1.84666 | 23.78 | 6th lens, 2nd group |
| 12 | 5.000 | 2.68 | 1.63854 | 55.45 | 7th lens, 2nd group |

TABLE 11-continued

| No. | R | D | N | ν | Element |
|-----|------|------|---------|-------|---------------------------------|
| 13  | 6.754 | 0.46 |       |       | 7th lens, 2nd group |
| 14  | 17.306 | 1.56 | 1.48749 | 70.44 | 8th lens, 2nd group |
| 15* | −40.559 | $D_b$ |    |       | 8th lens, 2nd group |
| 16* | 22.283 | 1.85 | 1.58913 | 61.25 | 9th lens, 3rd group |
| 17  | −426.355 | $D_c$ |  |       | 9th lens, 3rd group |
| 18  | ∞ | 1.43 | 1.51680 | 64.20 | filter |
| 19  | ∞ |    |         |       | filter |

In Table 11, numbers in a column of No. represent the numbers of the optical surfaces, and the surfaces 4, 9, 15, and 16 indicated with a suffix of an asterisk mark (*) are aspheric and their parameters are as indicated below in Table 11A.

TABLE 11A

<the optical surface 4>

K = 0.0
$A_4 = -3.19923 \times 10^{-4}$,
$A_6 = -7.49996 \times 10^{-6}$
$A_8 = 3.11483 \times 10^{-7}$
$A_{10} = -1.90421 \times 10^{-8}$
$A_{12} = 3.91258 \times 10^{-10}$
$A_{14} = -2.01103 \times 10^{-12}$
$A_{16} = -5.49008 \times 10^{-14}$
$A_{18} = 3.19870 \times 10^{-16}$ <the optical surface 9>

K = 0.0
$A_4 = -9.62105 \times 10^{-5}$,
$A_6 = -9.78873 \times 10^{-7}$
$A_8 = 1.62625 \times 10^{-8}$
$A_{10} = -8.46903 \times 10^{-10}$ <the optical surface 15>

K = 0.0
$A_4 = 1.62639 \times 10^{-4}$,
$A_6 = 2.90705 \times 10^{-5}$
$A_8 = -3.68616 \times 10^{-6}$
$A_{10} = 2.00067 \times 10^{-7}$ <the optical surface 16>

K = 0.0
$A_4 = -1.57048 \times 10^{-5}$,
$A_6 = 5.24326 \times 10^{-6}$
$A_8 = -2.39620 \times 10^{-7}$
$A_{10} = 4.62003 \times 10^{-9}$ In Table 11, $D_a$ represents a distance between the first optical lens group G1 and the aperture plate FA integrated with the second optical lens group G2. Likewise, $D_b$ represents a distance between the second optical lens group G2 and the third optical lens group G3, and $D_c$ is a distance between the third optical lens group G3 and the optical filter OF. These distances $D_a$, $D_b$, and $D_c$ are varied by zooming, as indicated below in Table 12.

TABLE 12

| D | $f_1 = 5.98$ | $f_2 = 10.05$ | $f_3 = 16.88$ |
|-----|--------|--------|--------|
| $D_a$ | 18.638 | 7.515 | 1.879 |
| $D_b$ | 4.318 | 8.821 | 19.281 |
| $D_c$ | 4.528 | 5.079 | 3.094 |

In Table 12, $f_1$ is a short focal length edge, $f_2$ is a medium focal length edge, and $f_3$ is a long focal length edge.

In addition, the optical elements of the zoom lens system 600 satisfy the following equations;

$(D_4/L_1)=0.294$.

$(N_{13}-N_{14})=-0.106$, $(\nu_{14}-\nu_{13})=9.02$, $(N_{22}-N_{23})=0.208$, $(\nu_{23}-\nu_{22})=31.7$, $\{(1/r_{21F})+(1/r_{22F})+(1/r_{22R})\}xY'=1.86$, and $(L_{PN}/L_2)=0.498$.

In the above equations, $D_4$ is a distance on a light axis between an image-facing concave surface (i.e., the optical surface 4) of the negative meniscus lens (i.e., the second lens E2) and a subject-facing convex surface (i.e., the optical surface 5) of the positive lens (i.e., the third lens E3) and $L_1$ is a distance on a light axis between a subject-facing convex surface (i.e., the optical surface 1) of the negative meniscus lens (i.e., the first lens E1) and an image-facing surface (i.e., the optical surface 7) of the negative lens (i.e., the fourth lens E4). Further, $N_{13}$ represents a refractive index of the positive lens of the first optical lens group G1 (i.e., the third lens E3), and $N_{14}$ represents a refractive index of the negative lens of the first optical lens group G1 (i.e., the fourth lens E4) conjoined with the positive lens (i.e., the third lens E3). Further, $\nu_{14}$ represents an Abbe number of the negative lens of the first optical lens group G1 (i.e., the fourth lens E4), and $\nu_{13}$ represents an Abbe number of the positive lens of the first optical lens group G1 (i.e., the thru lens E3) conjoined with the negative lens (i.e., the third lens E3). Further, $N_{22}$ represents a refractive index of the negative meniscus lens of the second optical lens group G2 (i.e., the sixth lens E6), and $N_{23}$ represents a refractive index of the positive meniscus lens of the second optical lens group G2 (i.e., the seventh lens E7) conjoined with the negative meniscus lens (i.e., the sixth lens E6). Further, $\nu_{22}$ represents an Abbe number of the negative meniscus lens of the second optical lens group G2 (i.e., the sixth lens E6), and $\nu_{23}$ represents an Abbe number of the positive meniscus lens of the second optical lens group G2 (i.e., the seventh lens E7) conjoined with the negative meniscus lens (i.e., the sixth lens E6). Further, $r_{21F}$ represents a radius of curvature with respect to the optical surface, facing the subject, of the closest positive meniscus lens to the subject in the second optical lens group G2 (i.e., the fifth lens E5). Further, $r_{22F}$ represents a radius of curvature with respect to the optical surface, facing the subject, of the negative meniscus lens (i.e., the sixth lens E6) in the second optical lens group. Further, $r_{22R}$ represents a radius of curvature with respect to conjoined surfaces of the negative meniscus lens (i.e., the sixth lens E6) and the conjoined positive meniscus lens (i.e., the seventh lens E7) in the second optical lens group. Further, Y' represents a maximum image height. Further, $L_{PN}$ represents a distance between a summit of the optical surface, facing the subject; of the closest positive meniscus lens (i.e., the fifth lens E5) in the second optical lens group and a summit of the conjoined surface of the negative meniscus lens (i.e., the sixth lens E6) and the positive meniscus lens (i.e., the seventh lens E7). Further, $L_2$ represents a thickness of the second optical lens group in a light axis direction.

Figures 22A, 22B, 22C, 22D:
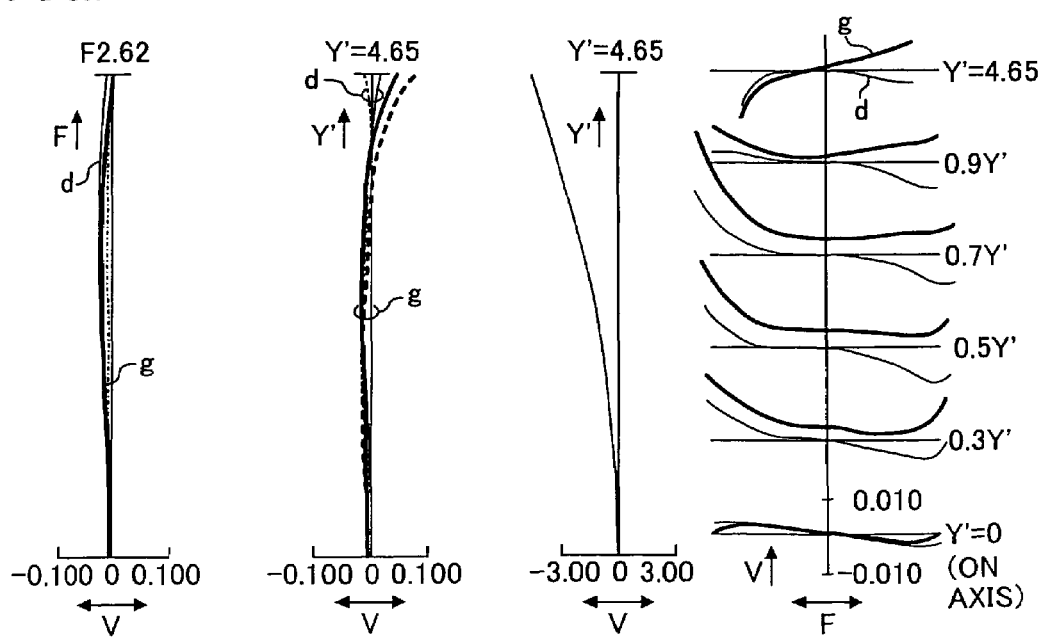
FIGS. 22A–22D are graphs of aberration curves that are a spherical aberration, an astigmatic aberration, a distortion aberration, and a coma aberration, respectively, measured at a short focal length edge of the zoom lens apparatus of FIG. 21.

FIGS. 22A–22D show graphs of aberration curves that are a spherical aberration, an astigmatic aberration, a distortion aberration, and a coma aberration, respectively, measured at the short focal length edge of the zoom lens system 600 of FIG. 21. Likewise, FIGS. 23A–23D show these aberration curves at the medium focal length edge and FIGS. 24A–24D show the aberration curves at the long focal length edge of the zoom lens system 600 of FIG. 21. In each of FIGS. 22A, 23A, and 24A, a thin solid line indicated by a letter d represents a spherical aberration curve of a d-line, a thick solid line indicated by a letter g represents a spherical aberration curve of a g-line, and a thin chain line represents-a sine condition. In each of FIGS. 22B, 23B, and 24B, a thin solid line indicated by the letter d represents an astigmatic aberration curve of the d-line and a thin dotted line indicated by the letter d represents an astigmatic aberration of a sagittal ray. Further, in each of FIGS. 22B, 23B, and 24B, a thick solid line indicated by the letter g represents an astigmatic aberration curve of the g-line and a thick dotted line indicated by the letter g represents an astigmatic aberration curve of the sagittal ray. In each of FIGS. 22D, 23D, and 24D, a thin solid line indicated by the letter d represents a coma aberration curve of the d-line and a thick solid line indicated by the letter g represents a coma aberration curve of the g-line. Horizontal axes of the graphs in FIGS. 22A–22C, 23A–23C, and 24A–24C and vertical axes of the graphs in FIGS. 22D, 23D, and 24D represent a relative value V of aberrations. Vertical axes of the graphs in FIGS. 22A, 23A, and 24A and horizontal axes of the graphs in FIGS. 22D, 23D, and 24D represent a ratio of a pupil height (i.e., the F number). Vertical axes of the graphs in FIGS. 22B and 22C, 23B and 23C, and 24B and 24C represent a ratio of image heights.

According to FIGS. 22A–22D, 23A–23D, and 24A–24D, the zoom lens system 600 of FIG. 21 appropriately corrects or suppresses the respective aberrations.

Next, a zoom lens system 700 according to another embodiment of the present invention is explained with reference to FIG. 25. Reference symbols and numerals are given to optical elements of the zoom lens system 700 in a manner independent from those given to each of the zoom lens systems 100, 200, 300, 400, 500, and 600 of FIGS. 1, 5, 9, 13, 17, and 21, respectively. This is to avoid an intricate handling of increasing digits of the reference symbols and numbers. As a result of it, the same reference symbols or numbers in different figures are not necessarily a common optical element.

Figure 25:
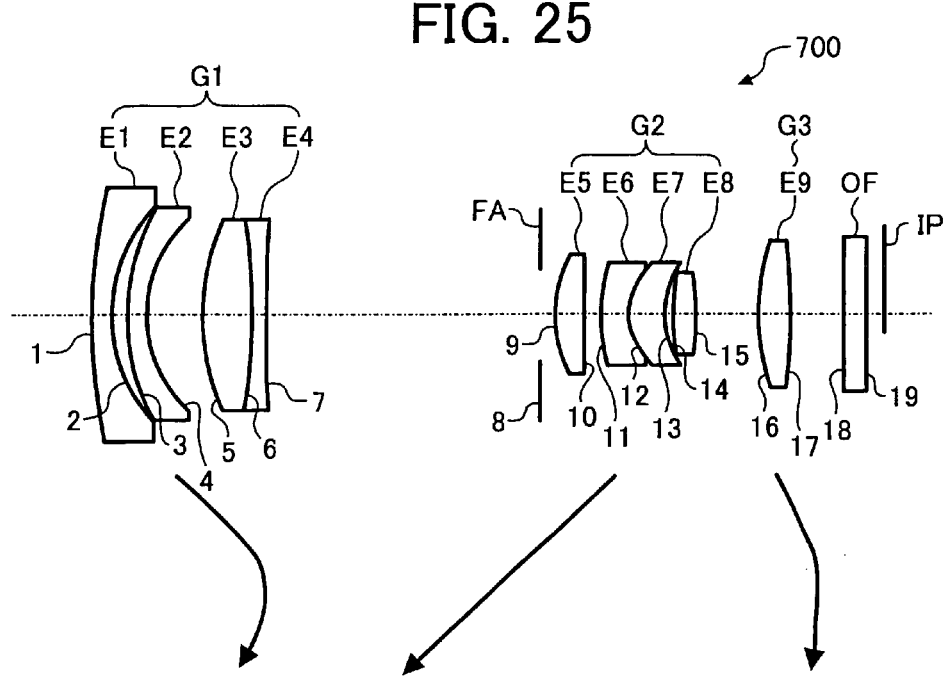
FIG. 25 is a schematic diagram of a zoom lens apparatus according a preferred embodiment of the present invention.

As shown in FIG. 25, the zoom lens system 700 includes various optical elements including a first lens E1, a second lens E2, a third lens E3, a fourth lens E4, a fifth lens E5, a sixth lens E6, a seventh lens E7, an eighth lens E8, a ninth lens E9, an aperture plate FA, and an optical filter OF. In this example, the first lens E1, the second lens E2, the third lens E3, and the fourth lens E4 form a first optical lens group G1. The fifth lens E5, the sixth lens E6, the seventh lens E7, and the eighth lens E8 form a second optical lens group G2. The ninth lens E9 forms a third optical lens group G3. The lenses included in each of the first, second, and third optical lens groups G1–G3 are supported by a common supporting frame or the like and are integrally moved during a zooming operation of the zoom lens system 700. In order to allow the readers to understand the zooming operation, FIG. 25 schematically shows with arrows moving traces of the first, second, and third optical lens groups G1–G3 from an edge of a short focal length (i.e., a wide-angle edge) to an edge of a long focal length (i.e., a telescopic edge) via a medium focal length. In addition, FIG. 25 also shows optical surfaces of the above-mentioned optical elements. That is, the first lens E1 has an optical surface 1 on one side facing a subject, which is not shown but is positioned left in the drawing, and an optical surface 2 on the other side. The second lens E2 has an optical surface 3 on one side facing the subject and an optical surface 4 on the other side. The third lens E3 has an optical surface 5 on one side facing the subject and an optical surface 6 on the other side. The fourth lens E4 has an optical surface which is conjoined with the optical surface 6, on one side facing the subject, and an optical surface 7 on the other side. The aperture plate FA has an optical surface 8 on one side facing the subject. The fifth lens E5 has an optical surface 9 on one side facing the subject and an optical surface 10 on the other side. The sixth lens E6 has an optical surface 11 on one side facing the subject and an optical surface 12 on the other side. The seventh lens E7 has an optical surface which is conjoined with the optical surface 12, on one side facing the subject, and an optical surface 13 on the other side. The eighth lens E8 has an optical surface 14 on one side facing the subject and an optical surface 15 on the other side. The ninth lens E9 has an optical surface 16 on one side facing the subject and an optical surface 17 on the other side. The optical filter OF has an optical surface 18 on one side facing the subject and an optical surface 19 on the other side. In FIG. 25, a term IP represents an image plane on which an image is formed.

In the zoom lens system 700 of FIG. 25, the optical elements are arranged in order of increasing distance to a subject; the first lens E1, the second lens E2, the third lens E3, the fourth lens E4, the aperture plate FA, the fifth lens E5, the sixth lens E6, the seventh lens E7, the eighth lens E8, the ninth lens E9, and the optical filter OF. Through these optical elements, an image of the subject is formed at the image plane IP behind the optical filter OF.

The first lens E1 is a negative meniscus lens having a convex surface (i.e., the optical surface 1) on one side facing the subject. The second lens E2 is a negative meniscus lens having a convex surface (i.e., the optical surface 3) on one side facing the subject. The third lens E3 is a double-convex lens as a positive lens having a convex surface (i.e., the optical surface 5) with a greater curvature on one side facing the subject and another convex surface (i.e., the optical surface 6) on the other side. The fourth lens E4 is a double-concave lens as a negative lens. The third and fourth lenses E3 and E4 are conjoined with each other. The first, second, third, and fourth lenses E1–E4 form a four-element-in-three-group structure, and the first optical lens group G1 including these first, second, third, and fourth lenses E1–E4 has a negative focal length as a whole. The fifth lens E5 is a positive meniscus lens having a convex surface (i.e., the optical surface 9) on one side facing the subject. The sixth lens E6 is a negative meniscus lens having a convex surface (i.e., the optical surface 11) on one side facing the subject. The seventh lens E7 is a positive meniscus lens having a convex surface (i.e., the optical surface 12) on one side facing the subject. The eighth lens E8 is a double-convex lens as a positive lens. The sixth and seventh lenses E6 and E7 are conjoined with each other. The second optical lens group G2 including the fifth, sixth, seventh, and eighth lenses E5–E8, which structure is referred to as a four-element-in-three-group structure, has a positive focal length as a whole. The ninth lens E9 is a double-convex lens as a positive lens having a convex surface (i.e., the optical surface 16) with a greater curvature on one side facing the subject and another convex surface on the other side. The third optical lens group G3 including the ninth lens E9 has a positive focal length. The aperture plate FA is arranged at a side of the second optical lens group G2 facing the subject and is moved together with the second optical lens group G2.

In a scaling change from a short focal length edge to a long focal length edge, the second optical lens group G2 which mainly executes a scaling function is monotonously moved from the image side to the subject side, the first optical lens group G1 is moved in a direction to correct a displacement of the image position caused by the scaling change, and the third optical lens group G3 is moved mainly to move an exit pupil away from the image plane. More specifically, the first, second, and third optical lens groups G1–G3 are moved when a scaling is changed from a short focal length edge to a long focal length edge such that a distance between the first and second optical lens groups G1 and G2 is gradually decreased and that a distance between the second and third optical lens groups G2 and G3 is gradually increased.

In the zoom lens system 700, the focal length f of the entire system, the F number F, and the half view angle ω are variable by zooming. The focal length f varies in a range of from 5.97 to 16.88, the F number F in a range of from 2.62 to 4.59, and the half view angle ω in a range of from 39.21 to 15.53. Optical characteristics of the above-mentioned optical surfaces 1–19 of the optical elements are as shown below in Table 13.

TABLE 13

| No. | R | D | N | ν | Element |
|---|---|---|---|---|---|
| 01 | 54.532 | 1.20 | 1.77250 | 49.62 | 1st lens, 1st group |
| 02 | 10.209 | 1.09 | | | 1st lens, 1st group |
| 03 | 14.600 | 1.20 | 1.80610 | 40.74 | 2nd lens, 1st group |
| 04* | 7.065 | 3.78 | | | 2nd lens, 1st group |
| 05 | 14.523 | 3.36 | 1.72825 | 28.32 | 3rd lens, 1st group |
| 06 | −44.901 | 1.00 | 1.83400 | 37.34 | 3rd/4th lens, 1st group |
| 07 | 81.338 | $D_a$ | | | 4th lens, 1st group |
| 08 | aperture | 1.00 | | | |
| 09* | 9.194 | 1.88 | 1.77250 | 49.62 | 5th lens, 2nd group |
| 10 | 93.845 | 1.06 | | | 5th/6th lens, 2nd group |
| 11 | 10.470 | 1.92 | 1.84666 | 23.78 | 6th lens, 2nd group |
| 12 | 4.363 | 2.43 | 1.62041 | 60.34 | 7th lens, 2nd group |
| 13 | 6.058 | 0.56 | | | 7th lens, 2nd group |
| 14 | 26.925 | 1.49 | 1.48749 | 70.44 | 8th lens, 2nd group |
| 15* | −30.209 | $D_b$ | | | 8th lens, 2nd group |
| 16* | 21.154 | 2.17 | 1.51680 | 64.20 | 9th lens, 3rd group |
| 17 | −34.512 | $D_c$ | | | 9th lens, 3rd group |
| 18 | ∞ | 1.43 | 1.51680 | 64.20 | filter |
| 19 | ∞ | | | | filter |

In Table 13, numbers in a column of No. represent the numbers of the optical surfaces, and the surfaces 4, 9, 15, and 16 indicated with a suffix of an asterisk mark (*) are aspheric and their parameters are as indicated below in Table 13A.

TABLE 13A

<the optical surface 4>

$K = 0.0$
$A_4 = -3.07826 \times 10^{-4}$,
$A_6 = -4.85834 \times 10^{-6}$
$A_8 = 4.79994 \times 10^{-8}$
$A_{10} = -5.13369 \times 10^{-9}$
$A_{12} = 1.31874 \times 10^{-10}$
$A_{14} = -4.44648 \times 10^{-12}$
$A_{16} = 1.00002 \times 10^{-13}$
$A_{18} = -1.19017 \times 10^{-15}$
<the optical surface 9>

$K = 0.0$
$A_4 = -1.10644 \times 10^{-4}$,
$A_6 = 2.90173 \times 10^{-7}$
$A_8 = -1.07103 \times 10^{-7}$ TABLE 13A-continued $A_{10} = 2.85402 \times 10^{-9}$
<the optical surface 15>

$K = 0.0$
$A_4 = 9.10913 \times 10^{-5}$,
$A_6 = 3.24177 \times 10^{-7}$
$A_8 = -1.34026 \times 10^{-7}$
$A_{10} = -3.59634 \times 10^{-8}$
<the optical surface 16>

$K = 0.0$
$A_4 = -2.67179 \times 10^{-5}$,
$A_6 = 5.31764 \times 10^{-6}$
$A_8 = -2.07797 \times 10^{-7}$
$A_{10} = 3.28298 \times 10^{-9}$ In Table 13, $D_a$ represents a distance between the first optical lens group G1 and the aperture plate FA integrated with the second optical lens group G2. Likewise, $D_b$ represents a distance between the second optical lens group G2 and the third optical lens group G3, and $D_c$ is a distance between the third optical lens group G3 and the optical filter OF. These distances $D_a$, $D_b$, and $D_c$ are varied by zooming, as indicated below in Table 14.

TABLE 14

| D | $f_1 = 5.97$ | $f_2 = 10.04$ | $f_3 = 16.88$ |
|---|---|---|---|
| $D_a$ | 18.324 | 8.565 | 1.870 |
| $D_b$ | 4.233 | 10.511 | 18.688 |
| $D_c$ | 3.711 | 2.702 | 2.872 |

In Table 14, $f_1$ is a short focal length edge, $f_2$ is a medium focal length edge, and $f_3$ is a long focal length edge.

In addition, the optical elements of the zoom lens system 700 satisfy the following equations;

$(D_4/L_1)=0.325.$ $(N_{13}-N_{14})=-0.106,$ $(\nu_{14}-\nu_{13})=9.02,$ $(N_{22}-N_{23})=0.226,$ $(\nu_{23}-\nu_{22})=36.6,$ $\{(1/r_{21F})+(1/r_{22F})+(1/r_{22R})\}xY'=2.02,$ and $(L_{PN}/L_2)=0.520.$ In the above equations, $D_4$ is a distance on a light axis between an image-facing concave surface (i.e., the optical surface 4) of the negative meniscus lens (i.e., the second lens E2) and a subject-facing convex surface (i.e., the optical surface 5) of the positive lens (i.e., the third lens E3) and $L_1$ is a distance on a light axis between a subject-facing convex surface (i.e., the optical surface i) of the negative meniscus lens (i.e., the first lens E1) and an image-facing surface (i.e., the optical surface 7) of the negative lens (i.e., the fourth lens E4). Further, $N_{13}$ represents a refractive index of the positive lens of the first optical lens group G1 (i.e., the third lens E3), and $N_{14}$ represents a refractive index of the negative lens of the first optical lens group G1 (i.e., the fourth lens E4) conjoined with the positive lens (i.e., the third lens E3). Further, $\nu_{14}$ represents an Abbe number of the negative lens of the first optical lens group G1 (i.e., the fourth lens E4), and $\nu_{13}$ represents an Abbe number of the positive lens of the first optical lens group G1 (i.e., the third lens E3) conjoined with the negative lens (i.e., the third lens E3). Further, $N_{22}$ represents a refractive index of the negative meniscus lens of the second optical lens group G2 (i.e., the sixth lens E6), and $N_{23}$ represents a refractive index of the positive meniscus lens of the second optical lens group G2 (i.e., the seventh lens E7) conjoined with the negative meniscus lens (i.e., the sixth lens E6). Further, $v_{22}$ represents an Abbe number of the negative meniscus lens of the second optical lens group G2 (i.e., the sixth lens E6), and $v_{23}$ represents an Abbe number of the positive meniscus lens of the second optical lens group G2 (i.e., the seventh lens E7) conjoined with the negative meniscus lens (i.e., the sixth lens E6). Further, $r_{21F}$ represents a radius of curvature with respect to the optical surface, facing the subject, of the closest positive meniscus lens to the subject in the second optical lens group G2 (i.e., the fifth lens E5). Further, $r_{22F}$ represents a radius of curvature with respect to the optical surface, facing the subject, of the negative meniscus lens (i.e., the sixth lens E6) in the second optical lens group. Further, $r_{22R}$ represents a radius of curvature with respect to conjoined surfaces of the negative meniscus lens (i.e., the sixth lens E6) and the conjoined positive meniscus lens (i.e., the seventh lens E7) in the second optical lens group. Further, Y' represents a maximum image height. Further, $L_{PN}$ represents a distance between a summit of the optical surface, facing the subject, of the closest positive meniscus lens (i.e., the fifth lens E5) in the second optical lens group and a summit of the conjoined surface of the negative meniscus lens (i.e., the sixth lens E6) and the positive meniscus lens (i.e., the seventh lens E7). Further, $L_2$ represents a thickness of the second optical lens group in a light axis direction.

Figures 26A, 26B, 26C, 26D:
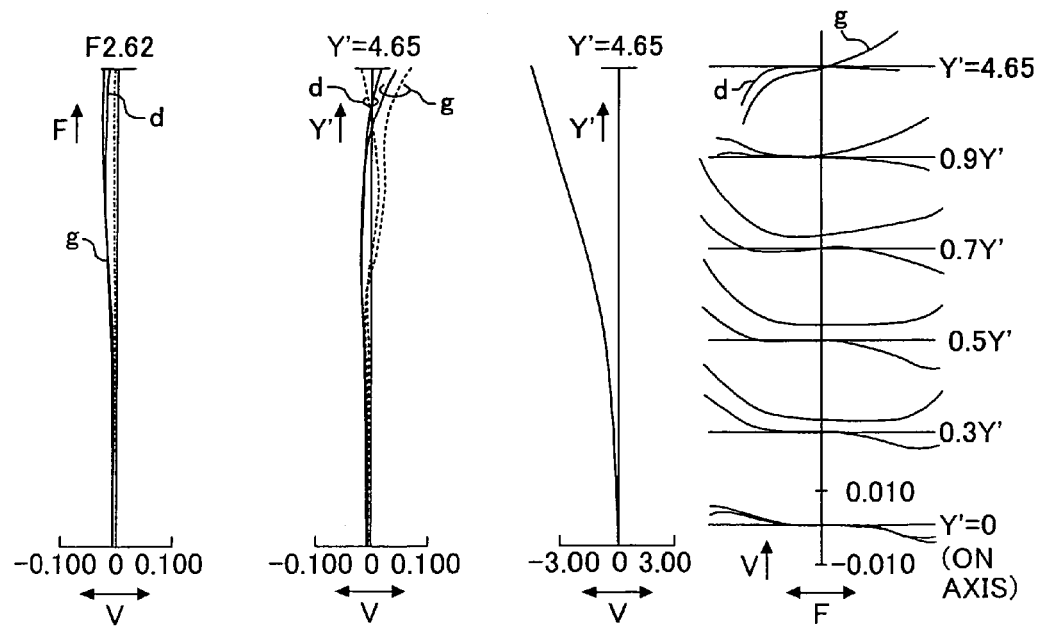
FIGS. 26A–26D are graphs of aberration curves that are a spherical aberration, an astigmatic aberration, a distortion aberration, and a coma aberration, respectively, measured at a short focal length edge of the zoom lens apparatus of FIG. 25.

FIGS. 26A–26D show graphs of aberration curves that are a spherical aberration, an astigmatic aberration, a distortion aberration, and a coma aberration, respectively, measured at the short focal length edge of the zoom lens system 700 of FIG. 25. Likewise, FIGS. 26A–26D show these aberration curves at the medium focal length edge and FIGS. 27A–27D show the aberration curves at the long focal length edge of the zoom lens system 700 of FIG. 25. In each of FIGS. 26A, 27A, and 28A, a thin solid line indicated by a letter d represents a spherical aberration curve of a d-line, a thick solid line indicated by a letter g represents a spherical aberration curve of a g-line, and a thin chain line represents a sine condition. In each of FIGS. 26B, 27B, and 28B, a thin solid line indicated by the letter d represents an astigmatic aberration curve of the d-line and a thin dotted line indicated by the letter d represents an astigmatic aberration of a sagittal ray. Further, in each of FIGS. 26B, 27B, and 28B, a thick solid line indicated by the letter g represents an astigmatic aberration curve of the g-line and a thick dotted line indicated by the letter g represents an astigmatic aberration curve of the sagittal ray. In each of FIGS. 26D, 27D, and 28D, a thin solid line indicated by the letter d represents a coma aberration curve of the d-line and a thick solid line indicated by the letter g represents a coma aberration curve of the g-line. Horizontal axes of the graphs in FIGS. 26A–26C, 27A–27C, and 28A–28C and vertical axes of the graphs in FIGS. 26D, 27D, and 28D represent a relative value V of aberrations. Vertical axes of the graphs in FIGS. 26A, 27A, and 28A and horizontal axes of the graphs in FIGS. 26D, 27D, and 28D represent a ratio of a pupil height (i.e., the F number). Vertical axes of the graphs in FIGS. 26B and 26C, 27B and 27C, and 28B and 28C represent a ratio of image heights.

According to FIGS. 26A–26D, 27A–27D, and 28A–28D, the zoom lens system 700 of FIG. 25 appropriately corrects or suppresses the respective aberrations.

Next, a zoom lens system 800 according to another embodiment of the present invention is explained with reference to FIG. 29. Reference symbols and numerals are given to optical elements of the zoom lens system 800 in a manner independent from those given to each of the zoom lens systems 100, 200, 300, 400, 600, and 700 of FIGS. 1, 5, 9, 13, 17, 21, and 25, respectively. This is to avoid an intricate handling of increasing digits of the reference symbols and numbers. As a result of it, the same reference symbols or numbers in different figures are not necessarily a common optical element.

Figure 29:
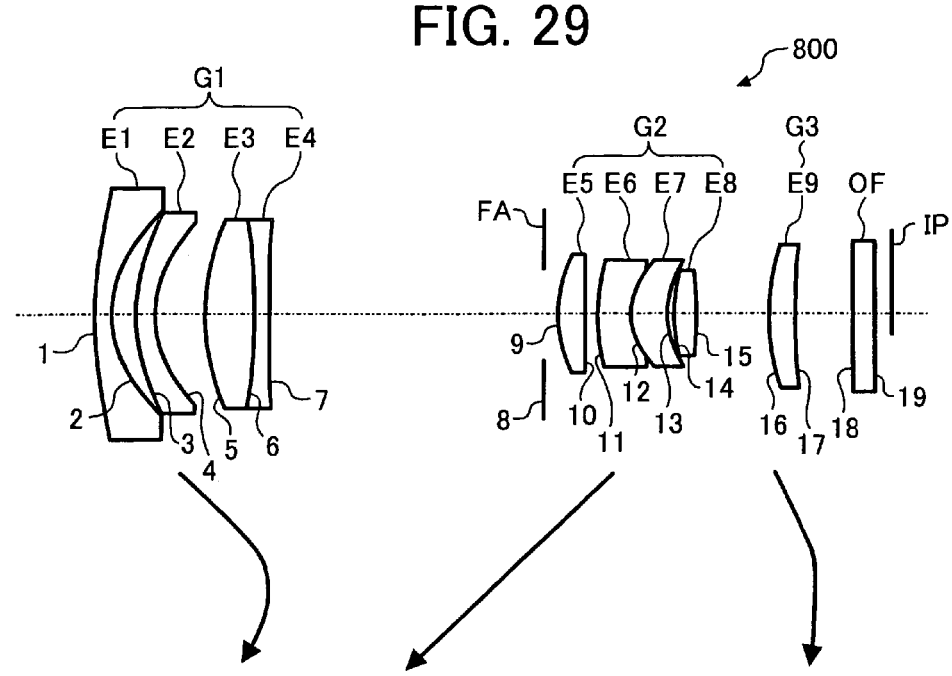
FIG. 29 is a schematic diagram of a zoom lens apparatus according another embodiment of the present invention.

As shown in FIG. 29, the zoom lens system 800 includes various optical elements including a first lens E1, a second lens E2, a third lens E3, a fourth lens E4, a fifth lens E5, a sixth lens E6, a seventh lens E7, an eighth lens E8, a ninth lens E9, an aperture plate FA, and an optical filter OF. In this example, the first lens E1, the second lens E2, the third lens E3, and the fourth lens E4 form a first optical lens group G1. The fifth lens E5, the sixth lens E6, the seventh lens E7, and the eighth lens E8 form a second optical lens group G2. The ninth lens E9 forms a third optical lens group G3. The lenses included in each of the first, second, and third optical lens groups G1–G3 are supported by a common supporting frame or the like and are integrally moved during a zooming operation of the zoom lens system 800. In order to allow the readers to understand the zooming operation, FIG. 29 schematically shows with arrows moving traces of the first, second, and third optical lens groups G1–G3 from an edge of a short focal length (i.e., a wide-angle edge) to an edge of a long focal length (i.e., a telescopic edge) via a medium focal length. In addition, FIG. 29 also shows optical surfaces of the above-mentioned optical elements. That is, the first lens E1 has an optical surface 1 on one side facing a subject, which is not shown but is positioned left in the drawing, and an optical surface 2 on the other side. The second lens E2 has an optical surface 3 on one side facing the subject and an optical surface 4 on the other side. The third lens E3 has an optical surface 5 on one side facing the subject and an optical surface 6 on the other side. The fourth lens E4 has an optical surface which is conjoined with the optical surface 6, on one side facing the subject, and an optical surface 7 on the other side. The aperture plate FA has an optical surface 8 on one side facing the subject. The fifth lens E5 has an optical surface 9 on one side facing the subject and an optical surface 10 on the other side. The sixth lens E6 has an optical surface 11 on one side facing the subject and an optical surface 12 on the other side. The seventh lens E7 has an optical surface which is conjoined with the optical surface 12, on one side facing the subject, and an optical surface 13 on the other side. The eighth lens E8 has an optical surface 14 on one side facing the subject and an optical surface 15 on the other side. The ninth lens E9 has an optical surface 16 on one side facing the subject and an optical surface 17 on the other side. The optical filter OF has an optical surface 18 on one side facing the subject and an optical surface 19 on the other side. In FIG. 29, a term IP represents an image plane on which an image is formed.

In the zoom lens system 800 of FIG. 29, the optical elements are arranged in order of increasing distance to a subject; the first lens E1, the second lens E2, the third lens E3, the fourth lens E4, the aperture plate FA, the fifth lens E5, the sixth lens E6, the seventh lens E7, the eighth lens E8, the ninth lens E9, and the optical filter OF. Through these optical elements, an image of the subject is formed at the image plane IP behind the optical filter OF.

The first lens E1 is a negative meniscus lens having a convex surface (i.e., the optical surface 1) on one side facing the subject. The second lens E2 is a negative meniscus lens having a convex surface (i.e., the optical surface 3) on one side facing the subject. The third lens E3 is a double-convex lens as a positive lens having a convex surface (i.e., the optical surface 5) with a greater curvature on one side facing the subject and another convex surface (i.e., the optical surface 6) on the other side. The fourth lens E4 is a double-concave lens as a negative lens. The third and fourth lenses E3 and E4 are conjoined with each other. The first, second, third, and fourth lenses E1–E4 form a four-element-in-three-group structure, and the first optical lens group G1 including these first, second, third, and fourth lenses E1–E4 has a negative focal length as a whole. The fifth lens E5 is a positive meniscus lens having a convex surface (i.e., the optical surface 9) on one side facing the subject. The sixth lens E6 is a negative meniscus lens having a convex surface (i.e., the optical surface 11) on one side facing the subject. The seventh lens E7 is a positive meniscus lens having a convex surface (i.e., the optical surface 12) on one side facing the subject. The eighth lens E8 is a double-convex lens as a positive lens. The sixth and seventh lenses E6 and E7 are conjoined with each other. The second optical lens group G2 including the fifth, sixth, seventh, and eighth lenses E5–E8, which structure is referred to as a four-element-in-three-group structure, has a positive focal length as a whole. The ninth lens E9 is a double-convex lens as a positive lens having a convex surface (i.e., the optical surface 16) with a greater curvature on one side facing the subject and another convex surface on the other side. The third optical lens group G3 including the ninth lens E9 has a positive focal length. The aperture plate FA is arranged at a side of the second optical lens group G2 facing the subject and is moved together with the second optical lens group G2.

In a scaling change from a short focal length edge to a long focal length edge, the second optical lens group G2 which mainly executes a scaling function is monotonously moved from the image side to the subject side, the first optical lens group G1 is moved in a direction to correct a displacement of the image position caused by the scaling change, and the third optical lens group G3 is moved mainly to move an exit pupil away from the image plane. More specifically, the first, second, and third optical lens groups G1–G3 are moved when a scaling is changed from a short focal length edge to a long focal length edge such that a distance between the first and second optical lens groups G1 and G2 is gradually decreased and that a distance between the second and third optical lens groups G2 and G3 is gradually increased.

In the zoom lens system 800, the focal length f of the entire system, the F number F, and the half view angle ω are variable by zooming. The focal length f varies in a range of from 5.97 to 16.88, the F number F in a range of from 2.61 to 4.45, and the half view angle ω in a range of from 39.20 to 15.54. Optical characteristics of the above-mentioned optical surfaces 1–19 of the optical elements are as shown below in Table 15.

TABLE 15

| No. | R | D | N | ν | Element |
|---|---|---|---|---|---|
| 01 | 36.729 | 1.20 | 1.71300 | 53.94 | 1st lens, 1st group |
| 02 | 9.038 | 1.74 | | | 1st lens, 1st group |
| 03 | 15.598 | 1.20 | 1.74330 | 49.33 | 2nd lens, 1st group |
| 04* | 7.056 | 3.70 | | | 2nd lens, 1st group |
| 05 | 13.749 | 3.39 | 1.68893 | 31.16 | 3rd lens, 1st group |
| 06 | −53.400 | 1.00 | 1.83500 | 42.98 | 3rd/4th lens, 1st group |
| 07 | 64.604 | $D_a$ | | | 4th lens, 1st group |
| 08 | aperture | 1.00 | | | |
| 09* | 9.192 | 1.87 | 1.77250 | 49.62 | 5th lens, 2nd group |
| 10 | 45.610 | 0.87 | | | 5th/6th lens, 2nd group |
| 11 | 12.640 | 2.45 | 1.84666 | 23.78 | 6th lens, 2nd group |
| 12 | 5.000 | 2.68 | 1.58913 | 61.25 | 7th lens, 2nd group |
| 13 | 6.947 | 0.40 | | | 7th lens, 2nd group |
| 14 | 14.423 | 1.65 | 1.48749 | 70.44 | 8th lens, 2nd group |
| 15* | −28.923 | $D_b$ | | | 8th lens, 2nd group |
| 16* | 21.317 | 1.96 | 1.63854 | 55.45 | 9th lens, 3rd group |
| 17 | 282.800 | $D_c$ | | | 9th lens, 3rd group |
| 18 | ∞ | 1.43 | 1.51680 | 64.20 | filter |
| 19 | ∞ | | | | filter |

In Table 15, numbers in a column of No. represent the numbers of the optical surfaces, and the surfaces 4, 9, 15, and 16 indicated with a suffix of an asterisk mark (*) are aspheric and their parameters are as indicated below in Table 15A.

TABLE 15A

<the optical surface 4>

$K = 0.0$
$A_4 = -3.28735 \times 10^{-4}$,
$A_6 = -3.95505 \times 10^{-6}$
$A_8 = 1.71512 \times 10^{-9}$
$A_{10} = -5.76704 \times 10^{-9}$
$A_{12} = 1.88632 \times 10^{-10}$
$A_{14} = -5.01533 \times 10^{-12}$
$A_{16} = 8.46845 \times 10^{-14}$
$A_{18} = -9.53474 \times 10^{-16}$ <the optical surface 9>

$K = 0.0$
$A_4 = -9.81680 \times 10^{-5}$,
$A_6 = 2.13804 \times 10^{-7}$
$A_8 = -7.01685 \times 10^{-8}$
$A_{10} = 1.49964 \times 10^{-9}$ <the optical surface 15>

$K = 0.0$
$A_4 = 1.02941 \times 10^{-4}$,
$A_6 = 1.46109 \times 10^{-5}$
$A_8 = -1.82418 \times 10^{-6}$
$A_{10} = 8.25168 \times 10^{-8}$ <the optical surface 16>

$K = 0.0$
$A_4 = 1.53668 \times 10^{-5}$,
$A_6 = 6.06988 \times 10^{-7}$
$A_8 = 1.88462 \times 10^{-8}$
$A_{10} = -3.07013 \times 10^{-10}$ In Table 15, $D_a$ represents a distance between the first optical lens group G1 and the aperture plate FA integrated with the second optical lens group G2. Likewise, $D_b$ represents a distance between the second optical lens group G2 and the third optical lens group G3, and $D_c$ is a distance between the third optical lens group G3 and the optical filter OF. These distances $D_a$, $D_b$, and $D_c$ are varied by zooming, as indicated below in Table 16.

TABLE 16

| D | $f_1 = 5.97$ | $f_2 = 10.05$ | $f_3 = 16.88$ |
|---|---|---|---|
| $D_a$ | 19.150 | 7.743 | 1.892 |
| $D_b$ | 4.913 | 9.215 | 19.304 |
| $D_c$ | 3.979 | 4.673 | 3.074 |

In Table 16, $f_1$ is a short focal length edge, $f_2$ is a medium focal length edge, and $f_3$ is a long focal length edge.

In addition, the optical elements of the zoom lens system 800 satisfy the following equations;

$$(D_4/L_1)=0.303,$$

$$(N_{13}-N_{14})=-0.146,$$

$$(v_{14}-v_{13})=11.82,$$

$$(N_{22}-N_{23})=0.258,$$

$$(v_{23}-v_{22})=37.5,$$

$$\{(1/r_{21F})+(1/r_{22F})+(1/r_{22R})\}xY'=1.80, \text{ and}$$

$$(L_{PN}/L_2)=0.523.$$

In the above equations, $D_4$ is a distance on a light axis between an image-facing concave surface (i.e., the optical surface 4) of the negative meniscus lens (i.e., the second lens E2) and a subject-facing convex surface (i.e., the optical surface 5) of the positive lens (i.e., the third lens E3) and $L_1$ is a distance on a light axis between a subject-facing convex surface (i.e., the optical surface 1) of the negative meniscus lens (i.e., the first lens E1) and an image-facing surface (i.e., the optical surface 7) of the negative lens (i.e., the fourth lens E4). Further, $N_{13}$ represents a refractive index of the positive lens of the first optical lens group G1 (i.e., the third lens E3), and $N_{14}$ represents a refractive index of the negative lens of the first optical, lens group G1 (i.e., the fourth lens E4) conjoined with the positive lens (i.e., the third lens E3). Further, $v_{14}$ represents an Abbe number of the negative lens of the first optical lens group G1 (i.e., the fourth-lens E4), and $v_{13}$ represents an Abbe number of the positive lens of the first optical lens group G1 (i.e., the third lens E3) conjoined with the negative lens (i.e., the third lens E3). Further, $N_{22}$ represents a refractive index of the negative meniscus lens of the second optical lens group G2 (i.e., the sixth lens E6), and $N_{23}$ represents a refractive index of the positive meniscus lens of the second optical lens group G2 (i.e., the seventh lens E7) conjoined with the negative meniscus lens (i.e., the sixth lens E6). Further, $v_{22}$ represents an Abbe number of the negative meniscus lens of the second optical lens group G2 (i.e., the sixth lens E6), and $v_{23}$ represents an Abbe number of the positive meniscus lens of the second optical lens group G2 (i.e., the seventh lens E7) conjoined with the negative meniscus lens (i.e., the sixth lens E6). Further, $r_{21F}$ represents a radius of curvature with respect to the optical surface, facing the subject, of the closest positive meniscus lens to the subject in the second optical lens group G2 (i.e., the fifth lens E5). Further, $r_{22F}$ represents a radius of curvature with respect to the optical surface, facing the subject, of the negative meniscus lens (i.e., the sixth lens E6) in the second optical lens group. Further, $r_{22R}$ represents a radius of curvature with respect to conjoined surfaces of the negative meniscus lens (i.e., the sixth lens E6) and the conjoined positive meniscus lens.(i.e., the seventh lens E7) in the second optical lens group. Further, Y' represents a maximum image height. Further, $L_{PN}$ represents a distance between summit of the optical surface, facing the subject, of the closest positive meniscus lens (i.e., the fifth lens E5) in the second optical lens group and a summit of the conjoined surface of the negative meniscus lens (i.e., the sixth lens E6) and the positive meniscus lens (i.e., the seventh lens E7). Further, $L_2$ represents a thickness of the second optical lens group in a light axis direction.

Figures 30A, 30B, 30C, 30D:
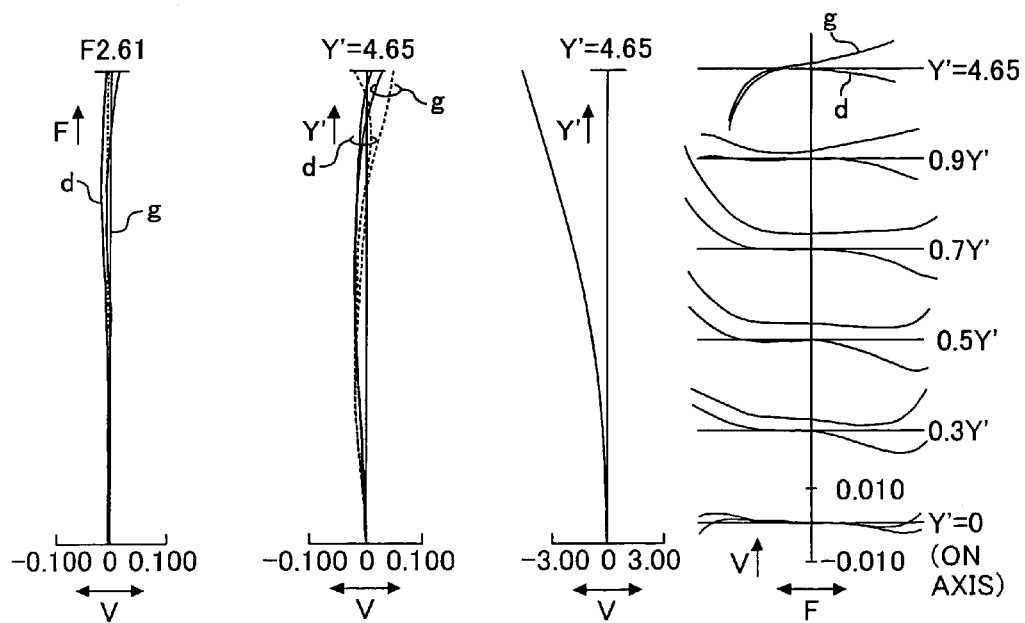
FIGS. 30A–30D are graphs of aberration curves that are a spherical aberration, an astigmatic aberration, a distortion aberration, and a coma aberration, respectively, measured at a short focal length edge of the zoom lens apparatus of FIG. 29.

FIGS. 30A–30D show graphs of aberration curves that are a spherical aberration, an astigmatic aberration, a distortion aberration, and a coma aberration, respectively, measured at the short focal length edge of the zoom lens system 800 of FIG. 29. Likewise, FIGS. 31A–31D show these aberration curves at the medium focal length edge and FIGS. 32A–32D show the aberration curves at the long focal length edge of the zoom lens system 800 of FIG. 29. In each of FIGS. 30A, 31A, and 32A, a thin solid line indicated by a letter d represents a spherical aberration curve of a d-line, a thick solid line indicated by a letter g represents a spherical aberration curve of a g-line, and a thin chain line represents a sine condition. In each of FIGS. 30B, 31B, and 32B, a thin solid line indicated by the letter d represents an astigmatic aberration curve of the d-line and a thin dotted line indicated by the letter d represents an astigmatic aberration of a sagittal ray. Further, in each of FIGS. 30B, 31B, and 32B, a thick solid line indicated by the letter g represents an astigmatic aberration curve of the g-line and a thick dotted line indicated by the letter g represents an astigmatic aberration curve of the sagittal ray. In each of FIGS. 30D, 31D, and 32D, a thin solid line indicated by the letter d represents a coma aberration curve of the d-line and a thick solid line indicated by the letter g represents a coma aberration curve of the g-line. Horizontal axes of the graphs in FIGS. 30A–30C, 31A–31C, and 32A–32C and vertical axes of the graphs in FIGS. 30D, 31D, and 32D represent a relative value V of aberrations. Vertical axes of the graphs in FIGS. 30A, 31A, and 32A and horizontal axes of the graphs in FIGS. 30D, 31D, and 32D represent a ratio of a pupil height (i.e., the F number). Vertical axes of the graphs in FIGS. 30B and 30C, 31B and 31C, and 32B and 32C represent a ratio of image heights.

According to FIGS. 30A–30D, 31A–31D, and 32A–32D, the zoom lens system 800 of FIG. 29 appropriately corrects or suppresses the respective aberrations.

Next, a zoom lens system 900 according to another embodiment of the present invention is explained with reference to FIG. 33. Reference symbols and numerals are given to optical elements of the zoom lens system 900 in a manner independent from those given to each of the zoom lens systems 100, 200, 300, 400, 500, 600, 700, and 800 of FIGS. 1, 5, 9, 13, 17, 21, 25, and 29, respectively. This is to avoid an intricate handling of increasing digits of the reference symbols and numbers. As a result of it, the same reference symbols or numbers in different figures are not necessarily a common optical element.

Figure 33:
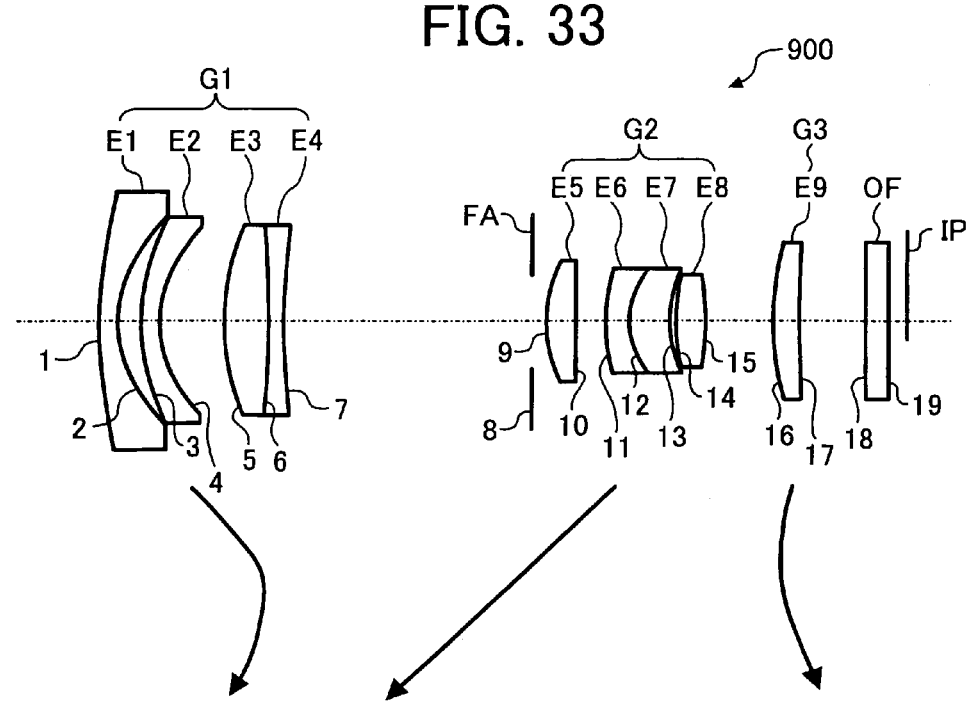
FIG. 33 is a schematic diagram of a zoom lens apparatus according another embodiment of the present invention.

As shown in FIG. 33, the zoom lens system 900 includes various optical elements including a first lens E1, a second lens E2, a third lens E3, a fourth lens E4, a fifth lens E5, a sixth lens E6, a seventh lens E7, an eighth lens E8, a ninth lens E9, an aperture plate FA, and an optical filter OF. In this example, the first lens E1, the second lens E2, the third lens E3, and the fourth lens E4 form a first optical lens group G1. The fifth lens E5, the sixth lens E6, the seventh lens E7, and the eighth lens E8 form a second optical lens group G2. The ninth lens E9 forms a third optical lens group G3. The lenses included in each of the first, second, and third optical lens groups G1–G3 are supported by a common supporting frame or the like and are integrally moved during a zooming operation of the zoom lens system 900. In order to allow the readers to understand the zooming operation, FIG. 33 schematically shows with arrows moving traces of the first, second, and third optical lens groups G1–G3 from an edge of a short focal length (i.e., a wide-angle edge) to an edge of a long focal length (i.e., a telescopic edge) via a medium focal length. In addition, FIG. 33 also shows optical surfaces of the above-mentioned optical elements. That is, the first lens E1 has an optical surface 1 on one side facing a subject, which is not shown but is positioned left in the drawing, and an optical surface 2 on the other side. The second lens E2 has an optical surface 3 on one side facing the subject and an optical surface 4 on the other side. The third lens E3 has an optical surface 5 on one side facing the subject and an optical surface 6 on the other side. The fourth lens E4 has an optical surface which is conjoined with the optical surface 6, on one side facing the subject, and an optical surface 7 on the other side. The aperture plate FA has an optical surface 8 on one side facing the subject. The fifth lens E5 has an optical surface 9 on one side facing the subject and an optical surface 10 on the other side. The sixth lens E6 has an optical surface 11 on one side facing the subject and an optical surface 12 on the other side. The seventh lens E7 has an optical surface which is conjoined with the optical surface 12, on one side facing the subject, and an optical surface 13 on the other side. The eighth lens E8 has an optical surface 14 on one side facing the subject and an optical surface 15 on the other side. The ninth lens E9 has an optical surface 16 on one side facing the subject and an optical surface 17 on the other side. The optical filter OF has an optical surface 18 on one side facing the subject and an optical surface 19 on the other side. In FIG. 33, a term IP represents an image plane on which an image is formed.

In the zoom lens system 900 of FIG. 33, the optical elements are arranged in order of increasing distance to a subject; the first lens E1, the second lens E2, the third lens E3, the fourth lens E4, the aperture plate FA, the fifth lens E5, the sixth lens E6, the seventh lens E7, the eighth lens E8, the ninth lens E9, and the optical filter OF. Through these optical elements, an image of the subject is formed at the image plane IP behind the optical filter OF.

The first lens E1 is a negative meniscus lens having a convex surface (i.e., the optical surface 1) on one side facing the subject. The second lens E2 is a negative meniscus lens having a convex surface (i.e., the optical surface 3) on one side facing the subject. The third lens E3 is a double-convex lens as a positive lens having a convex surface (i.e., the optical surface 5) with a greater curvature on one side facing the subject and another convex surface (i.e., the optical surface 6) on the other side. The fourth lens E4 is a double-concave lens as a negative lens. The third and fourth lenses E3 and E4 are conjoined with each other. The first, second, third, and fourth lenses E1–E4 form a four-element-in-three-group structure, and the first optical lens group G1 including these first, second, third, and fourth lenses E1–E4 has a negative focal length as a whole. The fifth lens E5 is a positive meniscus lens having a convex surface (i.e., the optical surface 9) on one side facing the subject. The sixth lens E6 is a negative meniscus lens having a convex surface (i.e., the optical surface 11) on one side facing the subject. The seventh lens E7 is a positive meniscus lens having a convex surface (i.e., the optical surface 12) on one side facing the subject. The eighth lens E8 is a double-convex lens as a positive lens. The sixth and seventh lenses E6 and E7 are conjoined with each other. The second optical lens group G2 including the fifth, sixth, seventh, and eighth lenses E5–E8, which structure is referred to as a four-element-in-three-group structure, has a positive focal length as a whole. The ninth lens E9 is a double-convex lens as a positive lens having a convex surface (i.e., the optical surface 16) with a greater curvature on one side facing the subject and another convex surface on the other side. The third optical lens group G3 including the ninth lens E9 has a positive focal length. The aperture plate FA is arranged at a side of the second optical lens group G2 facing the subject and is moved together with the second optical lens group G2.

In a scaling change from a short focal length edge to a long focal length edge, the second optical lens group G2 which mainly executes a scaling function is monotonously moved from the image side to the subject side, the first optical lens group G1 is moved in a direction to correct a displacement of the image position caused by the scaling change, and the third optical lens group G3 is moved mainly to move an exit pupil away from the image plane. More specifically, the first, second, and third optical lens groups G1–G3 are moved when a scaling is changed from a short focal length edge to a long focal length edge such that a distance between the first and second optical lens groups G1 and G2 is gradually decreased and that a distance between the second and third optical lens groups G2 and G3 is gradually increased.

In the zoom lens system 900, the focal length f of the entire system, the F number F, and the half view angle ω are variable by zooming. The focal length f varies in a range of from 5.97 to 14.07, the F number F in a range of from 2.61 to 4.05, and the half view angle ω in a range of from 39.20 to 18.55. Optical characteristics of the above-mentioned optical surfaces 1–19 of the optical elements are as shown below in Table 17.

TABLE 17

| No. | R | D | N | ν | Element |
|---|---|---|---|---|---|
| 01 | 32.532 | 1.20 | 1.77250 | 49.62 | 1st lens, 1st group |
| 02 | 8.982 | 1.38 | | | 1st lens, 1st group |
| 03 | 15.418 | 1.20 | 1.74330 | 49.33 | 2nd lens, 1st group |
| 04* | 6.710 | 4.02 | | | 2nd lens, 1st group |
| 05 | 13.742 | 2.85 | 1.69895 | 30.05 | 3rd lens, 1st group |
| 06 | −107.456 | 1.00 | 1.67003 | 47.20 | 3rd/4th lens, 1st group |
| 07 | 41.620 | $D_a$ | | | 4th lens, 1st group |
| 08 | aperture | 1.00 | | | |
| 09* | 9.083 | 1.87 | 1.77250 | 49.62 | 5th lens, 2nd group |
| 10 | 88.412 | 1.80 | | | 5th/6th lens, 2nd group |
| 11 | 12.891 | 1.45 | 1.84666 | 23.78 | 6th lens, 2nd group |
| 12 | 5.000 | 2.57 | 1.62041 | 60.34 | 7th lens, 2nd group |
| 13 | 6.891 | 0.41 | | | 7th lens, 2nd group |
| 14 | 15.116 | 1.63 | 1.48749 | 70.44 | 8th lens, 2nd group |
| 15* | −27.872 | $D_b$ | | | 8th lens, 2nd group |
| 16* | 21.495 | 1.69 | 1.71300 | 53.94 | 9th lens, 3rd group |
| 17 | 283.403 | $D_c$ | | | 9th lens, 3rd group |
| 18 | ∞ | 1.43 | 1.51680 | 64.20 | filter |
| 19 | ∞ | | | | filter |

In Table 17, numbers in a column of No. represent the numbers of the optical surfaces, and the surfaces 4, 9, 15, and 16 indicated with a suffix of an asterisk mark (*) are aspheric and their parameters are as indicated below in Table 17A.

TABLE 17A

<the optical surface 4>

K = 0.0
$A_4 = -3.65648 \times 10^{-4}$,
$A_6 = -7.69868 \times 10^{-6}$
$A_8 = 3.21673 \times 10^{-7}$
$A_{10} = -1.69702 \times 10^{-8}$
$A_{12} = 6.39510 \times 10^{-10}$
$A_{14} = 3.39873 \times 10^{-12}$
$A_{16} = -4.70104 \times 10^{-13}$
$A_{18} = 5.69704 \times 10^{-15}$ <the optical surface 9>

K = 0.0
$A_4 = -1.20418 \times 10^{-4}$,
$A_6 = 4.09247 \times 10^{-7}$
$A_8 = -1.17777 \times 10^{-7}$
$A_{10} = 3.33202 \times 10^{-9}$ <the optical surface 15>

K = 0.0
$A_4 = 1.34801 \times 10^{-4}$,
$A_6 = 2.11761 \times 10^{-5}$
$A_8 = -2.36142 \times 10^{-6}$
$A_{10} = 1.08818 \times 10^{-7}$ <the optical surface 16>

K = 0.0
$A_4 = 2.73069 \times 10^{-6}$,
$A_6 = 4.04193 \times 10^{-6}$
$A_8 = -1.57711 \times 10^{-7}$
$A_{10} = 2.95910 \times 10^{-9}$ In Table 17, $D_a$ represents a distance between the first optical lens group G1 and the aperture plate FA integrated with the second optical lens group G2. Likewise, $D_b$ represents a distance between the second optical lens group G2 and the third optical lens group G3, and $D_c$ is a distance between the third optical lens group G3 and the optical filter OF. These distances $D_a$, $D_b$, and $D_c$ are varied by zooming, as indicated below in Table 18.

TABLE 18

| D | $f_1$ = 5.97 | $f_2$ = 9.17 | $f_3$ = 14.07 |
|---|---|---|---|
| $D_a$ | 15.083 | 6.475 | 1.929 |
| $D_b$ | 4.341 | 7.749 | 15.776 |
| $D_c$ | 4.095 | 4.671 | 2.898 |

In Table 18, $f_1$ is a short focal length edge, $f_2$ is a medium focal length edge, and $f_3$ is a long focal length edge.

In addition, the optical elements of the zoom lens system 900 satisfy the following equations;

$(D_4/L_1)=0.345$.

$(N_{13}-N_{14})=0.029$, $(v_{14}-v_{13})=17.2$, $(N_{22}-N_{23})=0.226$, $(v_{23}-v_{22})=36.56$, $\{(1/r_{21F})+(1/r_{22F})+(1/r_{22R})\} \times Y'=1.80$, and $(L_{PN}/L_2)=0.526$.

In the above equations, $D_4$ is a distance on a light axis between an image-facing concave surface (i.e., the optical surface 4) of the negative meniscus lens (i.e., the second lens E2) and a subject-facing convex surface (i.e., the optical surface 5) of the positive lens (i.e., the third lens E3) and $L_1$ is a distance on a light axis between a subject-facing convex surface (i.e., the optical surface 1) of the negative meniscus lens (i.e., the first lens E1) and an image-facing surface (i.e., the optical surface 7) of the negative lens (i.e., the fourth lens E4). Further, $N_{13}$ represents a refractive index of the positive lens of the first optical lens group G1 (i.e., the third lens E3), and $N_{14}$ represents a refractive index of the negative lens of the first optical lens group G1 (i.e., the fourth lens E4) conjoined with the positive lens (i.e., the third lens E3). Further, $v_{14}$ represents an Abbe number of the negative lens of the first optical lens group G1 (i.e., the fourth lens E4), and $v_{13}$ represents an Abbe number of the positive lens of the first optical lens group G1 (i.e., the third lens E3) conjoined with the negative lens (i.e., the third lens E3). Further, $N_{22}$ represents a refractive index of the negative meniscus lens of the second optical lens group G2 (i.e., the sixth lens E6), and $N_{23}$ represents a refractive index of the positive meniscus lens of the second optical lens group G2 (i.e., the seventh lens E7) conjoined with the negative meniscus lens (i.e., the sixth lens E6). Further, $v_{22}$ represents an Abbe number of the negative meniscus lens of the second optical lens group G2 (i.e., the sixth lens E6), and $v_{23}$ represents an Abbe number of the positive meniscus lens of the second optical lens group G2 (i.e., the seventh lens E7) conjoined with the negative meniscus lens (i.e., the sixth lens E6). Further, $r_{21F}$ represents a radius of curvature with respect to the optical surface, facing the subject, of the closest positive meniscus lens to the subject in the second optical lens group G2 (i.e., the fifth lens E5). Further, $r_{22F}$ represents a radius of curvature with respect to the optical surface, facing the subject, of the negative meniscus lens (i.e., the sixth lens E6) in the second optical lens group. Further, $r_{22R}$ represents a radius of curvature with respect to conjoined surfaces of the negative meniscus lens (i.e., the sixth lens E6) and the conjoined positive meniscus lens (i.e., the seventh lens E7) in the second optical lens group. Further, Y' represents a maximum image height. Further, $L_{PN}$ represents a distance between a summit of the optical surface, facing the subject, of the closest positive meniscus lens (i.e., the fifth lens E5) in the second optical lens group and a summit of the conjoined surface of the negative meniscus lens (i.e., the sixth lens E6) and the positive meniscus lens (i.e., the seventh lens E7). Further, $L_2$ represents a thickness of the second optical lens group in a light axis direction.

Figures 34A, 34B, 34C, 34D:
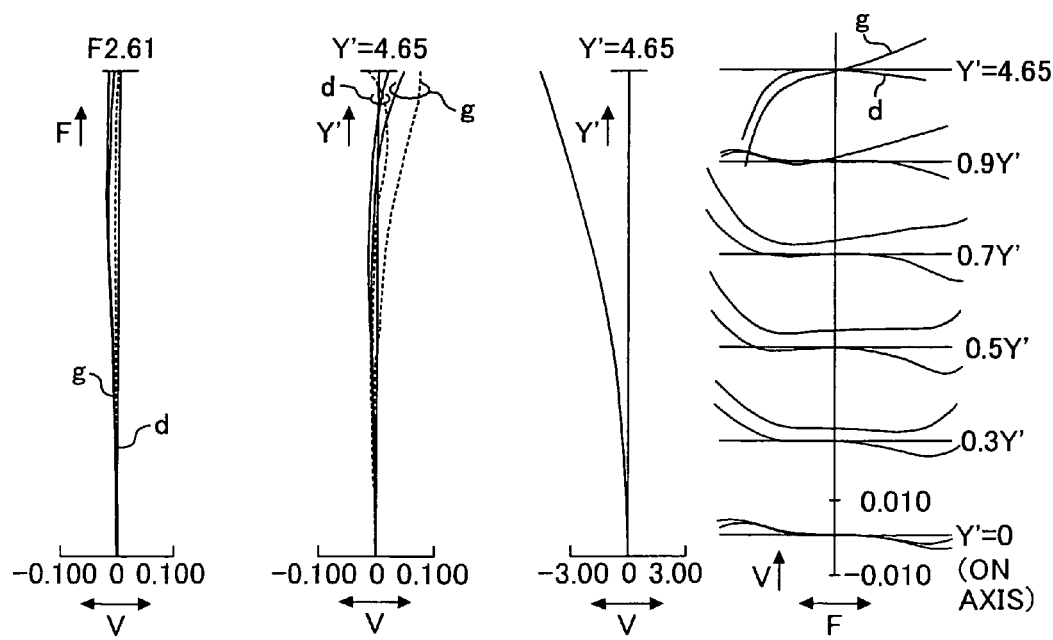
FIGS. 34A–34D are graphs of aberration curves that are a spherical aberration, an astigmatic aberration, a distortion aberration, and a coma aberration, respectively, measured at a short focal length edge of the zoom lens apparatus of FIG. 33.

FIGS. 34A–34D show graphs of aberration curves that are a spherical aberration, an astigmatic aberration, a distortion aberration, and a coma aberration, respectively, measured at the short focal length edge of the zoom lens system 900 of FIG. 33. Likewise, FIGS. 35A–35D show these aberration curves at the medium focal length edge and FIGS. 35A–35D show the aberration curves at the long focal length edge of the zoom lens system 900 of FIG. 33. In each of FIGS. 34A, 35A, and 36A, a thin solid line indicated by a letter d represents a spherical aberration curve of a d-line, a thick solid line indicated by a letter g represents a spherical aberration curve of a g-line, and a thin chain line represents a sine condition. In each of FIGS. 34B, 35B, and 36B, a thin solid line indicated by the letter d represents an astigmatic aberration curve of the d-line and a thin dotted line indicated by the letter d represents an astigmatic aberration of a sagittal ray. Further, in each of FIGS. 33B, 34B, and 35B, a thick solid line indicated by the letter g represents an astigmatic aberration curve of the g-line and a thick dotted line indicated by the letter g represents an astigmatic aberration curve of the sagittal ray. In each of FIGS. 34D, 35D, and 35D, a thin solid line indicated by the letter d represents a coma aberration curve of the d-line and a thick solid line indicated by the letter g represents a coma aberration curve of the g-line. Horizontal axes of the graphs in FIGS. 34A–34C, 35A–35C, and 36A–36C and vertical axes of the graphs in FIGS. 34D, 35D, and 36D represent a relative value V of aberrations. Vertical axes of the graphs in FIGS. 34A, 35A, and 36A and horizontal axes of the graphs in FIGS. 34D, 35D, and 36D represent a ratio of a pupil height (i.e., the F number). Vertical axes of the graphs in FIGS. 34B and 34C, 35B and 35C, and 36B and 36C represent a ratio of image heights.

According to FIGS. 34A–34D, 35A–35D, and 36A–36D, the zoom lens system 900 of FIG. 33 appropriately corrects or suppresses the respective aberrations.

Figure 37A:
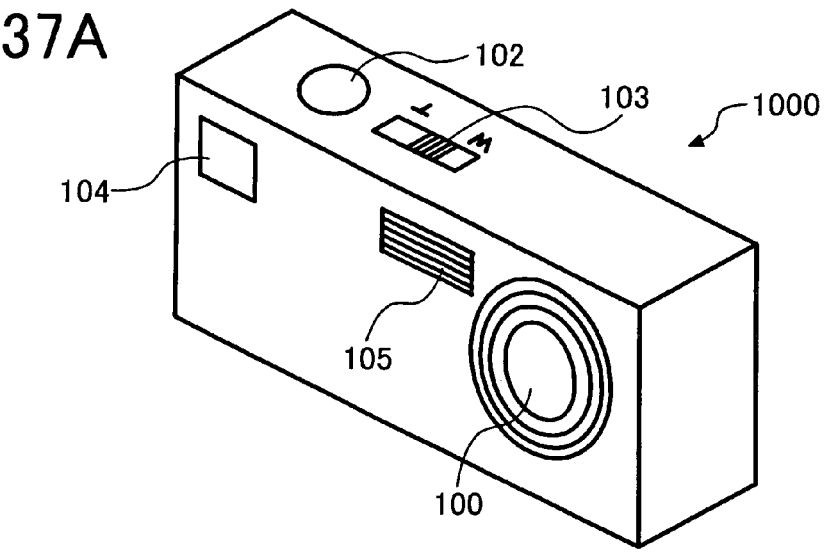
FIGS. 37A–37C are schematic perspective diagrams of a digital camera according an embodiment of the present invention.
Figure 37B:
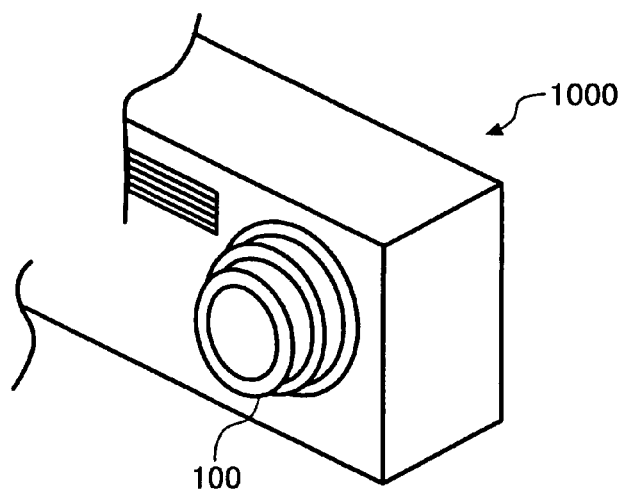
Figure 37C:
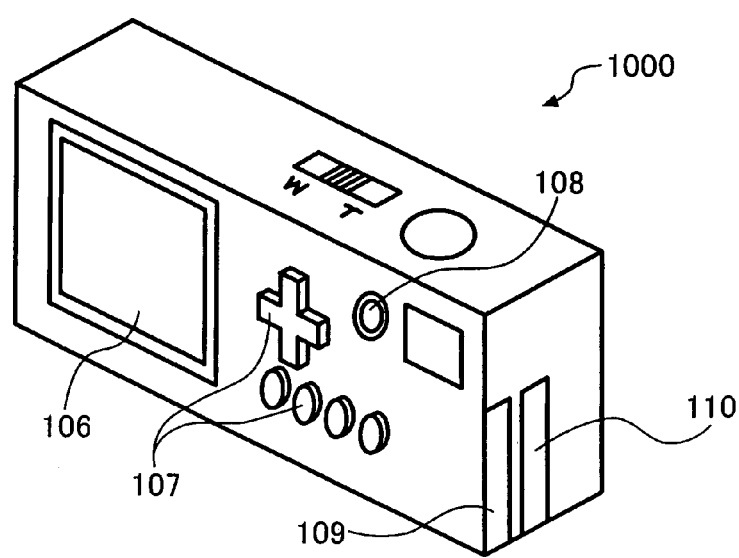
Figure 38:
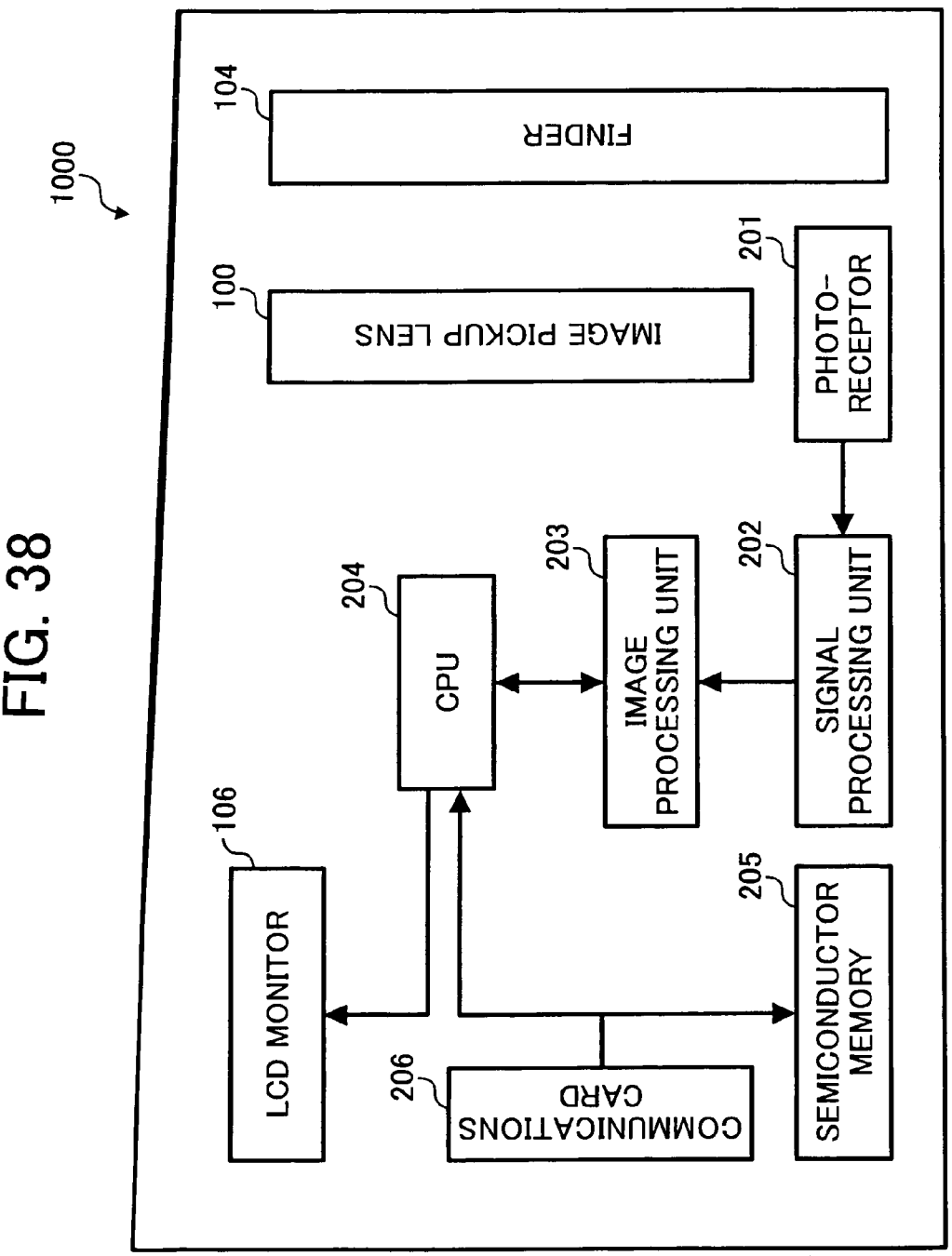
FIG. 38 is a schematic block diagram of the digital camera of FIGS. 37A–37C.

Referring to FIGS. 37A–37C and 38, a digital camera 1000 according to an exemplary embodiment of the present invention is explained. FIG. 37A shows a perspective view of the digital camera 1000 seen from a subject side. FIG. 37B shows a perspective partial view of the digital camera 1000 with the zoom lens system 100 of FIG. 1 at its extension state. FIG. 37C shows a perspective view of the digital camera 1000 seen from an opposite side relative to the subject side. FIG. 38 shows a block diagram of the digital camera 1000.

As an alternative to the zoom lens system 100, one of the zoom lens systems 200, 300, 400, 500, 600, 700, 800, and 900 may be used for the digital camera 1000.

In a manner similar to the digital camera 1000 discussed here as an exemplary apparatus using the zoom lens system 100, a mobile information terminal apparatus such as a personal digital assistant apparatus, a cellular phone, and the like which includes a camera function may include the zoom lens system 100.

As shown in FIGS. 37A–37C, the digital camera 1000 includes the zoom lens system 100, a shutter button 102, a zoom lever 103, a finder 104, an electronic flash 105, an LCD (liquid crystal display) monitor 106, a plurality of operation keys 107, a power switch 108, a memory card slot 109, and a communications card slot 110. Further, as shown in FIG. 38, the digital camera 1000 includes a photoreceptor 201, a signal processing unit 202, an image processing unit 203, a CPU (central processing unit) 204, a semiconductor memory 205, and a communications card 206.

In the digital camera 1000, the zoom lens system 100 picks up an image of a subject, and the photoreceptor 201 including CCD (charge-coupled device) elements, for example, for serving as an area sensor reads the image of the subject picked up by the zoom lens system 100.

As shown in FIG. 38, an output from the photoreceptor 201 is processed and is converted into digital image information by the signal processing unit 202 which is controlled by the CPU 203. The digital image information output from the signal processing unit 202 is then subjected to a predetermined image processing process performed by the image processing unit 203 which is also controlled by the CPU 204. After the image processing process, the digital image information is stored in the semiconductor memory 205 which is either a memory card inserted in the memory card slot 109 or a memory unit built in the digital camera 1000. The LCD monitor 106 displays an image being picked up and an image being stored in the semiconductor memory 205. The image stored in the semiconductor memory 205 can be transmitted to external equipment through the communications card 206 inserted in the communications card slot 110.

The zoom lens system 100 is in a retracted state, as shown in FIG. 37A, when the digital camera 1000 is not in an operation state. When the power switch 108 is depressed, the digital camera 100 is powered and a zooming mechanism of the zoom lens system 100 is activated so that the zoom lens system 100 is projected from a camera body, as shown in FIG. 37B. At this time, the optical lens groups in the zoom lens system 100 are set to a predetermined arrangement of the short focal length edge, for example, and such arrangement can be changed towards an arrangement of the long focal length edge by manipulating the zoom lever 103. Preferably, the scaling of the finder 104 is also changed according to the change of a view angle of the zoom lens system 100.

Focusing is obtained by a half-depression of the shutter button 102. More specifically, focusing is achieved by moving the first optical lens group or the second optical lens group, or the photoreceptor 201. When the shutter button 102 is further depressed, the image shooting is carried out.

The operation keys 107 are used to manipulate the image stored in the semiconductor memory 205 to display it on the LCD monitor 106, or to transmit to external equipment through the communications card 206, for example.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent applications, No. JPAP2002-320584 filed on Nov. 1, 2002 and No. JPAP2003-022254 file on Jan. 30, 2003 in the Japanese Patent Office, the entire contents of which are incorporated by reference herein.

What is claimed is:

1. A zoom lens apparatus, comprising:
   a first optical lens group having a negative focal length arranged at a first position closest to a subject;
   a second optical lens group having a positive focal length arranged at a second position second closest to the subject;
   an aperture diaphragm which is disposed to a subject side of the second optical lens group closer to the subject in a manner such that the aperture diaphragm is movable integrally with the second optical lens group; and
   a third optical lens group having a positive focal length arranged at a third position third closest to the subject,
   wherein at least the first and second optical lens groups are moved to change a magnification of the zoom lens apparatus,
   wherein the second optical lens group comprises a three-group and four-lens structure which comprises:
      a positive lens arranged at a first sub-position closest to the subject in the second optical lens group and such that a greater-curvature surface of the positive lens faces the subject;
      a negative meniscus lens arranged at a second sub-position second closest to the subject in the second optical lens group and such that a concave of the negative meniscus lens faces the subject;
      a positive meniscus lens conjoined with the negative meniscus lens and arranged at a third sub-position third closest to the subject in the second optical lens group; and
      a positive lens arranged at a fourth sub-position fourth closest to the subject in the second optical lens group, wherein the zoom lens system satisfies an inequality condition $0.15<(N_{22}-N_{23})<0.40$, wherein N22 is a refractive index of the negative meniscus lens of the second optical lens group and N23 is a refractive index of the positive meniscus lens of the second optical lens group conjoined with the negative meniscus lens.

2. The zoom lens system according to claim 1, wherein the zoom lens system satisfies an inequality condition $25<(\nu_{22}-\nu_{23})<50$, wherein $\nu_{22}$ is an Abbe number of the negative meniscus lens in the second optical lens group and $\nu_{22}$ is an Abbe number of the positive meniscus lens conjoined with the negative meniscus lens in the second optical lens group.

3. The zoom lens system according to claim 1, wherein the zoom lens system satisfies an inequality condition $1.40<((1/r_{21F})+(1/r_{22F})+(1/r_{22R}))*Y'<2.20$, wherein $r_{21F}$ is a radius of curvature of a subject-side surface of the positive lens arranged at the first sub-position in the second optical lens group, $r_{22F}$ is a radius of curvature of a subject-side surface of the negative meniscus lens arranged at the second sub-position in the second optical lens group, $r_{22R}$ is a radius of curvature of a conjoined surface of the negative meniscus lens arranged at the second sub-position and the positive lens arranged at the third sub-position in the second optical lens group, and Y' is an image height.

4. The zoom lens system according to claim 1, wherein the zoom lens system satisfies an inequality condition $1.40<(L_{PN}/L_2)<0.70$, wherein $L_{PN}$ is a distance between a summit of the subject-side surface of the positive lens arranged at the first sub-position and a summit of the conjoined surface of the negative meniscus lens arranged at the second sub-position and the positive lens arranged at the third sub-position in the second optical lens group, and $L_2$ is a thickness of the second optical lens group in a direction of a light axis of the second optical lens group.

5. The zoom lens system according to claim 1, wherein the conjoined surface of the negative meniscus lens arranged at the second sub-position and the positive lens arranged at the third sub-position has a radius of curvature which is greatest among lens surfaces included in the second optical lens group.

6. The zoom lens system according to claim 1, wherein the subject-side surface of the positive lens arranged at the first sub-position in the second optical lens group and an image-side surface of the positive lens arranged at the fourth sub-position are aspherical.

7. A zoom lens apparatus, comprising:
a first optical lens group having a negative focal length arranged at a first position closest to a subject;
a second optical lens group having a positive focal length arranged at a second position second closest to the subject;
an aperture diaphragm which is disposed to a subject side of the second optical lens group closer to the subject in a manner such that the aperture diaphragm is movable integrally with the second optical lens group; and
a third optical lens group having a positive focal length arranged at a third position third closest to the subject,
wherein at least the first and second optical lens groups are moved to change a magnification of the zoom lens apparatus,
wherein the second optical lens group comprises a three-group and four-lens structure which comprises:
a first positive lens arranged at a first sub-position closest to the subject in the second optical lens group and such that a greater-curvature surface of the positive lens faces the subject;
a negative meniscus lens arranged at a second sub-position second closest to the subject in the second optical lens group and such that a concave of the negative meniscus lens faces the subject;
a positive meniscus lens conjoined with the negative meniscus lens and arranged at a third sub-position third closest to the subject in the second optical lens group; and
a second positive lens arranged at a fourth sub-position fourth closest to the subject in the second optical lens group,
wherein the zoom lens system satisfies an inequality condition $1.40<((1/r_{21F})+(1/r_{22F})+(1/r_{22R}))*Y'<2.20$, wherein $r_{21F}$ is a radius of curvature of a subject-side surface of the first positive lens arranged at the first sub-position in the second optical lens group, $r_{22F}$ is a radius of curvature of a subject-side surface of the negative meniscus lens arranged at the second sub-position in the second optical lens group, $r_{22R}$ is a radius of curvature of a conjoined surface of the negative meniscus lens arranged at the second sub-position and the meniscus positive lens arranged at the third sub-position in the second optical lens group, and Y' is an image height.

8. A zoom lens apparatus, comprising:
a first optical lens group having a negative focal length arranged at a first position closest to a subject;
a second optical lens group having a positive focal length arranged at a second position second closest to the subject;
an aperture diaphragm which is disposed to a subject side of the second optical lens group closer to the subject in a manner such that the aperture diaphragm is movable integrally with the second optical lens group; and
a third optical lens group having a positive focal length arranged at a third position third closest to the subject,
wherein at least the first and second optical lens groups are moved to change a magnification of the zoom lens apparatus,
wherein the second optical lens group comprises a three-group and four-lens structure which comprises:
a first positive lens arranged at a first sub-position closest to the subject in the second optical lens group and such that a greater-curvature surface of the first positive lens faces the subject;
a negative meniscus lens arranged at a second sub-position second closest to the subject in the second optical lens group and such that a concave of the negative meniscus lens faces the subject;
a positive meniscus lens conjoined with the negative meniscus lens and arranged at a third sub-position third closest to the subject in the second optical lens group; and
a second positive lens arranged at a fourth sub-position fourth closest to the subject in the second optical lens group,
wherein the zoom lens system satisfies an inequality condition $1.40<(L_{PN}/L_2)<0.70$, wherein $L_{PN}$ is a distance between a summit of the subject-side surface of the first positive lens arranged at the first sub-position and a summit of the conjoined surface of the negative meniscus lens arranged at the second sub-position and the meniscus positive lens arranged at the third sub-position in the second optical lens group, and $L_2$ is a thickness of the second optical lens group in a direction of a light axis of the second optical lens group.

9. A zoom lens apparatus, comprising:
a first optical lens group having a negative focal length arranged at a first position closest to a subject;
a second optical lens group having a positive focal length arranged at a second position second closest to the subject;
an aperture diaphragm which is disposed to a subject side of the second optical lens group closer to the subject in a manner such that the aperture diaphragm is movable integrally with the second optical lens group; and
a third optical lens group having a positive focal length arranged at a third position third closest to the subject,
wherein at least the at first and second optical lens groups are moved to change a magnification of the zoom lens apparatus,
wherein the second optical lens group comprises a three-group and four-lens structure which comprises:
  a first positive lens arranged at a first sub-position closest to the subject in the second optical lens group and such that a greater-curvature surface of the first positive lens faces the subject;
  a negative meniscus lens arranged at a second sub-position second closest to the subject in the second optical lens group and such that a concave of the negative meniscus lens faces the subject;
  a positive meniscus lens conjoined with the negative meniscus lens and arranged at a third sub-position third closest to the subject in the second optical lens group; and
  a second positive lens arranged at a fourth sub-position fourth closest to the subject in the second optical lens group,
wherein the conjoined surface of the negative meniscus lens arranged at the second sub-position and the positive lens arranged at the third sub-position has a radius of curvature which is greatest among lens surfaces included in the second optical lens group.

10. A digital camera, comprising:
a zoom lens system which comprises:
  a first optical lens group having a negative focal length arranged at a first position closest to a subject;
  a second optical lens group having a positive focal length arranged at a second position second closest to the subject;
  an aperture diaphragm which is disposed to a subject side of the second optical lens group closer to the subject in a manner such that the aperture diaphragm is movable integrally with the second optical lens group; and
  a third optical lens group having a positive focal length arranged at a third position third closest to the subject,
wherein at least the first and second optical lens groups are moved to change a magnification of the zoom lens apparatus,
wherein the second optical lens group comprises a three-group and four-lens structure which comprises:
  a positive lens arranged at a first sub-position closest to the subject in the second optical lens group and such that a greater-curvature surface of the positive lens faces the subject;
  a negative meniscus lens arranged at a second sub-position second closest to the subject in the second optical lens group and such that a concave of the negative meniscus lens faces the subject;
  a positive meniscus lens conjoined with the negative meniscus lens and arranged at a third sub-position third closest to the subject in the second optical lens group; and
  a positive lens arranged at a fourth sub-position fourth closest to the subject in the second optical lens group,
wherein the zoom lens system satisfies an inequality condition $0.15<(N_{22}-N_{23})<0.40$, wherein $N_{22}$ is a refractive index of the negative meniscus lens of the second optical lens group and $N_{23}$ is a refractive index of the positive meniscus lens of the second optical lens group conjoined with the negative meniscus lens.

11. A personal digital assistance apparatus, comprising:
a zoom lens system which comprises:
  a first optical lens group having a negative focal length arranged at a first position closest to a subject;
  a second optical lens group having a positive focal length arranged at a second position second closest to the subject;
  an aperture diaphragm which is disposed to a subject side of the second optical lens group closer to the subject in a manner such that the aperture diaphragm is movable integrally with the second optical lens group; and
  a third optical lens group having a positive focal length arranged at a third position third closest to the subject,
wherein at least the first and second optical lens groups are moved to change a magnification of the zoom lens apparatus,
wherein the second optical lens group comprises a three-group and four-lens structure which comprises:
  a positive lens arranged at a first sub-position closest to the subject in the second optical lens group and such that a greater-curvature surface of the positive lens faces the subject;
  a negative meniscus lens arranged at a second sub-position second closest to the subject in the second optical lens group and such that a concave of the negative meniscus lens faces the subject;
  a positive meniscus lens conjoined with the negative meniscus lens and arranged at a third sub-position third closest to the subject in the second optical lens group; and
  a positive lens arranged at a fourth sub-position fourth closest to the subject in the second optical lens group,
wherein the zoom lens system satisfies an inequality condition $0.15<(N_{22}-N_{23})<0.40$, wherein $N_{22}$ is a refractive index of the negative meniscus lens of the second optical lens group and $N_{23}$ is a refractive index of the positive meniscus lens of the second optical lens group conjoined with the negative meniscus lens.

* * * * *